United States Patent
Hallow et al.

(10) Patent No.: US 12,522,576 B2
(45) Date of Patent: Jan. 13, 2026

(54) POLYMORPHS OF D9-THC NAPHTHOYLESTER

(71) Applicant: PURISYS LLC, Athens, GA (US)

(72) Inventors: Daniel M. Hallow, Bishop, GA (US); Marc Iuliucci, Athens, GA (US); Gnel Mkrtchyan, Watkinsville, GA (US); Stephen A. R. Carino, Raleigh, NC (US); Frank Joseph Tarczynski, Raleigh, NC (US); Joanna Angelika Bis, Cary, NC (US)

(73) Assignee: PURISYS LLC, Athens, GA (US)

( * ) Notice: Subject to any disclaimer, the term of this patent is extended or adjusted under 35 U.S.C. 154(b) by 272 days.

(21) Appl. No.: 17/768,185

(22) PCT Filed: Oct. 14, 2020

(86) PCT No.: PCT/US2020/055590
§ 371 (c)(1),
(2) Date: Apr. 11, 2022

(87) PCT Pub. No.: WO2021/076633
PCT Pub. Date: Apr. 22, 2021

(65) Prior Publication Data
US 2024/0109857 A1    Apr. 4, 2024

Related U.S. Application Data

(60) Provisional application No. 62/914,906, filed on Oct. 14, 2019.

(51) Int. Cl.
*C07D 311/80*    (2006.01)

(52) U.S. Cl.
CPC .................................. *C07D 311/80* (2013.01)

(58) Field of Classification Search
CPC .................................................... C07D 311/80
See application file for complete search history.

(56) References Cited

U.S. PATENT DOCUMENTS 7,923,558 B2 *    4/2011    Arslantas ............. C07D 311/80
548/364.4

FOREIGN PATENT DOCUMENTS

WO    WO 2006/007734 A1    1/2006

OTHER PUBLICATIONS

WIPO Application No. PCT/US2020/055590, PCT International Preliminary Report on Patentability mailed Apr. 19, 2022.
WIPO Application No. PCT/US2020/055590, PCT International Search Report and Written Opinion of the International Searching Authority mailed Jan. 26, 2021.

* cited by examiner

*Primary Examiner* — Golam M Shameem
(74) *Attorney, Agent, or Firm* — Alston & Bird LLP

(57) ABSTRACT

The present disclosure relates to polymorphs of D9-THC-naphthoylester for the preparation of D9-Tetrahydrocannabinol in high yields and high purity, methods of preparing the D9-Tetrahydrocannabinol, and compositions comprising the D9-Tetrahydrocannabinol.

13 Claims, 33 Drawing Sheets

POLYMORPHS OF D9-THC NAPHTHOYLESTER

CROSS REFERENCE TO RELATED APPLICATIONS

This application is a national stage entry of PCT/US20/55590 filed Oct. 14, 2020, which claims the benefit of priority to U.S. Provisional Patent Application No. 62/914,906, filed on Oct. 14, 2019, the contents of which are incorporated by reference herein in their entirety for all purposes.

FIELD

The subject matter described herein relates to new crystal forms of $d^9$-THC naphthoylester for the preparation of $d^9$-tetrahydrocannabinol.

BACKGROUND

Cannabinoids are a family of naturally occurring C21 terpenophenolic compounds produced in the cannabis plant. Marijuana typically refers to a mixture of leaves and flowering heads of the pistillate plant of cannabis sativa from which tetrahydrocannabinol (THC) is isolated. THC may be isolated in two main isomeric forms, depending on the position of the double bond (Δ9-tetrahydrocannabinol or Δ8-tetrahydrocannabinol). The position of the double bond and the stereochemistry of these THC isomers has been confirmed by nuclear magnetic resonance and X-ray crystallography.

THC has been used as a psychomimetic agent for many years with the main psychomimetic activity being attributed to Δ9-tetrahydrocannabinol (Δ9-THC). Δ9-THC is used therapeutically as an inhalant or an oral drug for stimulation of appetite among AIDS and cancer chemotherapy patients.

The major cannabinoids present in cannabis other than Δ9- and Δ8-THC include cannabidiol (CBD), cannabichromene (CBC), cannabigerol (CBG), cannabinol (CBN), cannabidivarin (CBDV). While CBD, CBC, CBG, CBN, and CBDV may be present in cannabis in large amounts, they are generally not known to have any psychoactive effects.

Although Δ9-THC can be found as an extract in the cannabis plant, isolating Δ9-THC from other cannabinoids in the extract has proven difficult. What is needed, therefore, are novel methods of obtaining Δ9-THC in high yields and high purity. The subject matter described herein addresses this need.

BRIEF SUMMARY

In certain aspects, the subject matter described herein is directed to crystalline D9-THC-naphthoylester characterized by an X-ray powder diffraction pattern having at least one peak selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).

In certain aspects, the subject matter described herein is directed to crystalline D9-THC-naphthoylester characterized by an X-ray powder diffraction pattern having at least one peak selected from the group consisting of 8.84°, 11.64°, 13.33°, 15.54°, 17.85°, 19.13°, 20.33°, 20.60°, 21.44°, and 23.42° 2θ (each ±0.20° 2θ).

In certain aspects, the subject matter described herein is directed to crystalline D9-THC-naphthoylester characterized by an X-ray powder diffraction pattern having at least one peak selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

In certain aspects, the subject matter described herein is directed to crystalline D9-THC-naphthoylester for the preparation of Δ9-tetrahydrocannabinol.

In certain aspects, the subject matter described herein is directed to a method of preparing pure Δ9-tetrahydrocannabinol from reaction mixtures containing a crude product containing one or more tetrahydrocannabinol compounds, wherein said one or more tetrahydrocannabinol compounds is converted to a first crystalline D9-THC-naphthoylester, said method comprising:
  contacting said first crystalline D9-THC-naphthoylester with a first solvent to form a solution;
  seeding said solution with the crystalline D9-THC-naphthoylester of any one of forms G, H, or E to prepare a suspension;
  separating a solid material from said suspension to prepare a second D9-THC-naphthoylester having a lower amount of Exo-D9-THC-naphthoylester than said first crystalline D9-THC-naphthoylester; and
  contacting said second D9-THC-naphthoylester with a base and a second solvent to prepare said pure Δ9-tetrahydrocannabinol.

These and other aspects are described fully herein.

DETAILED DESCRIPTION

Figure 1A:
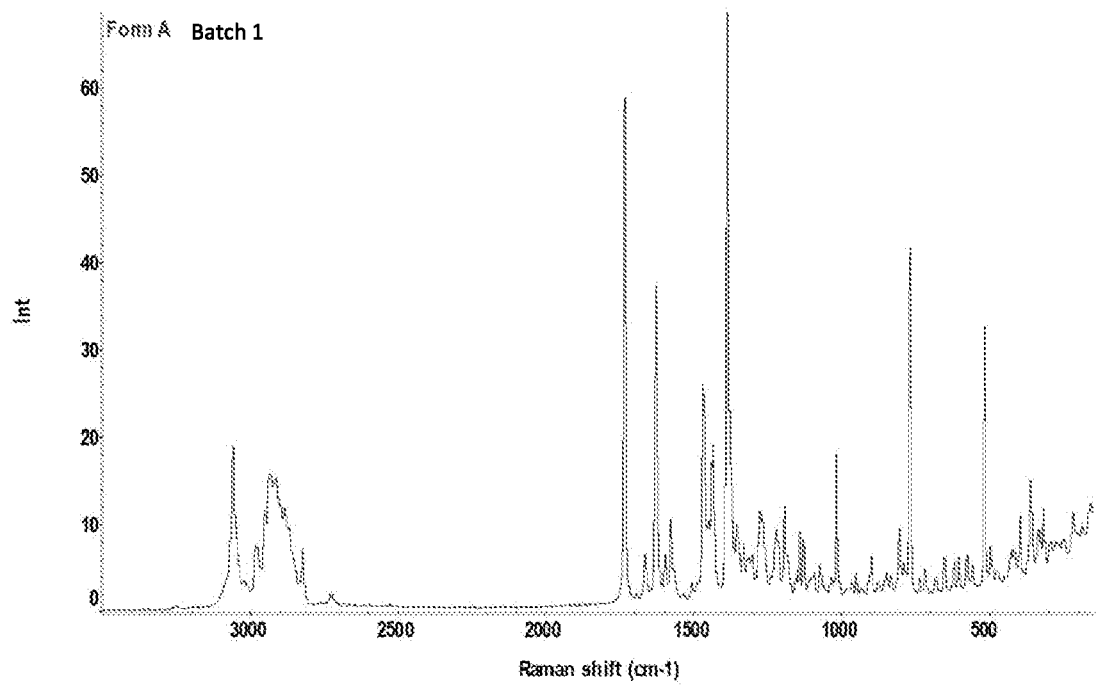
FIG. 1A depicts an FT-Raman spectrum of Form A D9-THC-naphthoylester.

Disclosed herein are novel crystal forms of $d^9$-THC naphthoylester for the preparation of Δ9-tetrahydrocannabinol in high yields and high purity. As described in U.S. Pat. No. 7,923,558, $d^9$-THC naphthoylester is an intermediate in the synthetic preparation of Δ9-tetrahydrocannabinol. Δ9-tetrahydrocannabinol is generated following cleavage of the ester moiety through the dissolution of $d^9$-THC naphthoylester in a suitable solvent and in the presence of a strong base. The polymorphs of $d^9$-THC naphthoylester described herein can expel impurities through crystallization in a range of solvents, thereby generating Δ9-tetrahydrocannabinol in greater purity than that observed through previous synthetic methods or extraction from the cannabis plant.

The IUPAC nomenclature for $d^9$-THC naphthoylester is (6aR,10aR)-6a,7,8,10a-tetrahydro-6,6,9-trimethyl-3-pentyl-6H-dibenzo[b,d]pyran-1-yl ester. Its chemical structure is presented below:

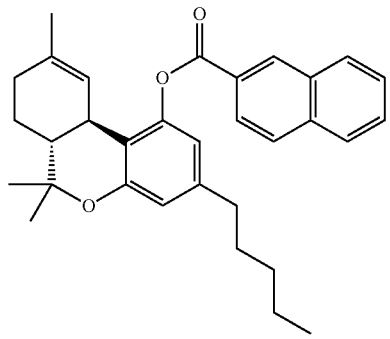

As disclosed in U.S. Pat. No. 7,923,558, $d^9$-THC naphthoylester may be enriched through crystallization or recrystallization in a suitable solvent to reduce the presence of ≤5% $d^8$-THC naphthoylester in the intermediate product. However, it has also been discovered that recrystallization/crystallization of the ester intermediate can help decrease the amount of Exo-$d^9$-THC naphthoylester impurity prior to the preparation of $d^9$-THC. The IUPAC nomenclature for Exo-$d^9$-THC naphthoylester is (6aR,10aR)-6,6-dimethyl-9-methylene-3-pentyl-6a,7,8,9,10,10a-hexahydro-6H-benzo[c]chromen-1-yl 2-naphthoate and its structure is shown below:

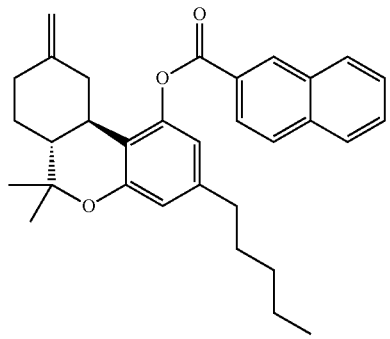

The presence of Exo-d⁹-THC naphthoylester may generate Exo-d⁹-THC as an impurity following ester cleavage in the final preparation of d⁹-THC. While the product may be purified by chromatography, removing Exo-d⁹-THC naphthoylester prior to cleavage of the ester moiety could save time, energy, and produce d⁹-THC in even greater yields.

Compounds that exist as solids have the potential to exist in a crystalline state characterized by a repeating structural unit known as a lattice. In some cases, a given crystalline compound may be capable of forming more than one crystalline state, meaning that the same compound's solid state structure may differ between batches of a prepared compound or even within a single batch of that compound. Solid compounds with no regular crystal lattice structure are commonly referred to as being "amorphous." While some compounds have the capacity to exist in one or more crystalline states, others are only amorphous. Since the crystalline packing forces are part of the thermodynamic properties of the solid molecular substance, those packing forces can greatly affect the physical parameters of the substance. For example, in the area of pharmaceuticals, it is well known that the particular crystalline form in which a drug substance is found can affect its solubility, stability, ease of formulation, processability, in vivo pharmacology, etc. In deciding which of the forms is preferable for a particular application, one generally studies each of the forms for its various attributes in view of numerous developmental considerations. In this regard, it is possible that one form may be preferred for a given use while another is preferred for a different use. Likewise, it is possible that each different form has advantages and disadvantages within a single use and the form chosen for development will represent the sum of all considerations. The ability to fully optimize a drug's properties, such as stability, ease of formulation, pharmacokinetics, etc, is highly sought after. As a result, there is an ongoing need for the discovery of new, crystalline forms of existing drug molecules.

The specific crystalline structure of an intermediate compound in the synthetic preparation of a drug molecule may also offer certain benefits over other crystalline or solid forms. For example, the thermodynamic link between crystal structure and solubility may enable one crystal type to expel impurities to a greater degree than another. It is possible that the selection of a particular crystalline intermediate may facilitate the preparation of the desired drug product in greater yield and purity. Advantageously, the various stable polymorphs of d⁹-THC naphthoylester disclosed herein demonstrate rejection of the Exo-impurity naphthoylester impurity under a series of crystallization conditions. The novel d⁹-THC naphthoylester crystal forms are suitable candidates for the production of d⁹-THC in higher purity and yield without the need for extensive purification techniques.

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

I. Definitions

As used herein, "Exo" refers to the Exo-D9-THC-Naphthoylester impurity, (6aR,10aR)-6,6-dimethyl-9-methylene-3-pentyl-6a,7,8,9,10,10a-hexahydro-6H-benzo[c]chromen-1-yl 2-naphthoate.

As used herein, "PXRD" refers to powder X-ray diffraction.

As used herein, "SC-XRD" refers to Single Crystal X-ray diffraction.

As used herein, "API" refers to Active Pharmaceutical Ingredient.

As used herein, "plant extract" refers to compositions prepared from solvent extractions from the whole cannabis plant or parts thereof.

As used herein, "stable" refers to a crystalline material that maintains its unique crystalline structure beyond a maximum specified amount of time under certain parameters. Advantageously, the compositions and compounds described herein maintain their crystal structure under certain temperatures, relative humidity conditions, and over extended periods of time.

Unless otherwise specified, the term "crystalline" and related terms used herein, when used to describe a substance, component, product, or form, mean that the substance, component, product, or form is substantially crystalline, for example, as determined by X-ray diffraction. (see, e.g., *Remington's Pharmaceutical Sciences,* 20$^{th}$ ed., Lippincott Williams & Wilkins, Philadelphia Pa., 173 (2000); *The United States Pharmacopeia,* 37$^{th}$ ed. a 503-509 (2014)).

As used herein, and unless otherwise specified, the terms "about" and "approximately," when used in connection with a numeric value or range of values which is provided to characterize a particular solid form, e.g., a specific temperature or temperature range, such as, for example, that describes a melting, dehydration, desolvation, or glass transition temperature; a mass change, such as, for example, a mass change as a function of temperature or humidity; a solvent or water content, in terms of, for example, mass or a percentage; or a peak position, such as, for example, in analysis by, for example, IR or Raman spectroscopy or PXRD; indicate that the value or range of values may deviate to an extent deemed reasonable to one of ordinary skill in the art while still describing the solid form. Techniques for characterizing crystal forms and amorphous forms include, but are not limited to, thermal gravimetric analysis (TGA), differential scanning calorimetry (DSC), powder X-ray diffraction (PXRD), single-crystal X-ray diffraction, vibrational spectroscopy, e.g., infrared (IR) and Raman spectroscopy, solid-state and solution nuclear magnetic resonance (NMR) spectroscopy, optical microscopy, hot stage optical microscopy, scanning electron microscopy (SEM), electron crystallography and quantitative analysis, particle size analysis (PSA), surface area analysis, solubility studies, and dissolution studies. In certain embodiments, the terms "about" and "approximately," when used in this context, indicate that the numeric value or range of values may vary within 30%, 20%, 15%, 10%, 9%, 8%, 7%, 6%, 5%, 4%, 3%, 2%, 1.5%, 1%, 0.5%, or 0.25% of the recited value or range of values. In the context of molar ratios, "about" and "approximately" indicate that the numeric value or range of values may vary within 20%, 15%, 10%, 9%, 8%, 7%, 6%, 5%, 4%, 3%, 2%, 1.5%, 1%, 0.5%, or 0.25% of the recited value or range of values. It should be understood that the numerical values of the peaks of an X-ray powder diffraction pattern may vary from one machine to another, or from one sample to another, and so the values quoted are not to be construed as absolute, but with an allowable variability, such as ±0.20 degrees two theta (° 2θ), or more. For example, in some embodiments, the value of an PXRD peak position may vary by up to ±0.20 degrees 2θ while still describing the particular PXRD peak.

As used herein, and unless otherwise specified, a solid form that is "substantially physically pure" is substantially free from other solid forms. In certain embodiments, a crystal form that is substantially physically pure contains less than about 50%, 45%, 40%, 35%, 30%, 25%, 20%, 15%, 10%, 9%, 8%, 7%, 6%, 5%, 4%, 3%, 2%, 1%, 0.5%, 0.4%, 0.3%, 0.2%, 0.1%, 0.05%, or 0.01% of one or more other solid forms on a weight basis. The detection of other solid forms can be accomplished by any method apparent to a person of ordinary skill in the art, including, but not limited to, diffraction analysis, thermal analysis, elemental combustion analysis and/or spectroscopic analysis.

As used herein, and unless otherwise specified, a solid form that is "substantially chemically pure" is substantially free from other chemical compounds (i.e., chemical impurities). In certain embodiments, a solid form that is substantially chemically pure contains less than about 50%, 45%, 40%, 35%, 30%, 25%, 20%, 15%, 10%, 9%, 8%, 7%, 6%, 5%, 4%, 3%, 2%, 1%, 0.5%, 0.4%, 0.3%, 0.2%, 0.1%, 0.05%, or 0.01% of one or more other chemical compounds on a weight basis. The detection of other chemical compounds can be accomplished by any method apparent to a person of ordinary skill in the art, including, but not limited to, methods of chemical analysis, such as, e.g., mass spectrometry analysis, spectroscopic analysis, thermal analysis, elemental combustion analysis and/or chromatographic analysis.

As used herein, and unless otherwise indicated, a chemical compound, solid form, or composition that is "substantially free" of another chemical compound, solid form, or composition means that the compound, solid form, or composition contains, in certain embodiments, less than about 50%, 45%, 40%, 35%, 30%, 25%, 20%, 15%, 10%, 9%, 8%, 7%, 6%, 5%, 4%, 3%, 2%, 1%, 0.5%, 0.4%, 0.3%, 0.2%, 0.1%, 0.05%, or 0.01% by weight of the other compound, solid form, or composition. As used herein, "essentially free" refers to levels that are below trace. In certain embodiments, essentially free refers to amounts not detectable by standard techniques.

As used herein, "pure Δ9-tetrahydrocannabinol" refers to Δ9-tetrahydrocannabinol and less than about 45%, 40%, 35%, 30%, 25%, 20%, 15%, 10%, 9%, 8%, 7%, 6%, 5%, 4%, 3%, 2%, 1%, 0.5%, 0.4%, 0.3%, 0.2%, 0.1%, 0.05%, or 0.01% of one or more impurities on a weight basis. In certain embodiments, the impurities are Δ8-tetrahydrocannabinol or (6aR,10aR)-6,6-dimethyl-9-methylidene-3-pentyl-7,8,10, 10a-tetrahydro-6aH-benzo[c]chromen-1-ol. In certain embodiments, the subject matter described herein is directed to a composition comprising pure Δ9-tetrahydrocannabinol and less than about 45%, 40%, 35%, 30%, 25%, 20%, 15%, 10%, 9%, 8%, 7%, 6%, 5%, 4%, 3%, 2%, 1%, 0.5%, 0.4%, 0.3%, 0.2%, 0.1%, 0.05%, or 0.01% of one or more impurities on a weight basis.

Unless otherwise specified, the term "composition" as used herein is intended to encompass a product comprising the specified ingredient(s) (and in the specified amount(s), if indicated), as well as any product which results, directly or indirectly, from combination of the specified ingredient(s) in the specified amount(s). By "pharmaceutically acceptable," it is meant a diluent, excipient, or carrier in a formulation must be compatible with the other ingredient(s) of the formulation and not deleterious to the recipient thereof.

Unless otherwise specified, to the extent that there is a discrepancy between a depicted chemical structure of a compound provided herein and a chemical name of a compound provided herein, the chemical structure shall control.

Additional definitions are provided below.

II. Compositions

In certain embodiments, the subject matter described herein is directed to a composition comprising D9-THC-naphthoylester wherein the D9-THC-naphthoylester is a crystalline solid.

Form H D9-THC-Naphthoyl Ester

Figure 20A:
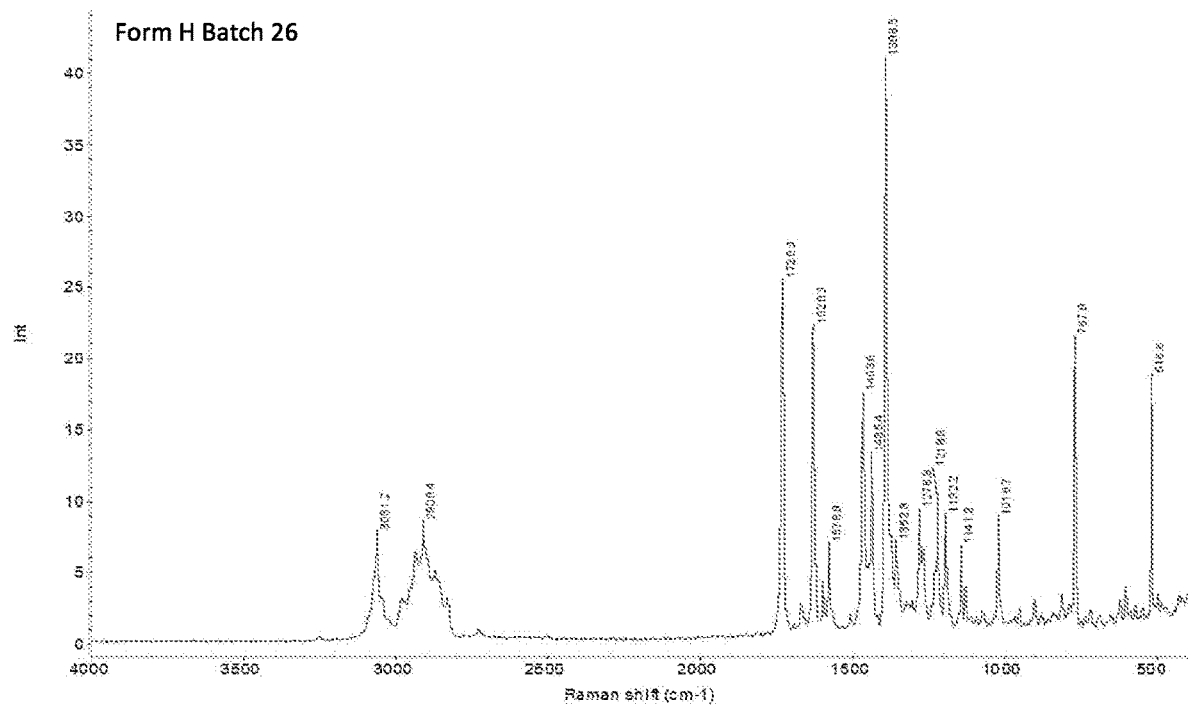
FIG. 20A depicts a FT-Raman spectrum of Form H.

In certain embodiments presented further herein, the crystalline D9-THC-naphthoylester may be denoted as D9-THC-naphthoylester, Form H. The crystalline solid Form H D9-THC-naphthoylester has an X-ray powder diffraction pattern substantially as depicted in Figure FIG. 20C. The crystalline solid exhibits a characteristic X-ray powder diffraction pattern with characteristic peaks expressed in 2θ±0.20 at 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02°.

In certain embodiments, the Form H crystalline D9-THC-naphthoylester is characterized by an X-ray powder diffraction pattern having at least one peak selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).

In certain embodiments, the Form H crystalline D9-THC-naphthoylester is characterized by an X-ray powder diffraction pattern having at least one peak, wherein said at least one peak is selected from the group consisting of 10.78°, 18.43°, 19.49°, 21.80°, 24.19°, 29.30°, or 32.02° 2θ (each ±0.20° 2θ).

In certain embodiments, the Form H crystalline D9-THC-naphthoylester is characterized by an X-ray powder diffraction pattern having at least two peaks selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).

In certain embodiments, the Form H crystalline D9-THC-naphthoylester is characterized by an X-ray powder diffraction pattern having at least three peaks selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).

In certain embodiments, the Form H crystalline D9-THC-naphthoylester has an X-ray powder diffraction pattern obtained using Cu Kα radiation with a wavelength of approximately λ=1.54 Å.

Figure 20B:
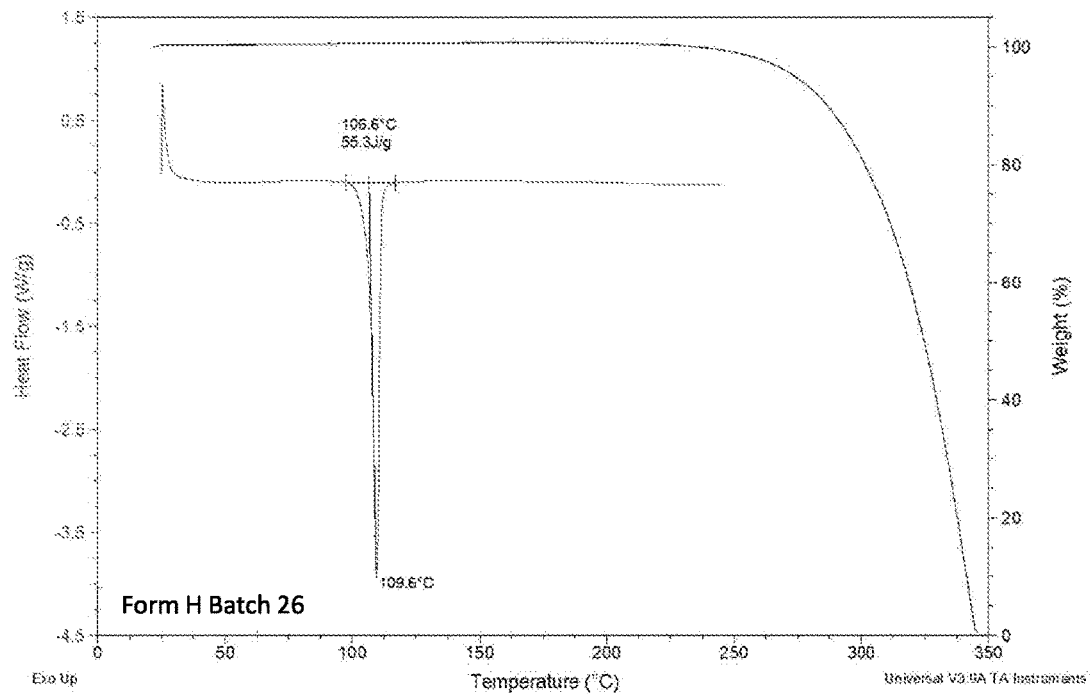
FIG. 20B depicts a combined DSC and TGA plot of Form H.
Figures 20C, 20D:
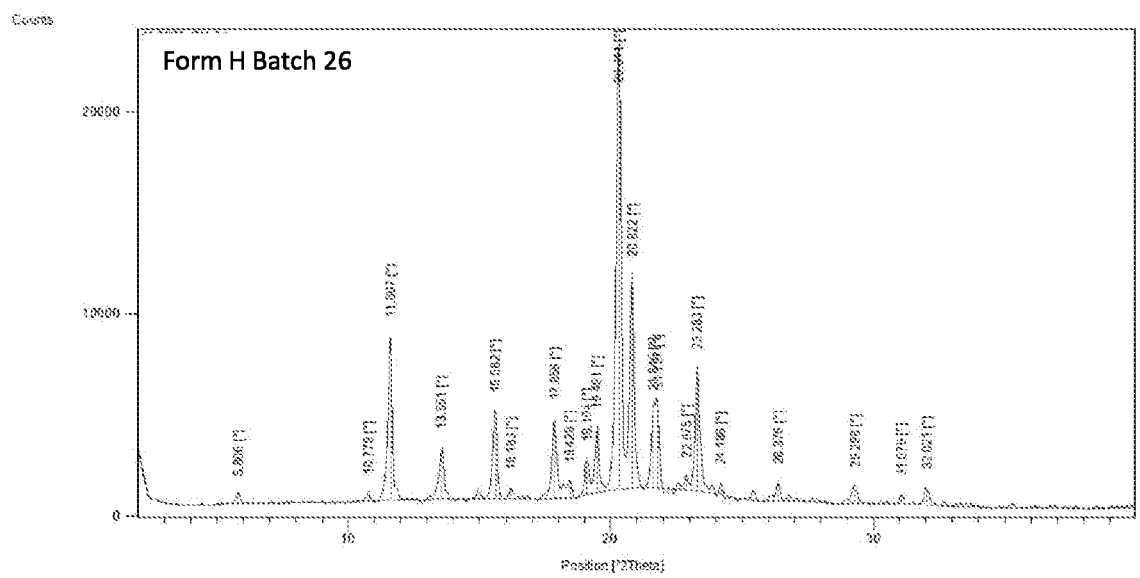
FIG. 20C depicts a PXRD pattern of Form H.
FIG. 20D depicts a PLM micrograph of Form H.
Figure 21:
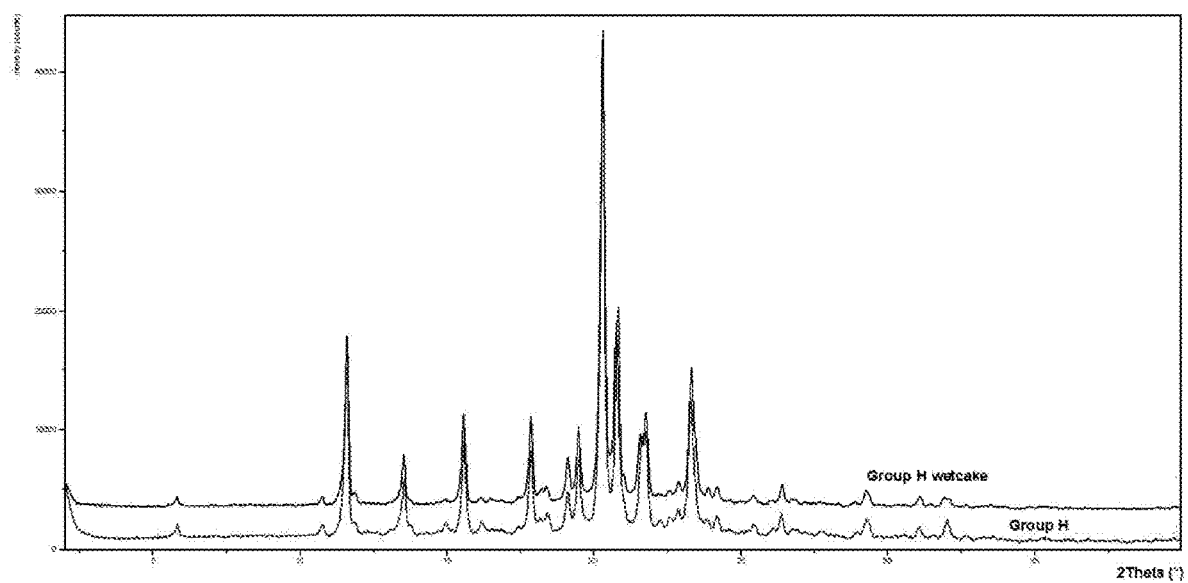
FIG. 21 depicts PXRD patterns of Form H wet-cake and dry solid.
Figure 22:
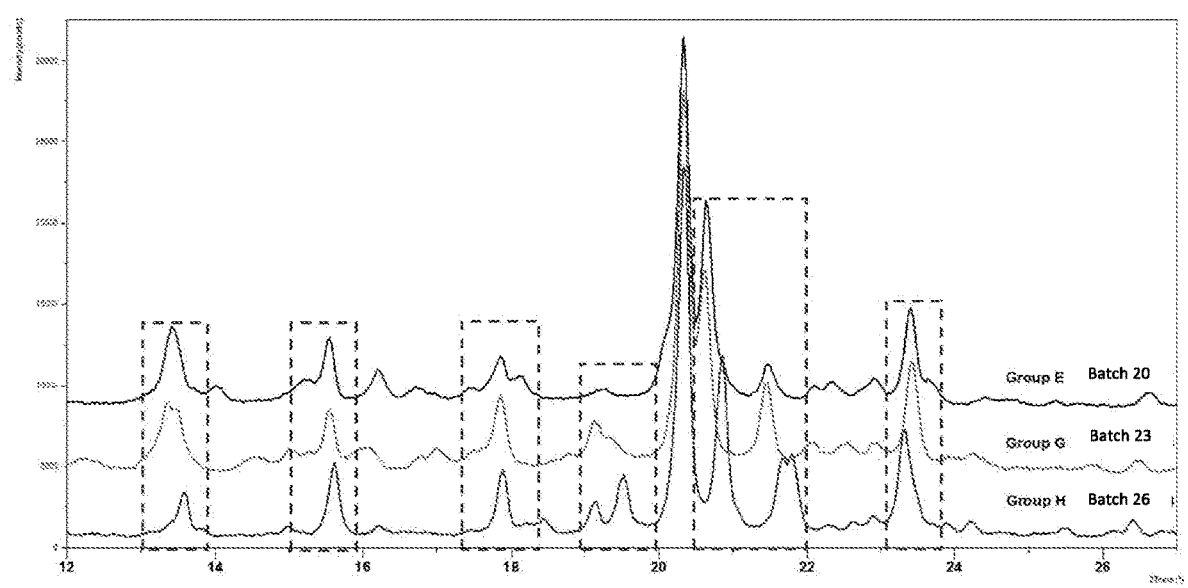
FIG. 22 depicts PXRD patterns of Forms E, G and H.

In certain embodiments, the subject matter described herein is directed to crystalline Form H D9-THC-naphthoylester having a differential scanning calorimetry thermogram as set forth in FIG. 20B. The Form H crystalline D9-THC-naphthoylester is characterized by a differential scanning calorimetry thermogram exhibiting an onset at about 106.6° C. and a peak at about 109.6° C.

In certain embodiments, the subject matter described herein is directed to crystalline Form H D9-THC-naphthoylester having a FT-Raman spectrum as set forth in FIG. 20A. The crystalline solid exhibits a characteristic FT-Raman spectrum with characteristic peaks at 516.6 cm$^{-1}$, 767.8 cm$^{-1}$, 1018.7 cm$^{-1}$, 1141.2 cm$^{-1}$, 1192.2 cm$^{-1}$, 1218.6 cm$^{-1}$, 1276.9 cm$^{-}$, 1352.8 cm$^{-1}$, 1388.5 cm$^{-1}$, 1435.4 cm$^{-1}$, 1463.6 cm$^{-1}$, 1576.8 cm$^{-1}$, 1628.3 cm$^{-1}$, 1728.3 cm$^{-1}$, 2908.4 cm$^{-1}$, and 3061.2 cm$^{-1}$ (each ±0.5 cm$^{-1}$).

In certain embodiments, the X-ray powder diffraction peaks together with the FT-Raman and/or the DSC melting point characterize the crystalline Form H D9-THC-naphthoylester.

In certain embodiments, the Form H crystalline D9-THC-naphthoylester is characterized by a differential scanning calorimetry thermogram exhibiting an onset at about 106.6° C. and a peak at about 109.6° C., for use in the preparation of D9-tetrahydrocannabinol.

Form G D9-THC-Naphthoylester

Figure 19A:
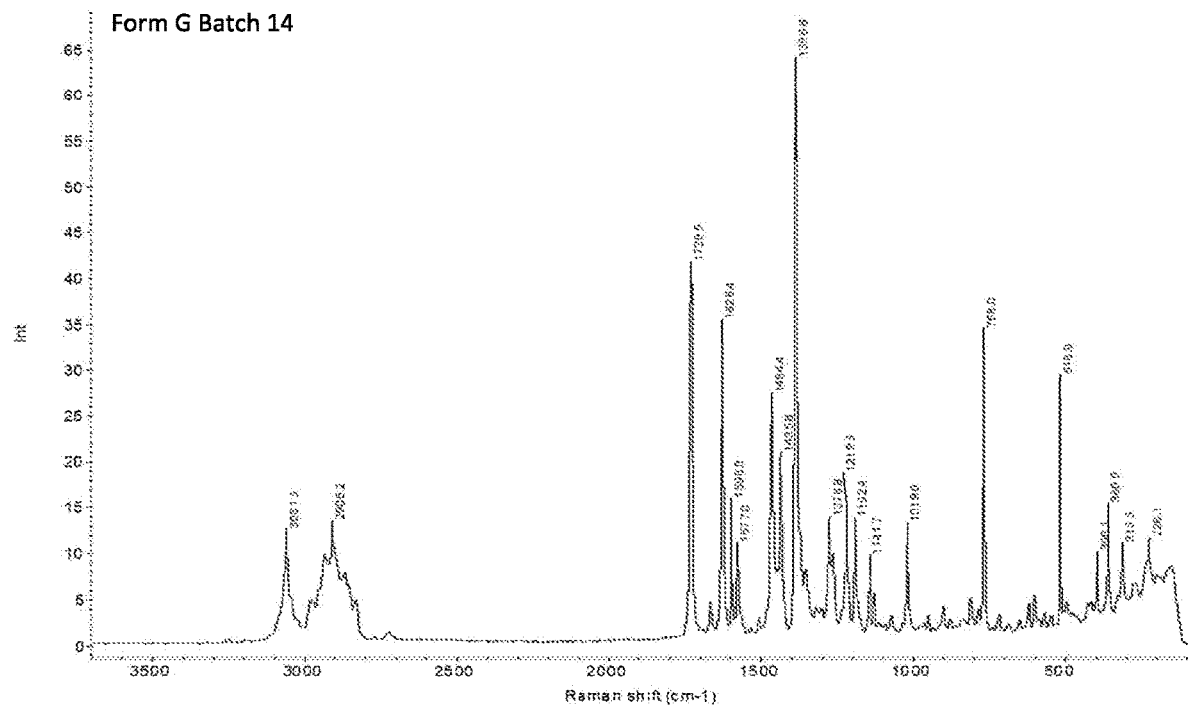
FIG. 19A depicts a FT-Raman spectrum of Form G.

In certain embodiments presented further herein, the crystalline D9-THC-naphthoylester may be denoted as D9-THC-naphthoylester, Form G. The crystalline solid Form G D9-THC-naphthoylester is characterized by an X-ray powder diffraction pattern substantially as depicted in Figure FIG. 19C. The crystalline solid exhibits a characteristic X-ray powder diffraction pattern with characteristic peaks expressed in 2θ±0.20 at 8.84°, 11.64°, 13.33°, 15.54°, 17.85°, 19.13°, 20.33°, 20.60°, 21.44°, and 23.42° 2θ.

In certain embodiments, the Form G crystalline D9-THC-naphthoylester is characterized by an X-ray powder diffraction pattern having at least one peak selected from the group consisting of 8.84°, 11.64°, 13.33°, 15.54°, 17.85°, 19.13°, 20.33°, 20.60°, 21.44°, and 23.42° 2θ (each ±0.20° 2θ).

In certain embodiments, the Form G crystalline D9-THC-naphthoylester is characterized by an X-ray powder diffraction pattern having a peak expressed in 2θ±0.20 at 8.84° (±0.20°).

In certain embodiments, the Form G crystalline D9-THC-naphthoylester is characterized by an X-ray powder diffraction pattern having at least two peaks selected from the group consisting of 8.84°, 11.64°, 13.33°, 15.54°, 17.85°, 19.13°, 20.33°, 20.60°, 21.44°, and 23.42° 2θ (each ±0.20° 2θ).

In certain embodiments, the Form G crystalline D9-THC-naphthoylester is characterized by an X-ray powder diffraction pattern having at least three peaks selected from the group consisting of 8.84°, 11.64°, 13.33°, 15.54°, 17.85°, 19.13°, 20.33°, 20.60°, 21.44°, and 23.42° 2θ (each ±0.20° 2θ).

In certain embodiments, the Form G crystalline D9-THC-naphthoylester has an X-ray powder diffraction pattern obtained using Cu Kα radiation with a wavelength of approximately λ=1.54 Å.

Figure 19B:
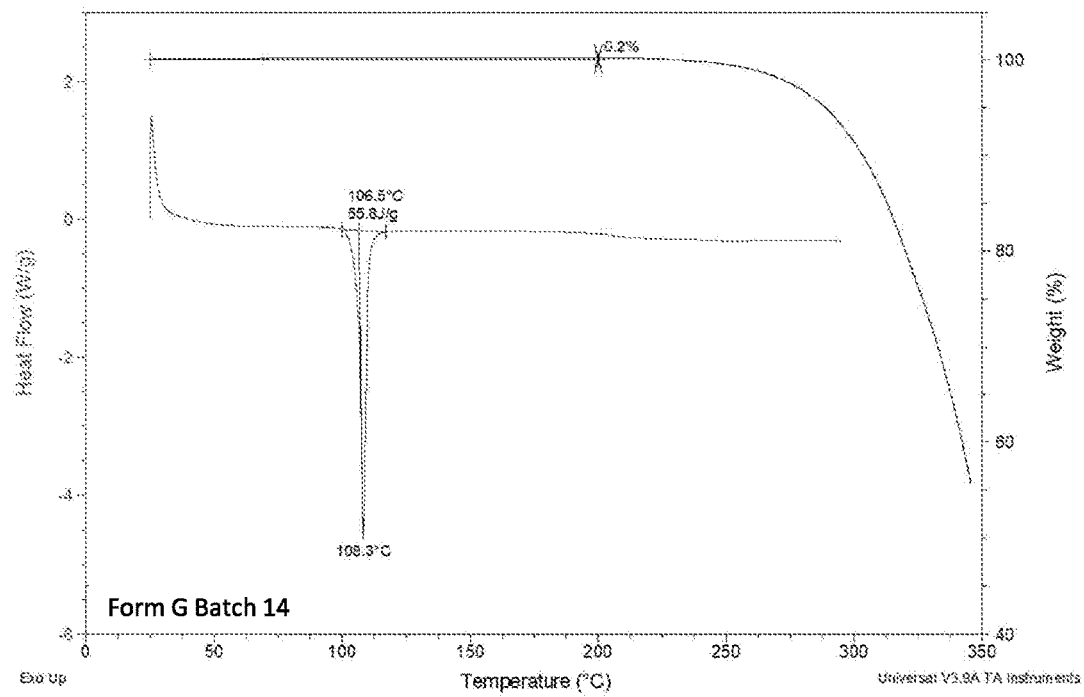
FIG. 19B depicts a combined DSC and TGA plot of Form G.
Figure 19C:
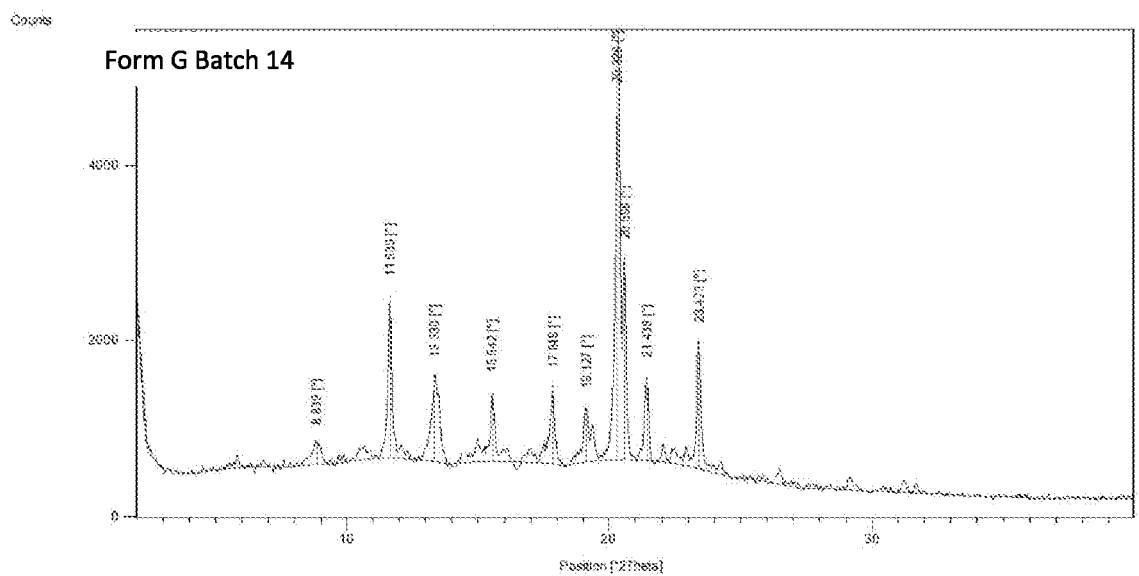
FIG. 19C depicts a PXRD pattern of Form G.
Figure 19D:
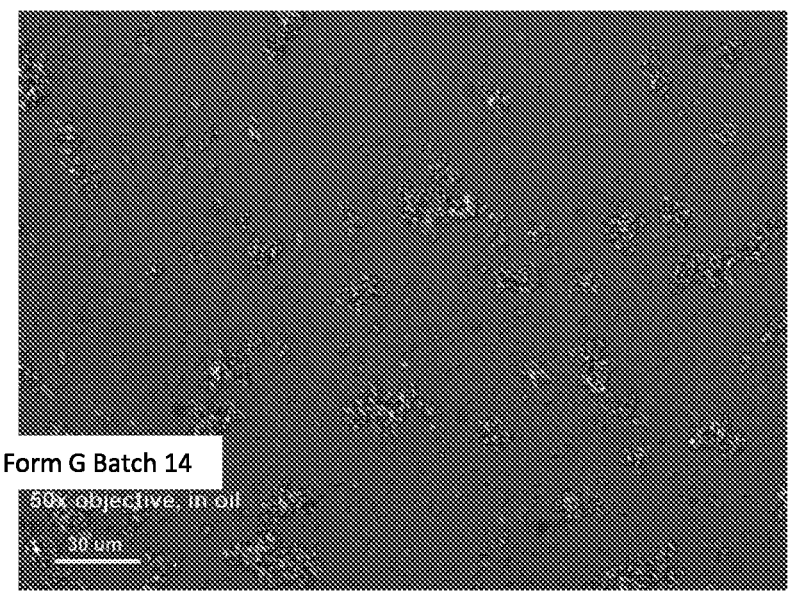
FIG. 19D depicts a PLM micrograph of Form G.

In certain embodiments, the subject matter described herein is directed to crystalline Form G D9-THC-naphthoylester characterized by a differential scanning calorimetry thermogram as set forth in FIG. 19B. The Form G crystalline D9-THC-naphthoylester is characterized by a differential scanning calorimetry thermogram exhibiting an onset at about 106.5° C. and a peak at about 108.3° C.

In certain embodiments, the subject matter described herein is directed crystalline Form G D9-THC-naphthoylester characterized by a FT-Raman Spectrum as set forth in FIG. 19A. The crystalline solid exhibits a characteristic FT-Raman Spectrum having peaks at 226.1 cm$^{-1}$, 313.3 cm$^{-1}$, 360.0 cm$^{-1}$, 396.1 cm$^{-1}$, 516.9 cm$^{-1}$, 768.0 cm$^{-1}$, 1019.0 cm$^{-1}$, 1141.7 cm$^{-1}$, 1192.4 cm$^{-1}$, 1219.3 cm$^{-1}$, 1276.9 cm$^{-1}$, 1388.6 cm$^{-1}$, 1435.8 cm$^{-1}$, 1464.4 cm$^{-1}$, 1577.0 cm$^{-1}$, 1596.8 cm$^{-1}$, 1628.4 cm$^{-1}$, 1728.5 cm$^{-1}$, 2908.2 cm$^{-1}$, and 3061.3 cm$^{-1}$ (each ±0.5 cm$^{-1}$).

In certain embodiments, the X-ray powder diffraction peaks together with the FT-Raman and/or the DSC melting point characterize the crystalline Form G D9-THC-naphthoylester.

In certain embodiments, the Form G crystalline D9-THC-naphthoylester is characterized by a differential scanning calorimetry thermogram exhibiting an onset at about 106.5° C. and a peak at about 108.3° C., for use in the preparation of D9-tetrahydrocannabinol.

Form E D9-THC-Naphthoylester

Figure 16A:
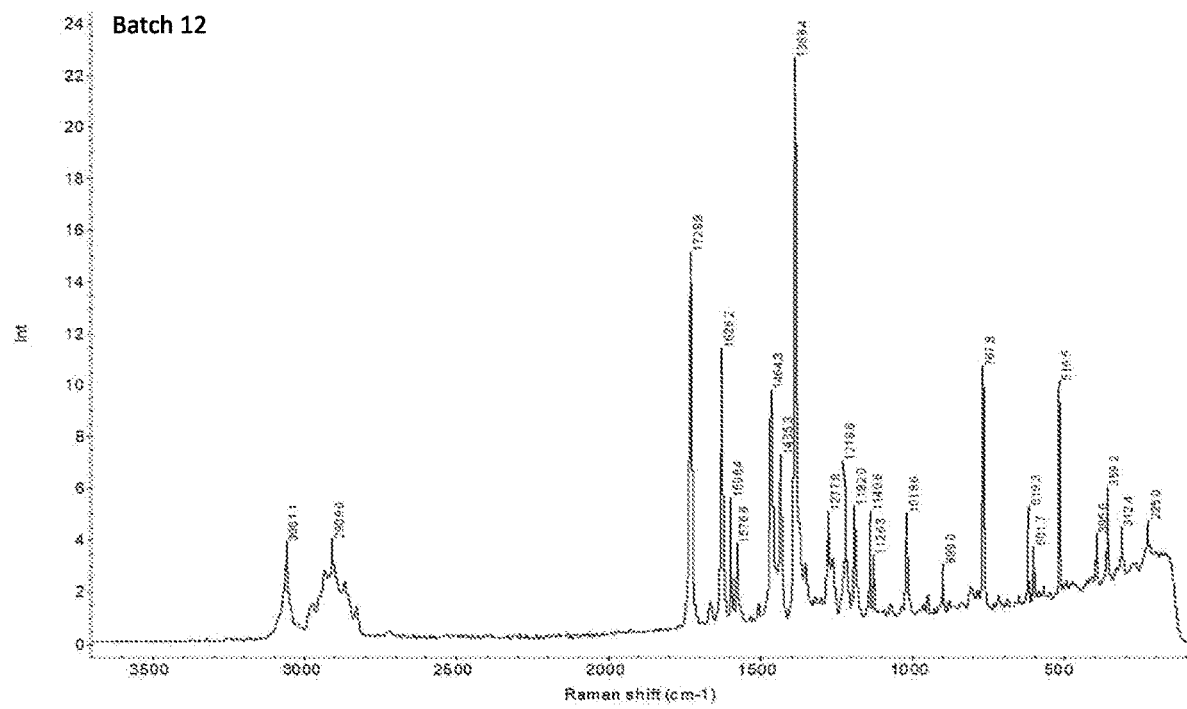
FIG. 16A depicts a FT-Raman spectrum of Form E.

In certain embodiments presented further herein, the crystalline D9-THC-naphthoylester may be denoted as D9-THC-naphthoylester, Form E. The crystalline solid Form E D9-THC-naphthoylester is characterized by an X-ray powder diffraction pattern substantially as depicted in Figure FIG. 16C. The crystalline solid exhibits a characteristic X-ray powder diffraction pattern with characteristic peaks expressed in 2θ±0.20 at 5.83°, 8.63°, 11.65°, 13.42°, 15.57°, 16.23°, 17.87°, 20.35°, 20.69°, 21.50°, 22.91°, 23.40°, 26.62°, and 31.25°.

In certain embodiments, the Form E crystalline D9-THC-naphthoylester is characterized by an X-ray powder diffraction pattern having at least one peak selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

In certain embodiments, the Form E crystalline D9-THC-naphthoylester is characterized by an X-ray powder diffraction pattern, wherein said pattern includes an X-ray diffraction peak at 8.63° or 26.62° 2θ (each ±0.20° 2θ). In certain embodiments, the Form E crystalline D9-THC-naphthoylester is characterized by an X-ray powder diffraction pattern, wherein said pattern includes an X-ray diffraction peak at 8.63° and 26.62° 2θ (each ±0.20° 2θ).

In certain embodiments, the Form E crystalline D9-THC-naphthoylester is characterized by an X-ray powder diffraction pattern having at least two peaks selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

In certain embodiments, the Form E crystalline D9-THC-naphthoylester is characterized by an X-ray diffraction pattern having at least three peaks selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

In certain embodiments, the Form E crystalline D9-THC-naphthoylester has an X-ray powder diffraction pattern obtained using Cu Kα radiation with a wavelength of approximately λ=1.54 Å.

Figure 16B:
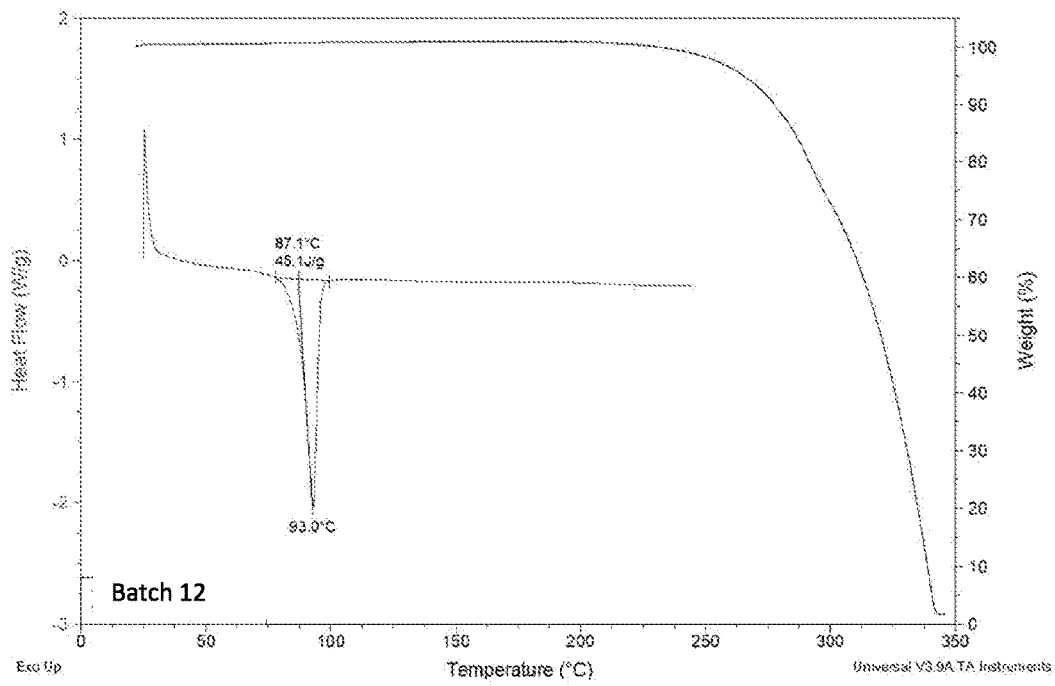
FIG. 16B depicts a combined DSC and TGA plot of Form E.
Figure 16C:
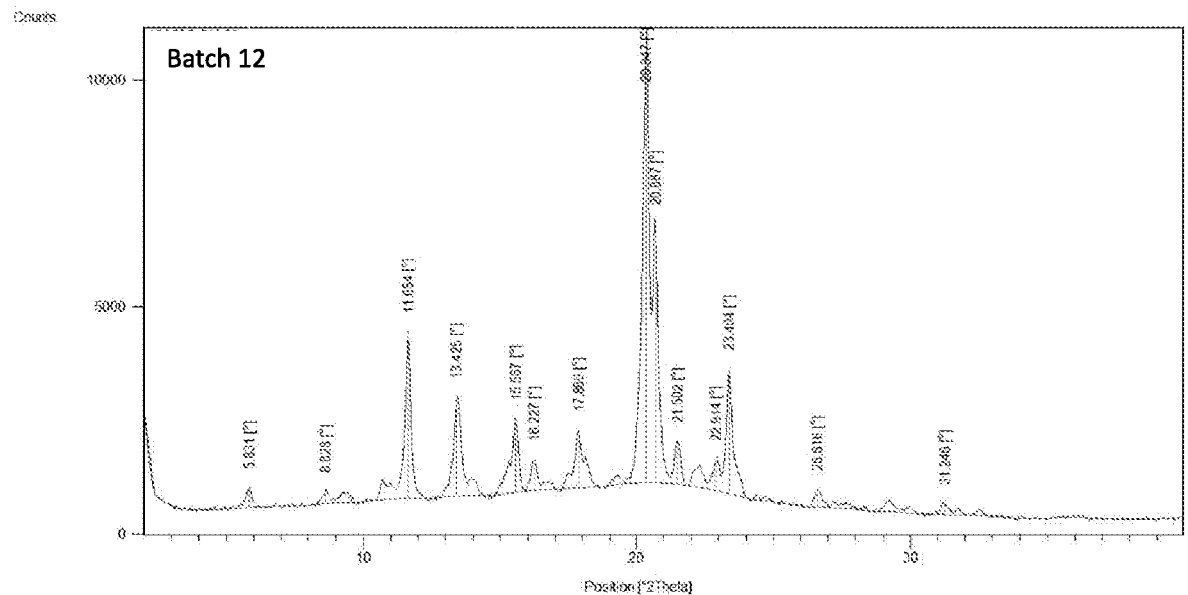
FIG. 16C depicts a PXRD pattern of Form E.
Figure 16D:
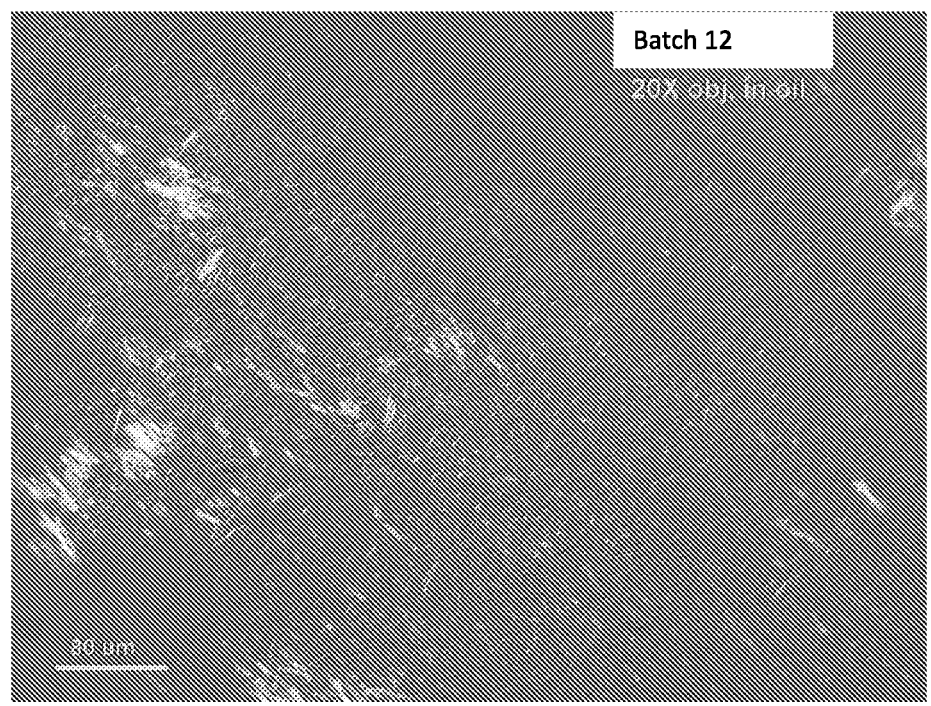
FIG. 16D depicts a PLM micrograph of Form E.

In certain embodiments, the subject matter described herein is directed to crystalline Form E D9-THC-naphthoylester having a differential scanning calorimetry thermogram as set forth in FIG. 16B. The Form E crystalline D9-THC-naphthoylester is characterized by a differential scanning calorimetry thermogram exhibiting an onset at about 87.1° C. and a peak at about 93.0° C.

In certain embodiments, the subject matter described herein is directed to a crystalline Form E D9-THC-naphthoylester having a FT-Raman Spectrum as set forth in FIG. 16A. The crystalline solid exhibits a characteristic FT-Raman Spectrum having peaks at 225.0 cm$^{-1}$, 312.4 cm$^{-1}$, 359.2 cm$^{-1}$, 395.6 cm$^{-1}$, 516.5 cm$^{-1}$, 601.7 cm$^{-1}$, 619.3 cm$^{-1}$, 767.8 cm$^{-1}$, 899.0 cm$^{-1}$, 1018.6 cm$^{-1}$, 1126.3 cm$^{-1}$, 1140.8 cm$^{-1}$, 1192.0 cm$^{-1}$, 1219.6 cm$^{-1}$, 1277.8 cm$^{-1}$, 1388.4 cm$^{-1}$, 1435.3 cm$^{-1}$, 1464.3 cm$^{-1}$, 1576.8 cm$^{-1}$, 1596.4 cm$^{-1}$, 1628.2 cm$^{-1}$, 1729.9 cm$^{-1}$, 2909.0 cm$^{-1}$, 3061.1 cm$^{-1}$ (each ±0.5 cm$^{-1}$).

In certain embodiments, the X-ray powder diffraction peaks together with the FT-Raman and/or the DSC melting point characterize the crystalline Form E D9-THC-naphthoylester.

In certain embodiments, the Form E crystalline D9-THC-naphthoylester is characterized by a differential scanning calorimetry thermogram exhibiting an onset at about 87.1° C. and a peak at about 93.0° C., for use in the preparation of D9-tetrahydrocannabinol.

Figure 3A:
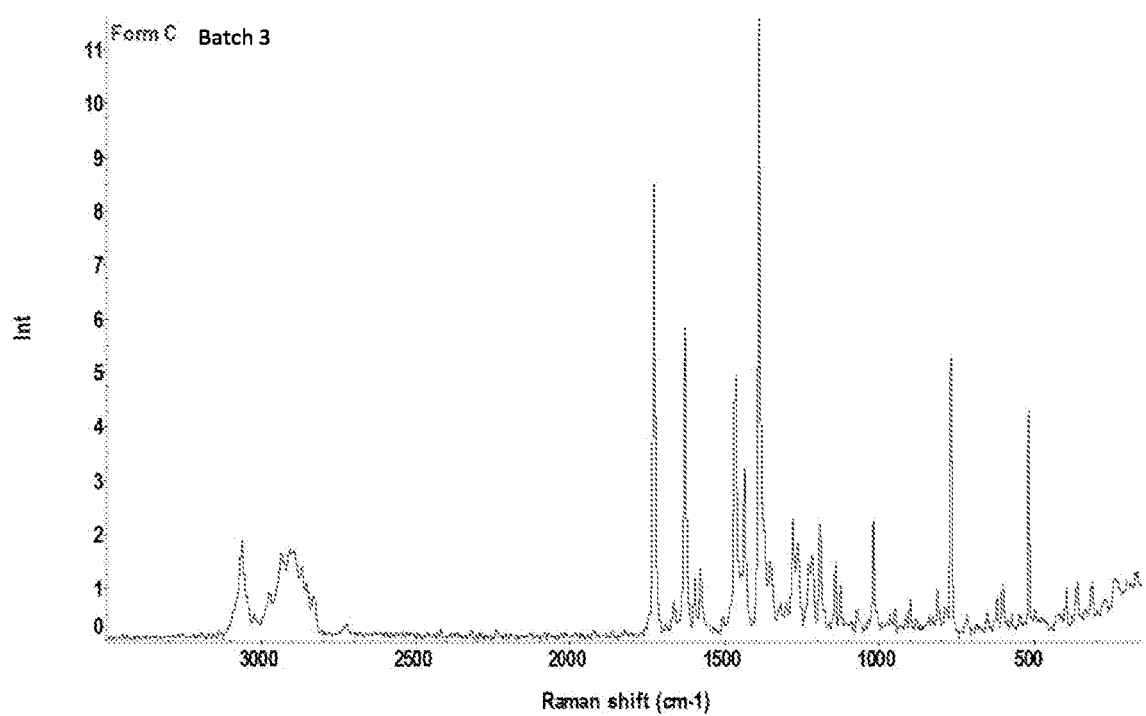
FIG. 3A depicts an FT-Raman Spectrum of Form C D9-THC-naphthoylester.
Figure 3B:
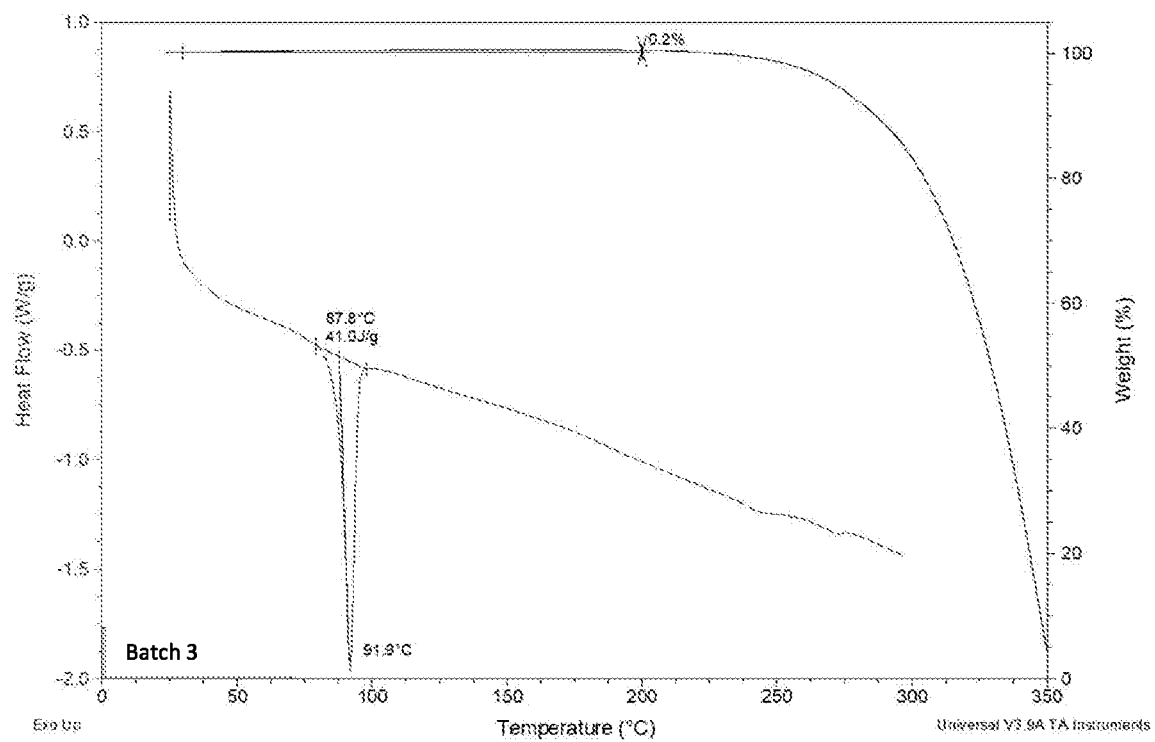
FIG. 3B depicts a combined DSC and TGA plot of Form C D9-THC-naphthoylester.
Figure 3C:
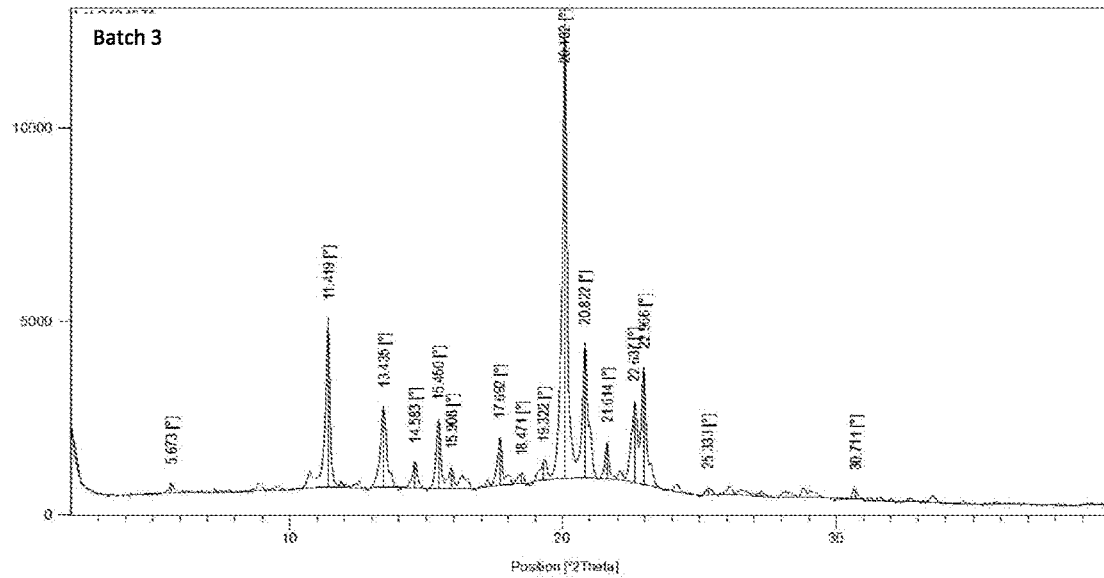
FIG. 3C depicts a PXRD pattern of Form C D9-THC-naphthoylester.
Figure 3D:
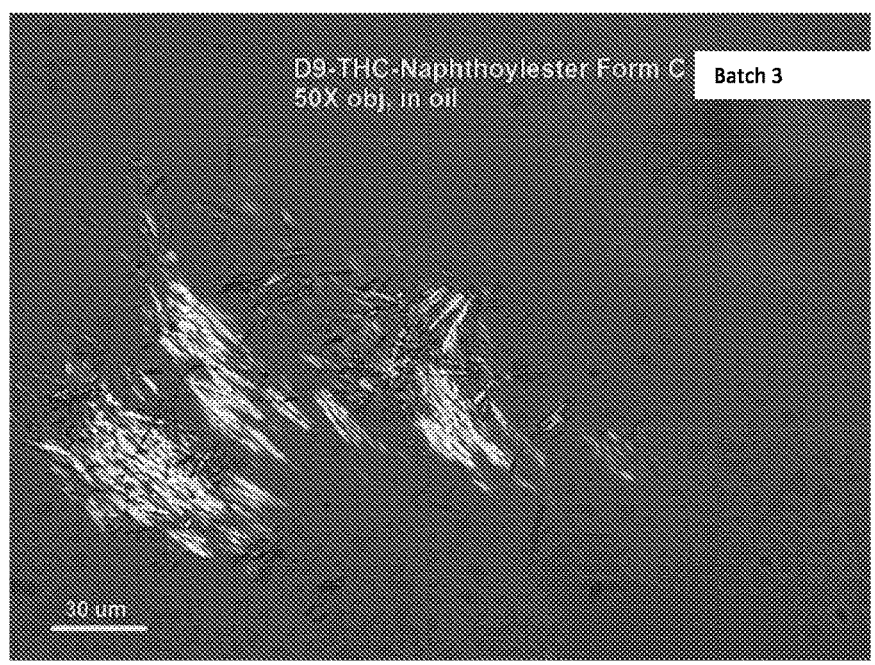
FIG. 3D depicts a PLM micrograph of Form C D9-THC-naphthoylester.
Figure 4A:
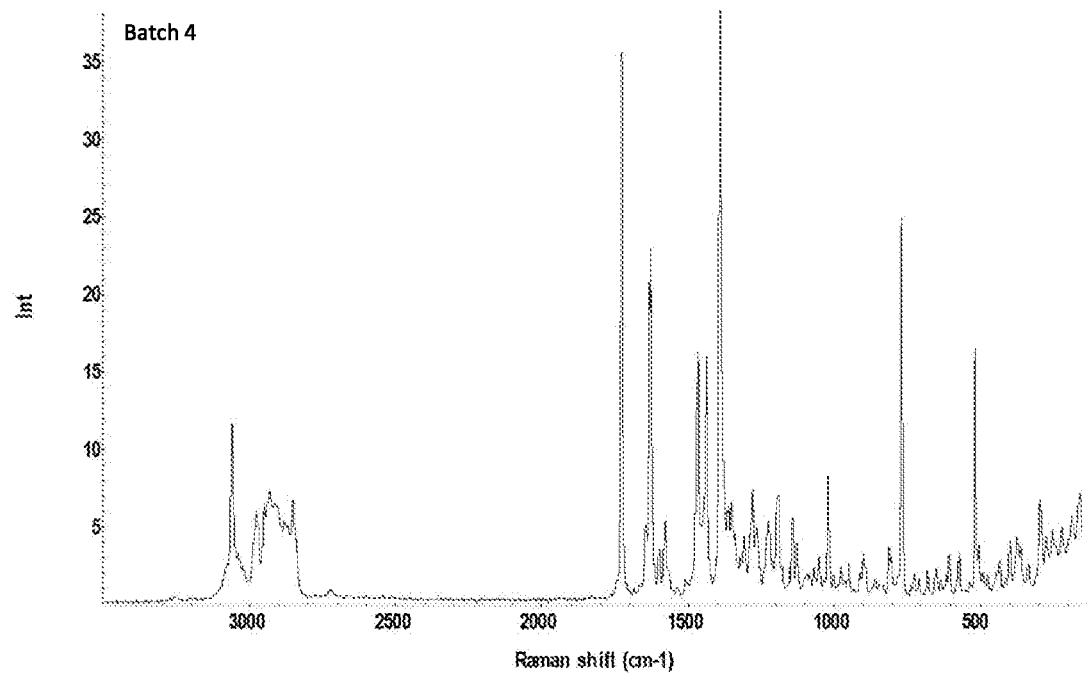
FIG. 4A depicts an FT-Raman spectrum of the Exo impurity.
Figure 4B:
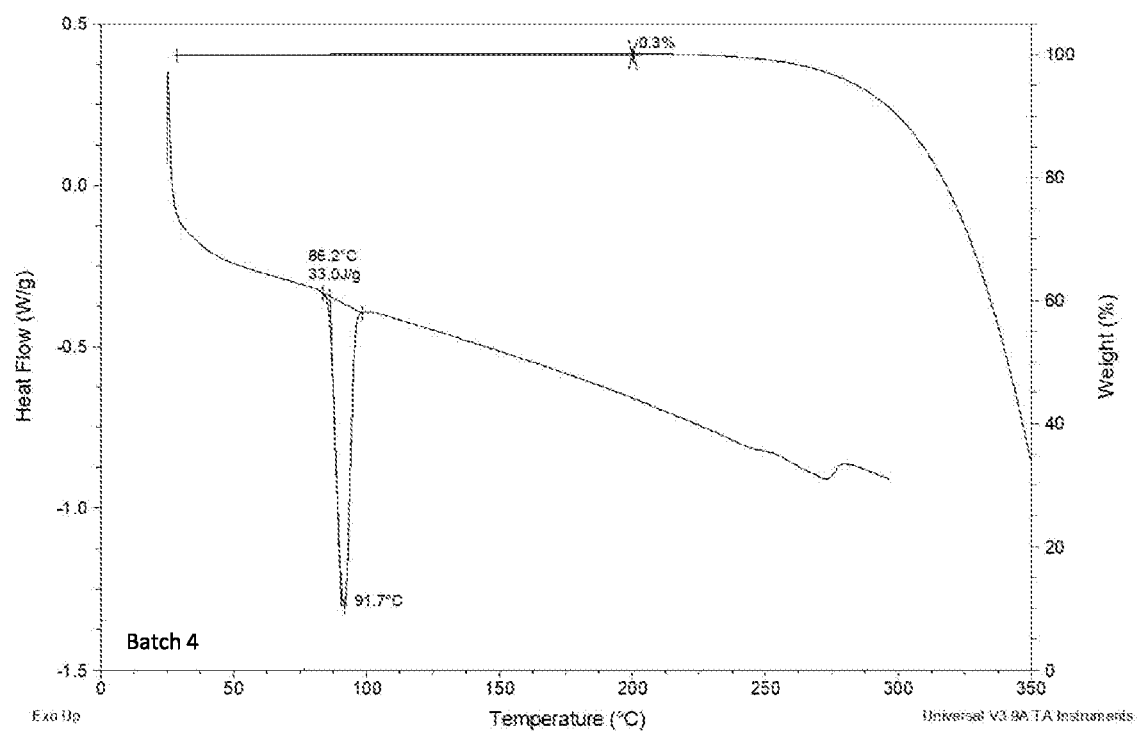
FIG. 4B depicts a combined DSC and TGA plot of the Exo impurity.
Figure 4C:
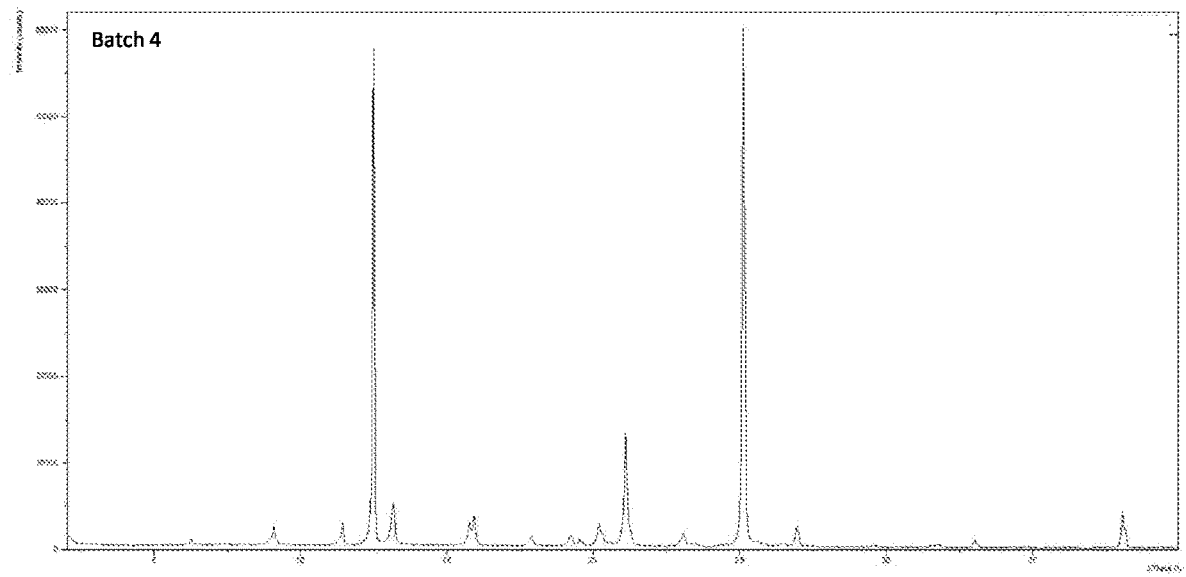
FIG. 4C depicts a PXRD pattern of the Exo impurity.
Figure 4D:
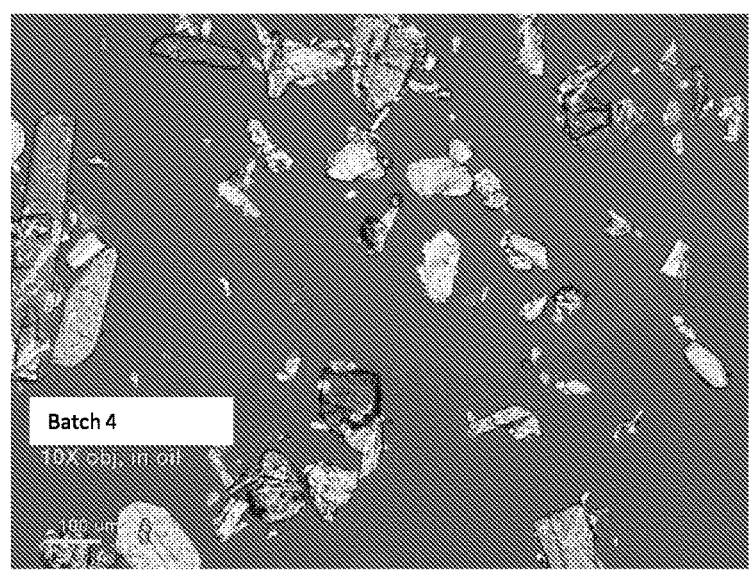
FIG. 4D depicts a PLM micrograph of the Exo impurity.
Figure 5A:
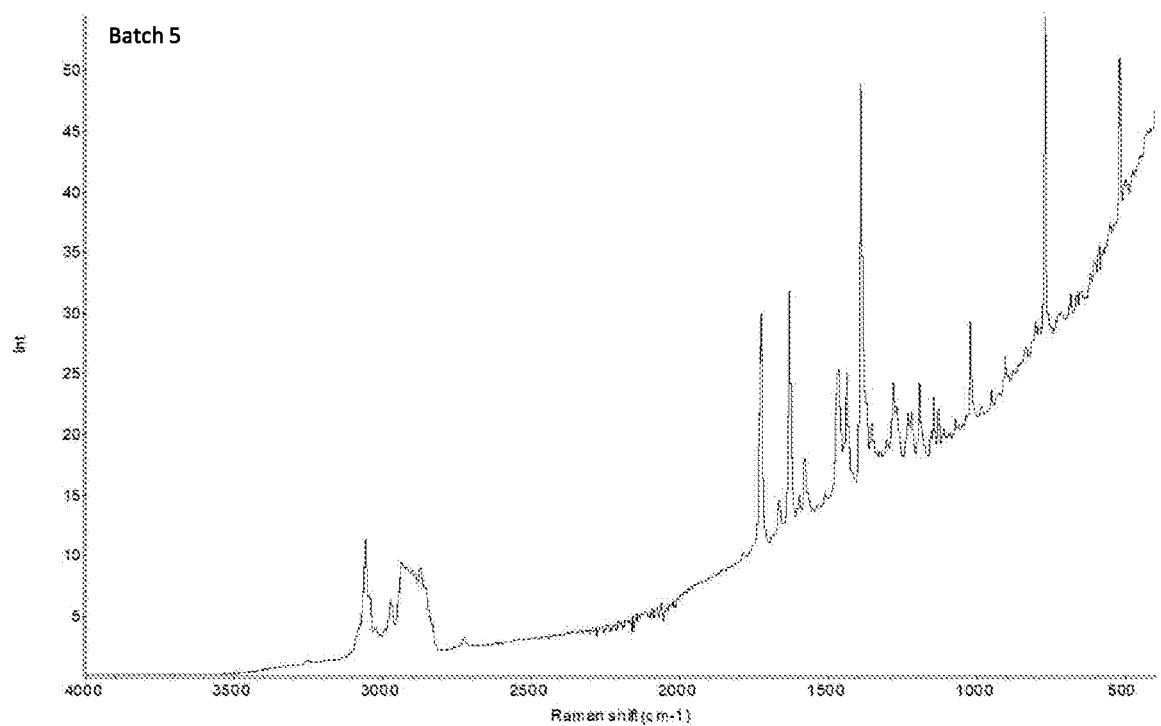
FIG. 5A depicts an FT-Raman spectrum of the Exo/D9/D8 8.2%/90.2%/1.6% impurity mixture.
Figure 5B:
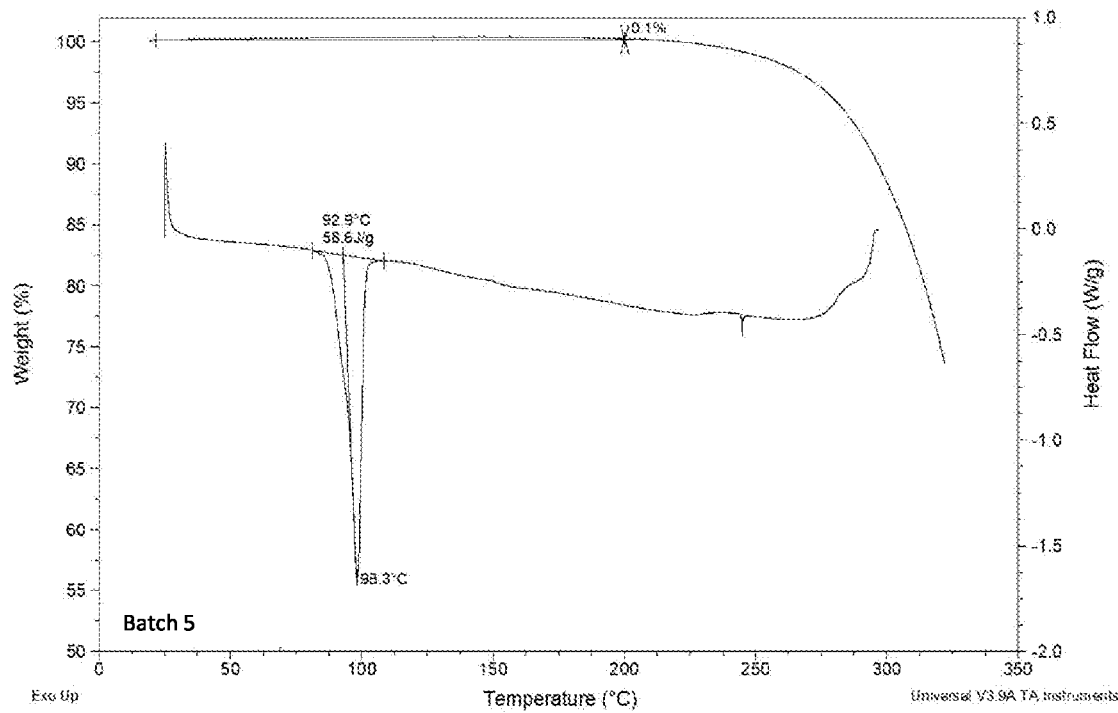
FIG. 5B depicts a combined DSC and TGA plot of the Exo/D9/D8 8.2%/90.2%/1.6% mixture.
Figure 5C:
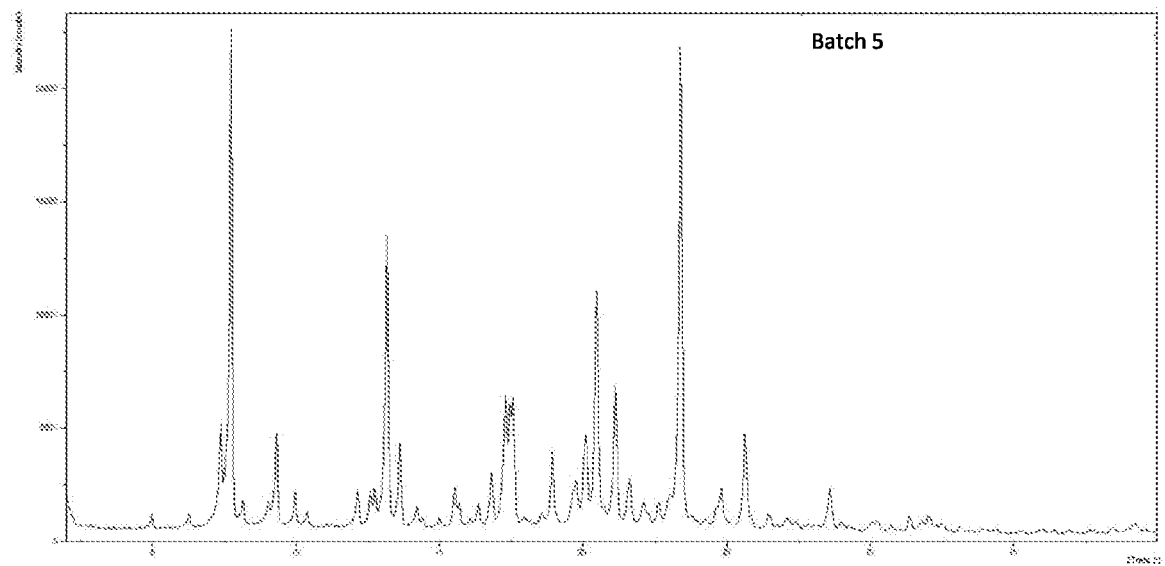
FIG. 5C depicts a PXRD pattern of the Exo/D9/D8 8.2%/90.2%/1.6% mixture.
Figure 5D:
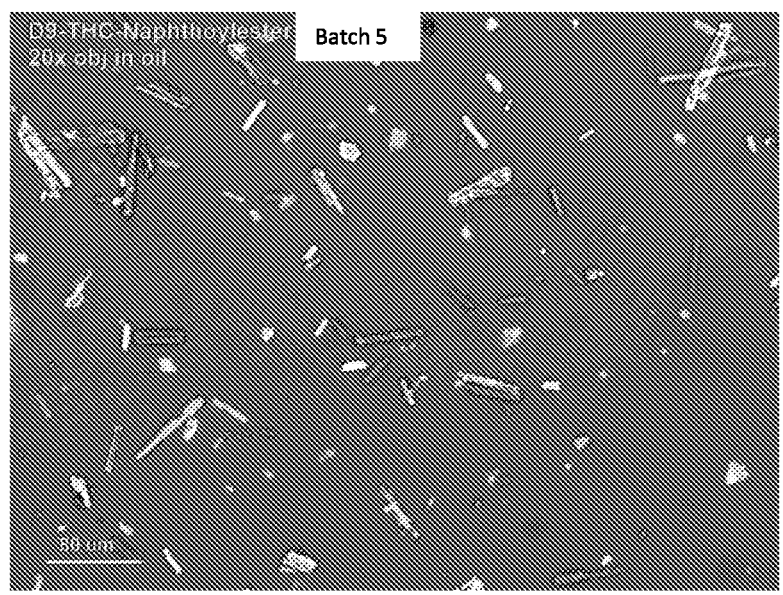
FIG. 5D depicts a PLM micrograph of the Exo/D9/D8 8.2%/90.2%/1.6% mixture.
Figure 13A:
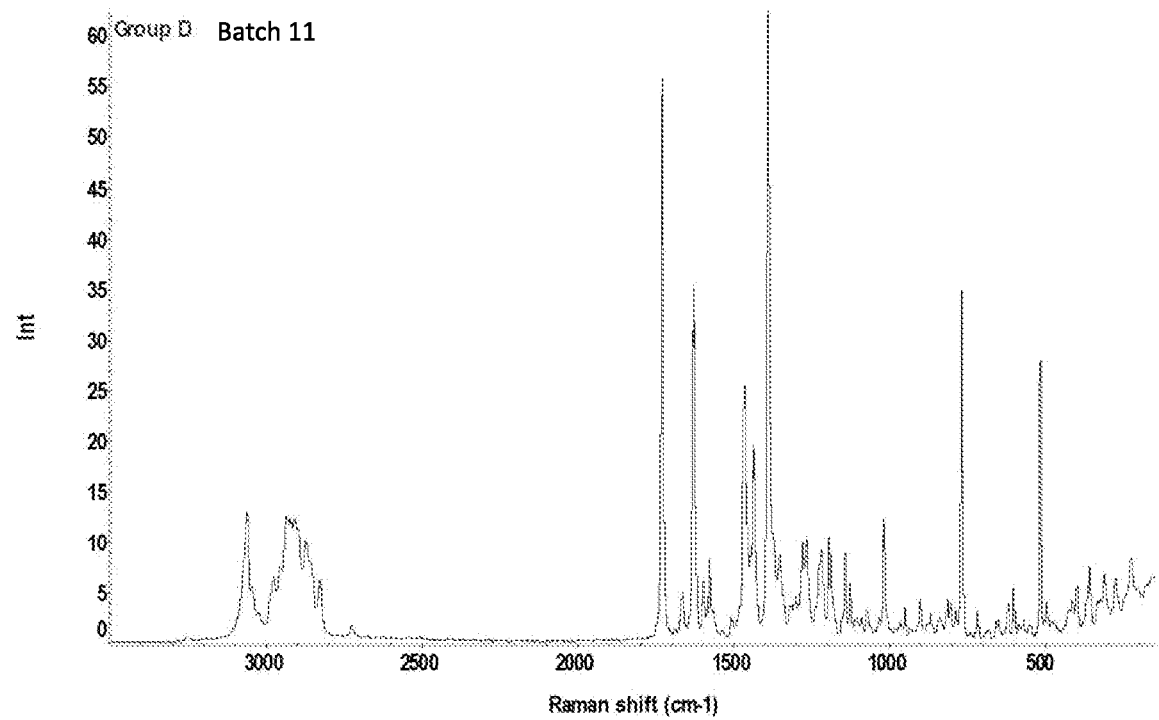
FIG. 13A depicts a FT-Raman spectrum of the DMF solvate of Group D.
Figure 13B:
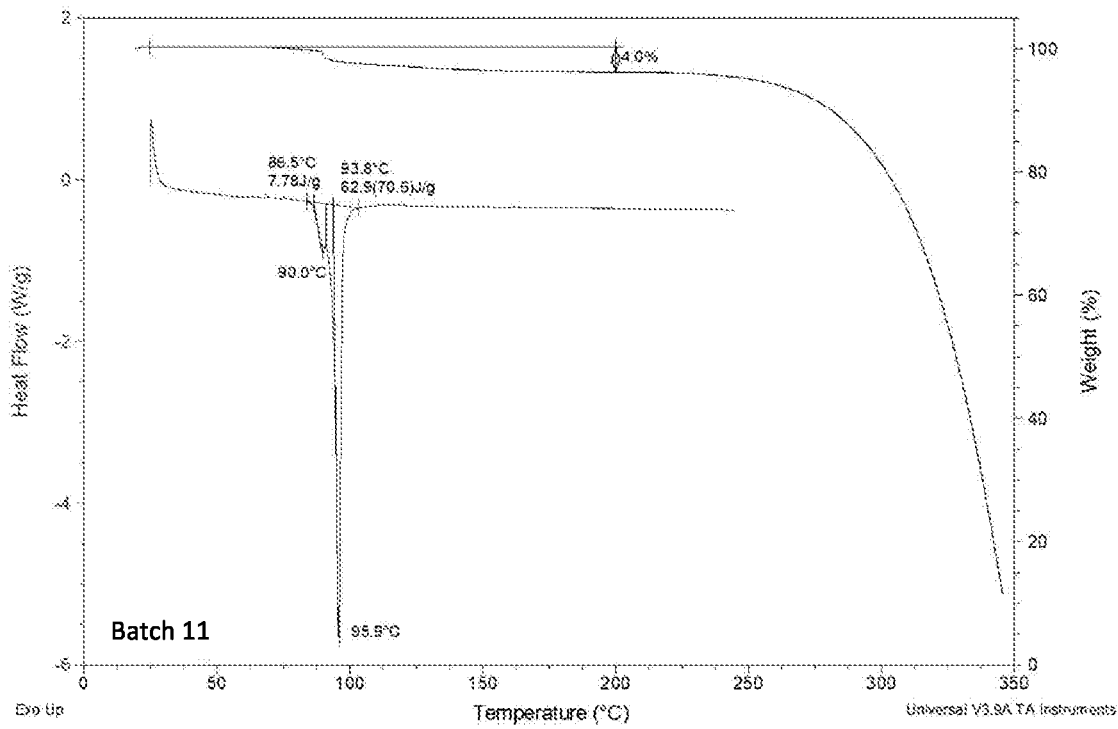
FIG. 13B depicts a combined DSC and TGA plot of the DMF solvate of Group D.
Figure 13C:
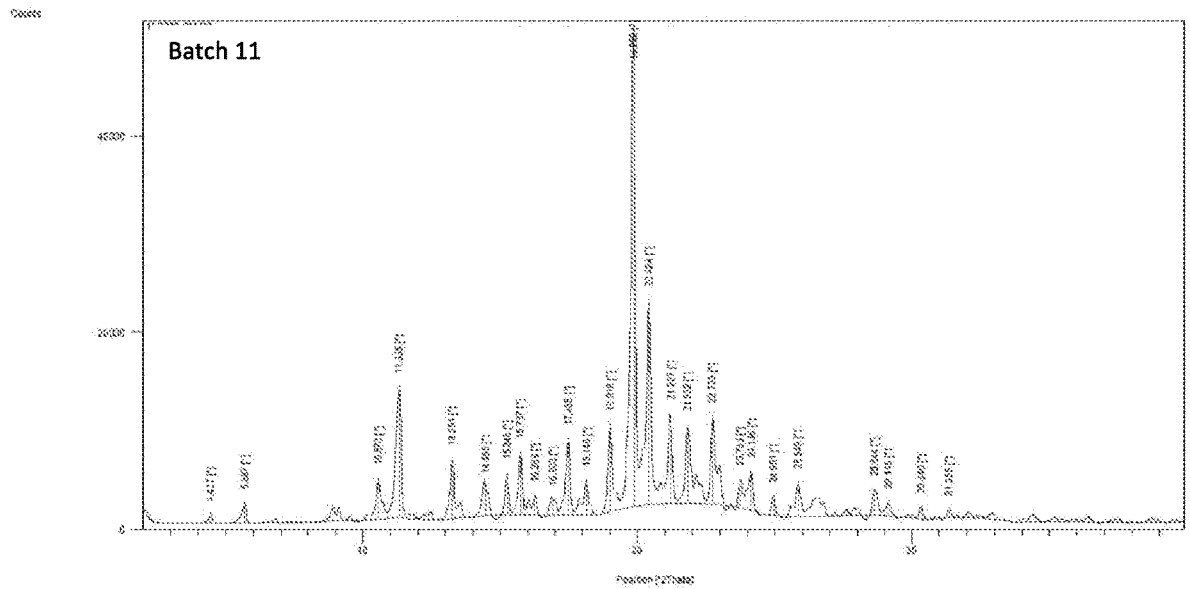
FIG. 13C depicts a PXRD pattern of the DMF solvate of Group D.
Figure 13D:
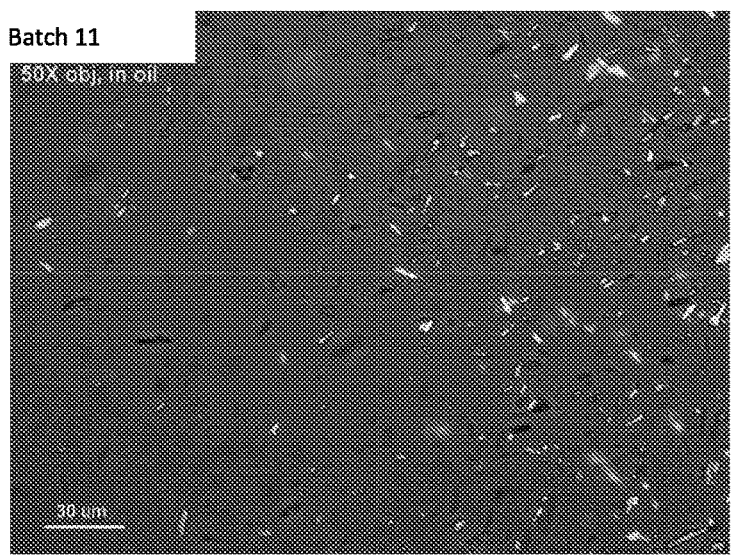
FIG. 13D depicts a PLM micrograph of the DMF solvate of Group D.
Figure 14A:
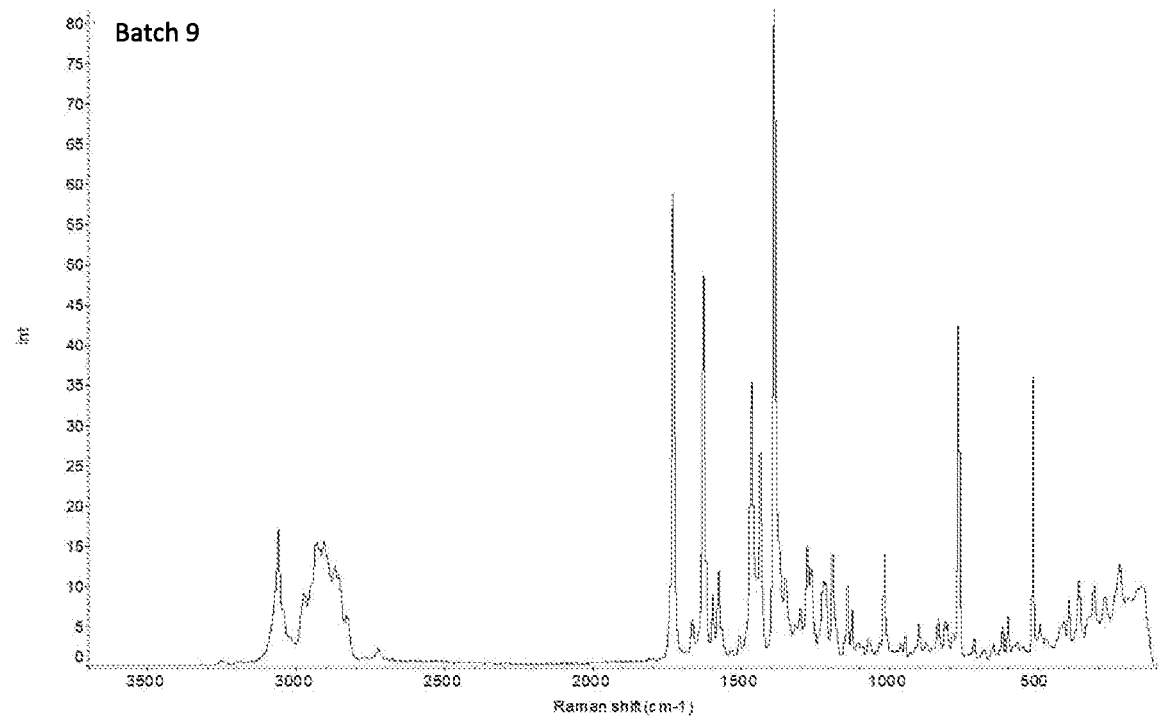
FIG. 14A depicts a FT-Raman spectrum of the 1,4-Dioxane solvate of Group D.
Figure 14B:
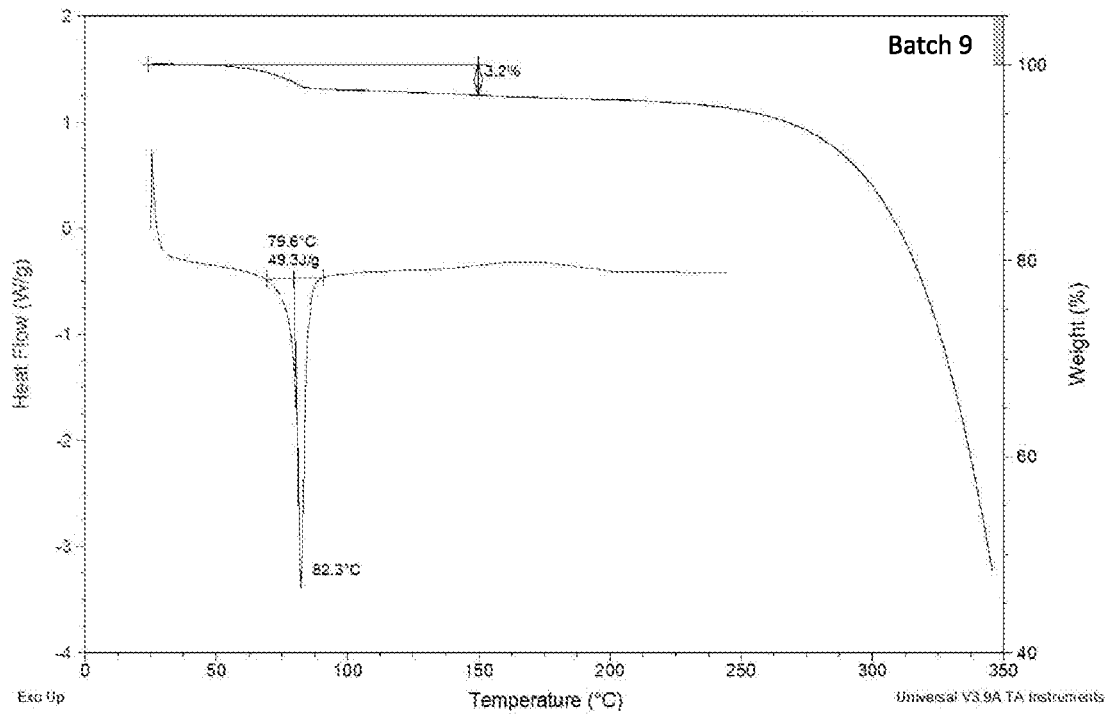
FIG. 14B depicts a combined DSC and TGA plot of the 1,4-Dioxane solvate of Group D.
Figure 14C:
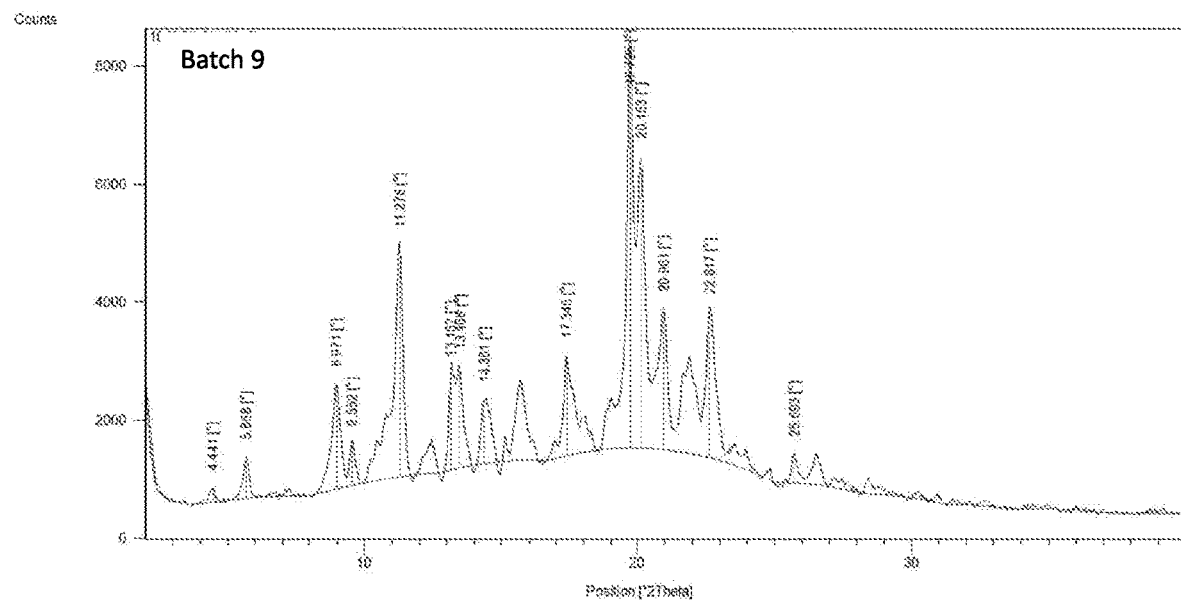
FIG. 14C depicts a PXRD pattern of the 1,4-Dioxane solvate of Group D.
Figure 14D:
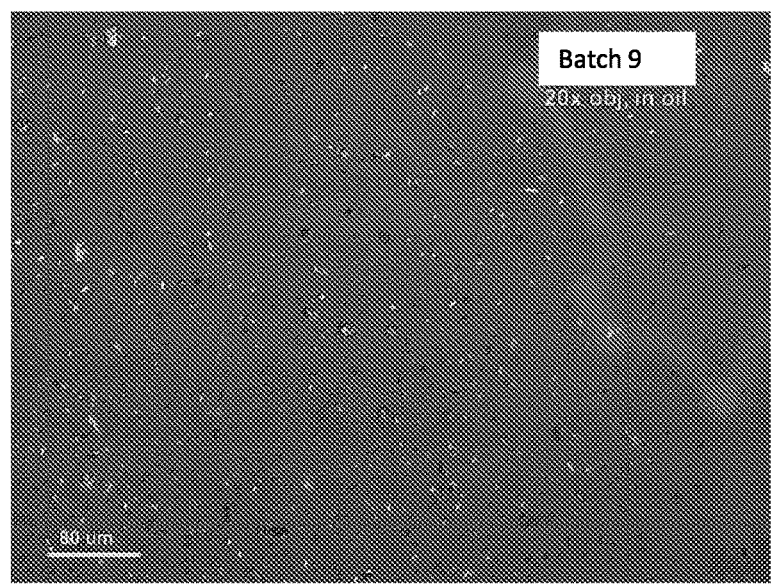
FIG. 14D depicts a PLM micrograph of the 1,4-Dioxane solvate of Group D.
Figure 15A:
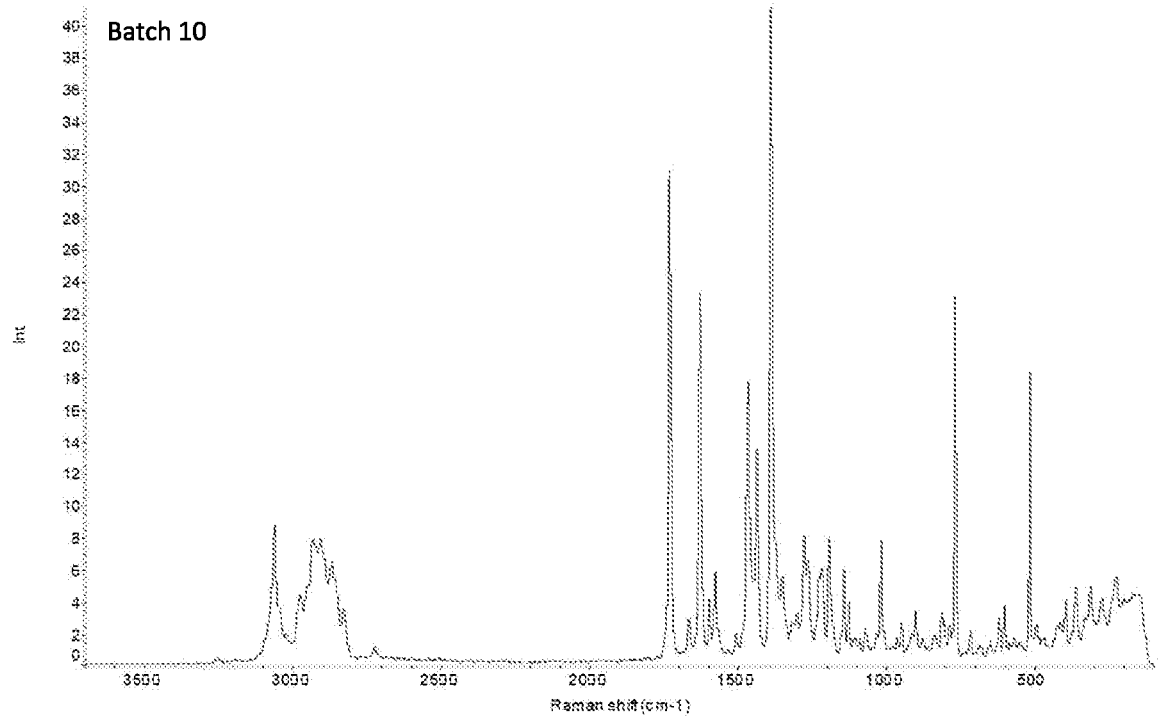
FIG. 15A depicts a FT-Raman spectrum of the THF solvate of Group D.
Figure 15B:
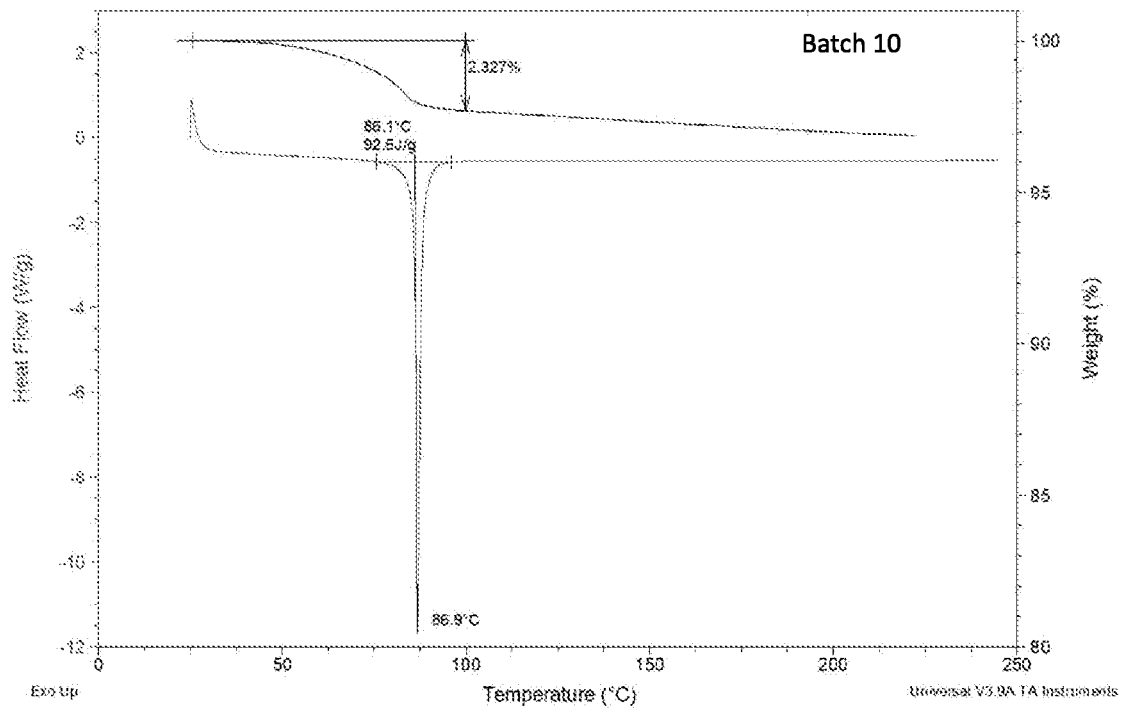
FIG. 15B depicts a combined DSC and TGA plot of the THF solvate of Group D.
Figure 15C:
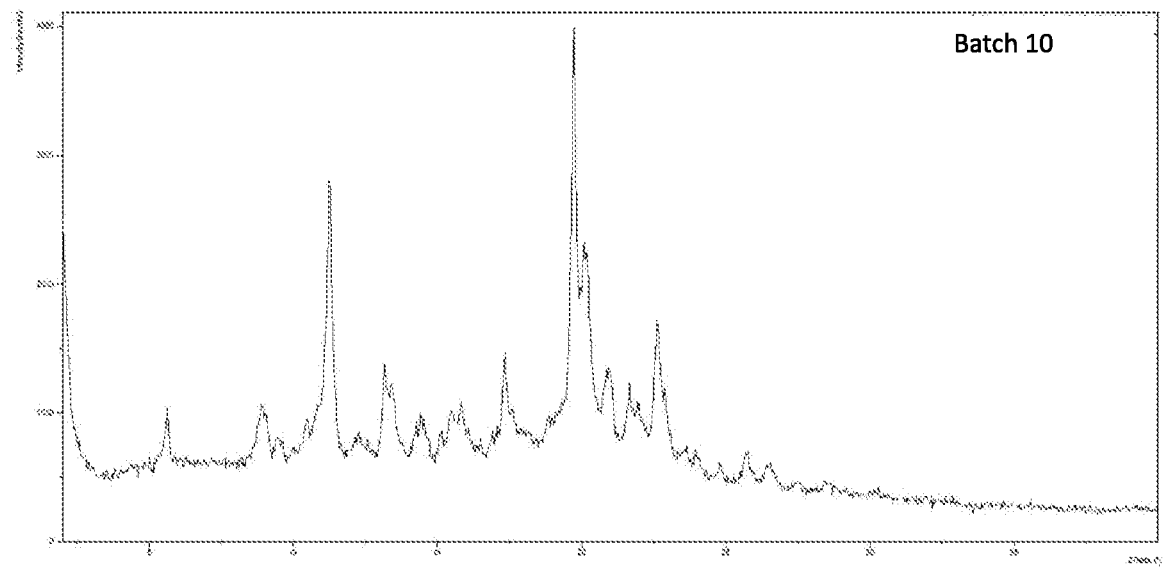
FIG. 15C depicts a PXRD pattern of the THF solvate of Group D.
Figure 15D:
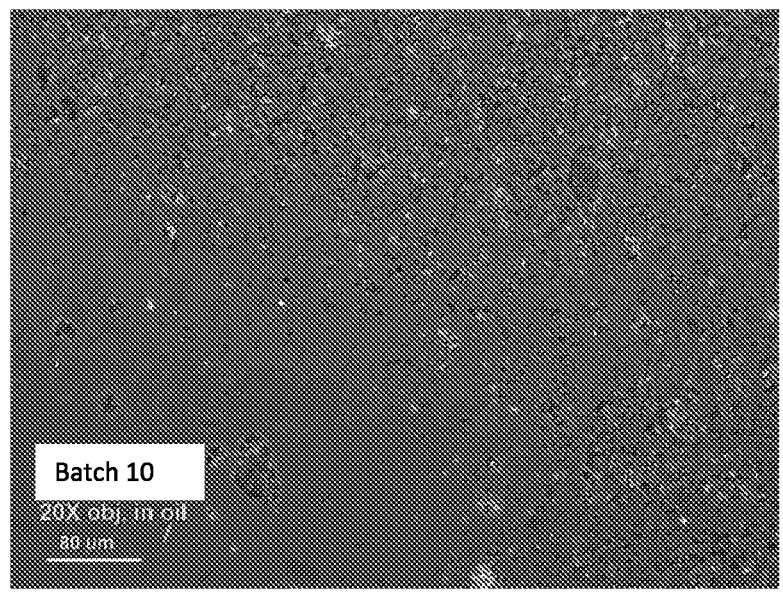
FIG. 15D depicts a PLM micrograph of the THF solvate of Group D.
Figure 18:
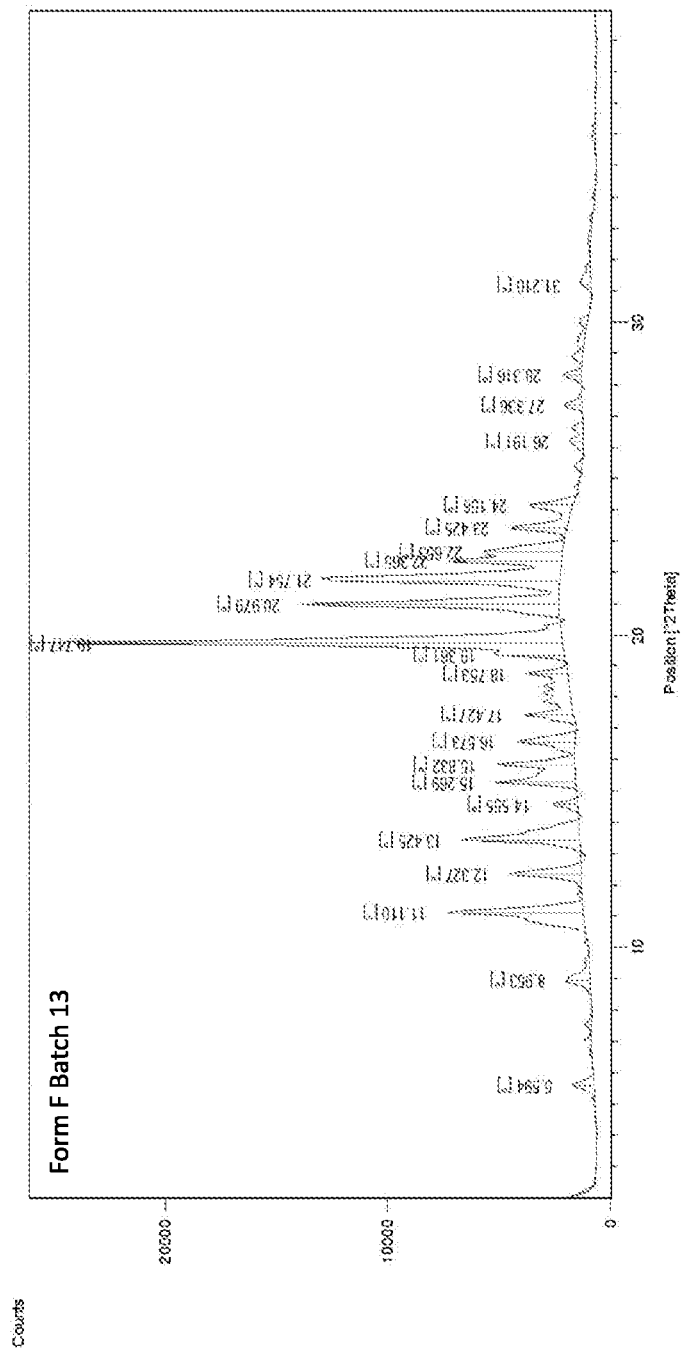
FIG. 18 depicts a PXRD pattern of Form F.

In certain embodiments, the subject matter described herein is directed to a polymorph having at least one, two or three characteristic PXRD patterns as shown in FIG. 3C. Form C is in FIG. 3C, FIG. 13C, FIG. 14C, FIG. 15C, and FIG. 18. Group D is depicted in FIG. 13C, FIG. 14C, and FIG. 15C. Form F is depicted in FIG. 18.

In certain embodiments, the subject matter described herein is directed to a pure D9-THC obtained from hydrolysis of Form C, E, F, G or H or Group D. In certain embodiments, the subject matter described herein is directed to a pharmaceutical composition comprising pure D9-THC obtained from hydrolysis of Form C, E, F, G or H or Group D and a pharmaceutically acceptable excipient.

III. Methods a. Methods of Preparing Polymorphs of D9-THC-Naphthoylester

General Procedures

General procedures for the preparation of D9-THC-naphthoylester of types A and B are described in U.S. Pat. No. 7,923,558.

D9-THC-naphthoylester acetone solvate can be prepared by solvating Form A or Form B in acetone.

D9-THC-naphthoylester of Form C can be prepared by drying the acetone solvate.

D9-THC-naphthoylesters of forms D (Group D), E, F, G, and H can be prepared by dissolving D9-THC-naphthoylester of form A or B in a suitable solvent and recrystallizing the compound according to the methods described further herein. In certain embodiments, the recrystallization may be aided with the help of a seed crystal.

b. Methods of Preparing Pure Δ9-Tetrahydrocannabinol

General methods for the preparation of Δ9-tetrahydrocannabinol are described in U.S. Pat. No. 7,923,558, which is hereby incorporated by reference.

In certain embodiments, the subject matter described herein is directed to a method of preparing pure Δ9-tetrahydrocannabinol from reaction mixtures containing a crude product containing one or more tetrahydrocannabinol compounds, wherein the one or more tetrahydrocannabinol compounds is converted to the crystalline D9-THC-naphthoylester of any one of Forms A, B, C, Group D, Forms E, F, G, or H, wherein the crystalline D9-THC-naphthoylester is crystallized out and isolated and the pure Δ9-tetrahydrocannabinol is then obtained from the crystalline D9-THC-naphthoylester. In certain embodiments, the crystalline D9-THC-naphthoylester is of Form H, E, or G. In certain embodiments, the crystalline D9-THC-naphthoylester is of Form H.

In certain embodiments, the one or more tetrahydrocannabinol compounds is Exo-D9-THC-naphthoylester. In certain embodiments, the one or more tetrahydrocannabinol compounds are D8-THC-naphthoylester and Exo-D9-THC-naphthoylester.

In certain embodiments, the conversion of the one or more tetrahydrocannabinol compounds to the crystalline D9-THC-naphthoylester of any one of Forms H, G, or E, wherein the crystalline D9-THC-naphthoylester is crystallized out and isolated and the pure Δ9-tetrahydrocannabinol is then obtained from the crystalline D9-THC-naphthoylester can produce Δ9-tetrahydrocannabinol in 80%, 81%, 82%, 83%, 84%, 85%, 86%, 87%, 88%, 89%, 90%, 91%, 92%, 93%, 94%, 95%, 96%, 97%, 98%, 99%, or 100% purity. The purity can be measured by HPLC.

In certain embodiments, the subject matter described herein is directed to a method of preparing pure Δ9-tetrahydrocannabinol from reaction mixtures containing a crude product containing one or more tetrahydrocannabinol compounds, wherein the one or more tetrahydrocannabinol compounds is converted to a first crystalline D9-THC-naphthoylester, said method comprising:

contacting the first crystalline D9-THC-naphthoylester with a first solvent to form a solution;

seeding the solution with the crystalline D9-THC-naphthoylester of any one of Forms H, G, or E to prepare a suspension;

separating a solid material from the suspension to prepare a second D9-THC-naphthoylester having a lower amount of Exo-D9-THC-naphthoylester than the first crystalline D9-THC-naphthoylester; and contacting the second D9-THC-naphthoylester with a base and a second solvent to prepare the pure Δ9-tetrahydrocannabinol.

In certain embodiments, the method proceeds at room temperature (~25° C.).

In certain embodiments, the seeding is conducted with D9-THC-naphthoylester of Form H.

In certain embodiments, the first solvent is selected from one or more of p-xylene, MeOH, water, ethanol, butanol, DMSO, nitromethane, acetone, MeCN, isopropanol, ethyl acetate, 1,4-dioxane, heptane, DMF, cyclohexanone, toluene, anisole, or butanone.

In certain embodiments, the base is selected from sodium hydroxide or diethylamine.

In certain embodiments, the second solvent is selected from one or more of p-xylene, MeOH, water, ethanol, butanol, DMSO, nitromethane, acetone, MeCN, isopropanol, ethyl acetate, 1,4-dioxane, heptane, DMF, cyclohexanone, toluene, anisole, or butanone.

In certain embodiments, contacting the second D9-THC-naphthoylester with a base and a second solvent to prepare the pure Δ9-tetrahydrocannabinol can produce Δ9-tetrahydrocannabinol in 80%, 81%, 82%, 83%, 84%, 85%, 86%, 87%, 88%, 89%, 90%, 91%, 92%, 93%, 94%, 95%, 96%, 97%, 98%, 99%, or 100% purity. The purity can be measured by HPLC.

In certain embodiments, the second D9-THC-naphthoylester prepared has a lower amount of Exo-D9-THC-naphthoylester than the first crystalline D9-THC-naphthoylester. In certain embodiments, the second D9-THC-naphthoylester has less than about 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% Exo-D9-THC-naphthoylester.

In certain embodiments, the form H, G, C or E or Group D D9-THC-naphthoylesters as described herein can purge Exo-D9-THC-naphthoylester by about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 84%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. The amount of purged Exo-D9-THC-naphthoylester can be measured by HPLC.

In certain embodiments, the form H, G, C or E or Group D D9-THC-naphthoylesters as described herein can purge D8-THC-naphthoylester by 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 84%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. The amount of purged D8-THC-naphthoylester can be measured by HPLC.

The subject matter described herein includes the following embodiments:

1. Crystalline D9-THC-naphthoylester, characterized by an X-ray powder diffraction pattern having at least one peak selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).
2. The crystalline D9-THC-naphthoylester of embodiment 1, wherein the crystalline D9-THC-naphthoylester is characterized by an X-ray powder diffraction pattern having at least two peaks selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).
3. The crystalline D9-THC-naphthoylester of embodiment 1 or 2, wherein the crystalline D9-THC-naphthoylester is characterized by an X-ray powder diffraction pattern having at least three peaks selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).
4. The crystalline D9-THC-naphthoylester of any one of embodiments 1-3, wherein the crystalline D9-THC-naphthoylester is characterized by an X-ray powder diffraction pattern having peaks at 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).
5. Crystalline D9-THC-naphthoylester, characterized by an X-ray powder diffraction pattern substantially similar to that depicted in FIG. 20C.
6. The crystalline D9-THC-naphthoylester of any one of embodiments 1-5, characterized by a differential scanning calorimetry thermogram exhibiting an onset at about 106.6° C. and a peak at about 109.6° C.
7. The crystalline D9-THC-naphthoylester of any one of embodiments 1-6, characterized by an FT-Raman spectrum having a peak at one or more of the following positions: 516.6 $cm^{-1}$, 767.8 $cm^{-1}$, 1018.7 $cm^{-1}$, 1141.2 $cm^{-1}$, 1192.2 $cm^{-1}$, 1218.6 $cm^{-1}$, 1276.9 $cm^{-1}$, 1352.8 $cm^{-1}$, 1388.5 $cm^{-1}$, 1435.4 $cm^{-1}$, 1463.6 $cm^{-1}$, 1576.8 $cm^{-1}$, 1628.3 $cm^{-1}$, 1728.3 $cm^{-1}$, 2908.4 $cm^{-1}$, and 3061.2 $cm^{-1}$ (each ±0.5° $cm^{-1}$).
8. The crystalline D9-THC-naphthoylester of any one of embodiments 1-5 or 7, characterized by a differential scanning calorimetry thermogram exhibiting an onset at about 106.6° C. and a peak at about 109.6° C., for use in the preparation of D9-tetrahydrocannabinol.
9. Crystalline D9-THC-naphthoylester, characterized by an X-ray powder diffraction pattern having at least one peak selected from the group consisting of 8.84°, 11.64°, 13.33°, 15.54°, 17.85°, 19.13°, 20.33°, 20.60°, 21.44°, and 23.42° 2θ (each ±0.20° 2θ).
10. The D9-THC-naphthoylester of embodiment 9, characterized by an X-ray powder diffraction pattern having at least two peaks selected from the group consisting of 8.84°, 11.64°, 13.33°, 15.54°, 17.85°, 19.13°, 20.33°, 20.60°, 21.44°, and 23.42° 2θ (each ±0.20° 2θ).
11. The D9-THC-naphthoylester of embodiment 9 or 10, characterized by an X-ray powder diffraction pattern having at least three peaks selected from the group consisting of 8.84°, 11.64°, 13.33°, 15.54°, 17.85°, 19.13°, 20.33°, 20.60°, 21.44°, and 23.42° 2θ (each ±0.20° 2θ).
12. The D9-THC-naphthoylester of any one of embodiments 9-11, characterized by an X-ray powder diffraction pattern having peaks at 8.84°, 11.64°, 13.33°, 15.54°, 17.85°, 19.13°, 20.33°, 20.60°, 21.44°, and 23.42° 2θ (each ±0.20° 2θ).
13. Crystalline D9-THC-naphthoylester, characterized by an X-ray powder diffraction pattern substantially similar to that depicted in FIG. 19C.
14. The crystalline D9-THC-naphthoylester of any one of embodiments 9-13, characterized by a differential scanning calorimetry thermogram exhibiting an onset at about 106.5° C. and a peak at about 108.3° C.
15. The crystalline D9-THC-naphthoylester of any one of embodiments 9-14, characterized by an FT-Raman spectrum comprising a peak at one or more of the following positions: 226.1 $cm^{-1}$, 313.3 $cm^{-1}$, 360.0 $cm^{-1}$, 396.1 $cm^{-1}$, 516.9 $cm^{-1}$, 768.0 $cm^{-1}$, 1019.0 $cm^{-1}$, 1141.7 $cm^{-1}$, 1192.4 $cm^{-1}$, 1219.3 $cm^{-1}$, 1276.9 $cm^{-1}$, 1388.6 $cm^{-1}$, 1435.8 $cm^{-1}$, 1464.4 $cm^{-1}$, 1577.0 $cm^{-1}$, 1596.8 $cm^{-1}$, 1628.4 $cm^{-1}$, 1728.5 $cm^{-1}$, 2908.2 $cm^{-1}$, and 3061.3 $cm^{-1}$ (each ±0.5 $cm^{-1}$).
16. The crystalline D9-THC-naphthoylester of any one of embodiments 9-13 or 15, characterized by a differential scanning calorimetry thermogram exhibiting an onset at about 106.5° C. and a peak at about 108.3° C., for use in the preparation of D9-tetrahydrocannabinol.
17. Crystalline D9-THC-naphthoylester, characterized by an X-ray powder diffraction pattern having at least one peak selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

18. The crystalline D9-THC-naphthoylester of embodiment 17, characterized by an X-ray powder diffraction pattern having at least two peaks selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

19. The crystalline D9-THC-naphthoylester of embodiment 17 or 18, characterized by an X-ray powder diffraction pattern having at least three peaks selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

20. The crystalline D9-THC-naphthoylester of any one of embodiments 17-19, characterized by an X-ray powder diffraction pattern having peaks at 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

21. Crystalline D9-THC-naphthoylester, characterized by an X-ray powder diffraction pattern substantially similar to that depicted in FIG. 16C.

22. The crystalline D9-THC-naphthoylester of any one of embodiments 17-21, characterized by a differential scanning calorimetry thermogram exhibiting an onset at about 87.1° C. and a peak at about 93.0° C.

23. The crystalline D9-THC-naphthoylester of any one of embodiments 17-22, characterized by an FT-Raman spectrum having a peak at one or more of the following positions: 225.0 $cm^{-1}$, 312.4 $cm^{-1}$, 359.2 $cm^{-1}$, 395.6 $cm^{-1}$, 516.5 $cm^{-1}$, 601.7 $cm^{-1}$, 619.3 $cm^{-1}$, 767.8 $cm^{-1}$, 899.0 $cm^{-1}$, 1018.6 $cm^{-1}$, 1126.3 $cm^{-1}$, 1140.8 $cm^{-1}$, 1192.0 $cm^{-1}$, 1219.6 $cm^{-1}$, 1277.8 $cm^{-1}$, 1388.4 $cm^{-1}$, 1435.3 $cm^{-1}$, 1464.3 $cm^{-1}$, 1576.8 $cm^{-1}$, 1596.4 $cm^{-1}$, 1628.2 $cm^{-1}$, 1729.9 $cm^{-1}$, 2909.0 $cm^{-1}$, 3061.1 $cm^{-1}$ (each ±0.5 $cm^{-1}$).

24. The crystalline D9-THC-naphthoylester of any one of embodiments 17-21 or 23, characterized by a differential scanning calorimetry thermogram exhibiting an onset at about 87.1° C. and a peak at about 93.0° C., for use in the preparation of D9-tetrahydrocannabinol.

25. A method of preparing pure Δ9-tetrahydrocannabinol from reaction mixtures containing a crude product containing one or more tetrahydrocannabinol compounds, wherein said one or more tetrahydrocannabinol compounds is converted to the crystalline D9-THC-naphthoylester of any one of embodiments 1-7, 9-15, or 17-23, wherein said crystalline D9-THC-naphthoylester is crystallized out and isolated and the pure Δ9-tetrahydrocannabinol is then obtained from the crystalline D9-THC-naphthoylester.

26. A method of preparing pure Δ9-tetrahydrocannabinol from reaction mixtures containing a crude product containing one or more tetrahydrocannabinol compounds, wherein said one or more tetrahydrocannabinol compounds is converted to a first crystalline D9-THC-naphthoylester, said method comprising:

contacting said first crystalline D9-THC-naphthoylester with a first solvent to form a solution;

seeding said solution with the crystalline D9-THC-naphthoylester of any one of embodiments 1-7, 9-15, or 17-23 to prepare a suspension;

separating a solid material from said suspension to prepare a second D9-THC-naphthoylester having a lower amount of Exo-D9-THC-naphthoylester than said first crystalline D9-THC-naphthoylester; and contacting said second D9-THC-naphthoylester with a base and a second solvent to prepare said pure Δ9-tetrahydrocannabinol.

The disclosed subject matter is further described in the following non-limiting Examples. It should be understood that these Examples, while indicating preferred embodiments of the invention, are given by way of illustration only.

EXAMPLES

Methods

FT-Raman Spectroscopy. Raman spectra were collected with a Nicolet NXR9650 or NXR 960 spectrometer (Thermo Electron) equipped with a 1064 nm Nd:YVO4 excitation laser, InGaAs and liquid-N2 cooled Ge detectors, and a MicroStage. All spectra were acquired at 4 $cm^{-1}$ resolution, 64 scans, using Happ-Genzel apodization function and 2-level zero-filling.

Polarized-Light Microscopy (PLM). The photomicrographs were collected using an Olympus BX60 polarized-light microscope equipped with an Olympus DP70 camera.

Powder X-Ray Diffraction (PXRD). PXRD diffractograms were acquired on a PANalytical X'Pert Pro diffractometer using Ni-filtered Cu Kα (45 kV/40 mA) radiation and a step size of 0.03° 2θ and X'celerator™ RTMS (Real Time Multi-Strip) detector. Configuration on the incidental beam side: variable divergence slits (10 mm irradiated length), 0.04 rad Soller slits, fixed anti-scatter slit (0.50 o), and 10 mm beam mask. Configuration on the diffracted beam side: variable anti-scatter slit (10 mm observed length) and 0.04 rad Soller slit. Samples were mounted flat on zero-background Si wafers.

Differential Scanning calorimetry (DSC). DSC was conducted with a TA Instruments Q100 or Q2000 differential scanning calorimeter equipped with an autosampler and a refrigerated cooling system under 40 mL/min $N_2$ purge. DSC thermograms of screening samples were obtained at 10° C./min or 15° C./min in crimped Al pans.

Thermogravimetric Analysis (TGA). TGA thermograms were obtained with a TA Instruments Q50 thermogravimetric analyzer under 40 mL/min $N_2$ purge in Pt or Al pans. TGA thermograms of screening samples were obtained at 10° C./min Thermogravimetric Analysis with IR Off-Gas Detection (TGA-IR). TGA-IR was conducted with a TA Instruments Q5000 thermogravimetric analyzer interfaced to a Nicolet 6700 FT-IR spectrometer (Thermo Electron) equipped with an external TGA-IR module with a gas flow cell and DTGS detector. TGA was conducted with 25 mL/min $N_2$ flow and a heating rate of 15° C./min in Pt or Al pans. IR spectra were collected at 4 $cm^{-1}$ resolution and 32 scans at each time point.

High-performance Liquid Chromatography (HPLC). HPLC analyses were conducted with an Agilent 1260 Infinity system equipped with a G1311B Quad pump, G1329B Autosampler, G1330B autosampler thermostat, G1316A Thermostatted Column Compartment, and G4212B diode array detector.

Proton Nuclear Magnetic Resonance (1HNMR). The $^1$H NMR spectra were collected using an Agilent DD2 500 MHz spectrometer with a TMS reference. Samples were dissolved in DMSO-d6.

Materials

D9-THC-naphthoylester of Form A, Form B, Form C, Exo-impurity, and Exo/D9/D8 mixtures were prepared for each of the Examples below.

Example 1: Solid-State Characterization of Starting Materials

Figure 1B:
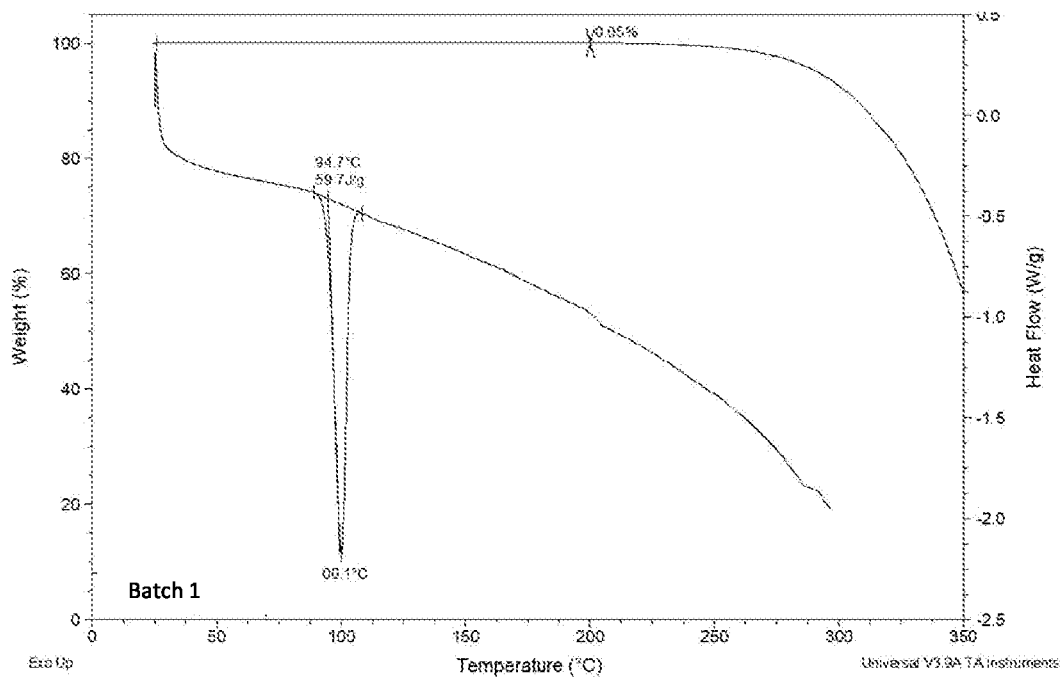
FIG. 1B depicts a combined DSC and TGA plot of Form A D9-THC-naphthoylester.
Figure 1C:
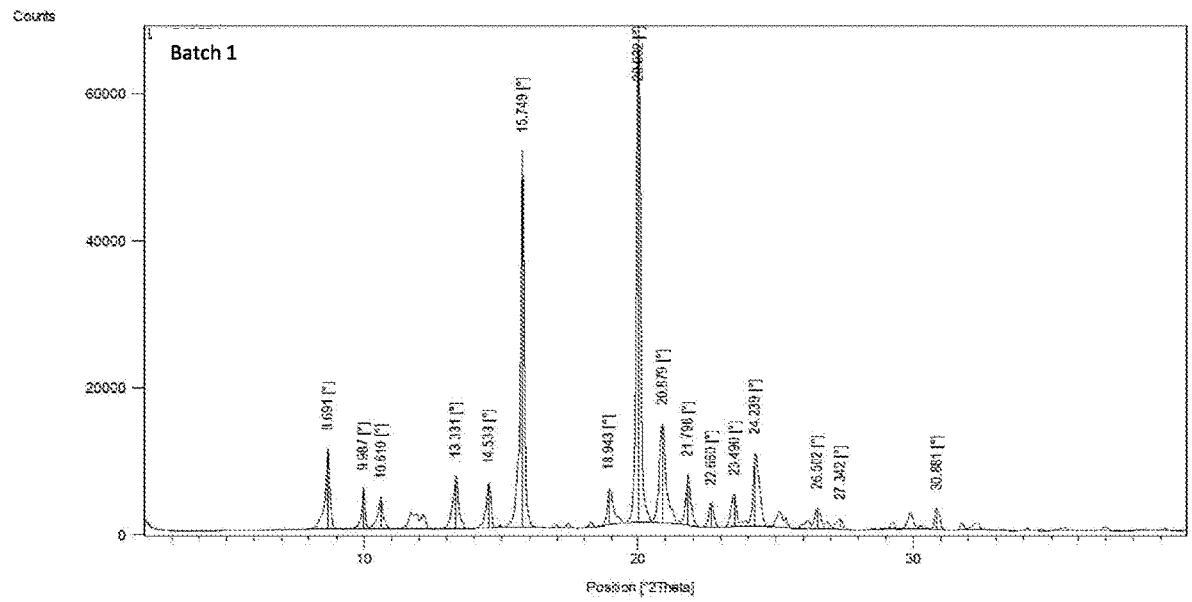
FIG. 1C depicts a PXRD pattern of Form A D9-THC-naphthoylester.
Figure 1D:
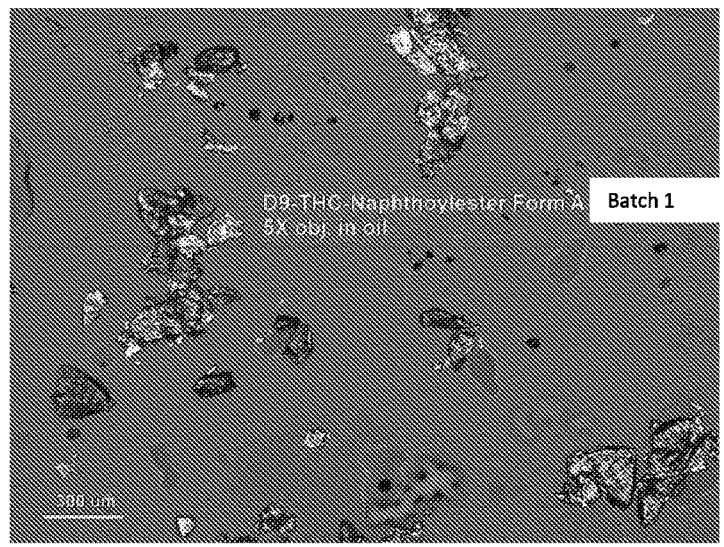
FIG. 1D depicts a PLM micrograph of Form A D9-THC-naphthoylester.
Figure 2A:
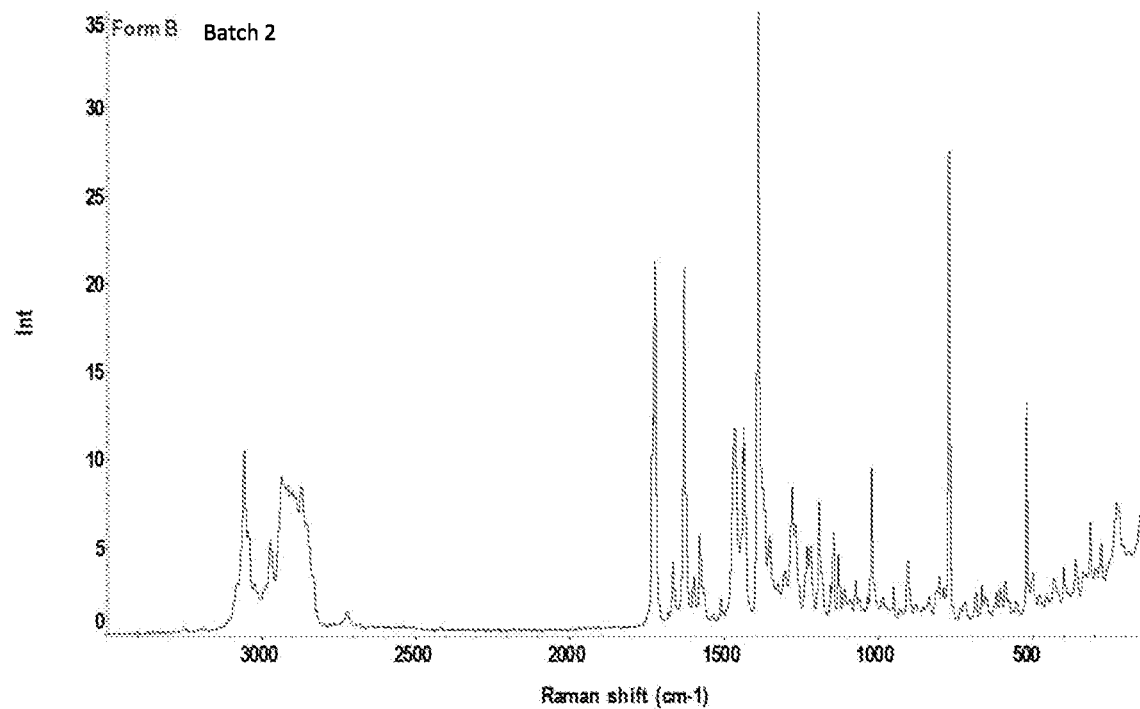
FIG. 2A depicts an FT-Raman spectrum of Form B D9-THC-naphthoylester.
Figure 2B:
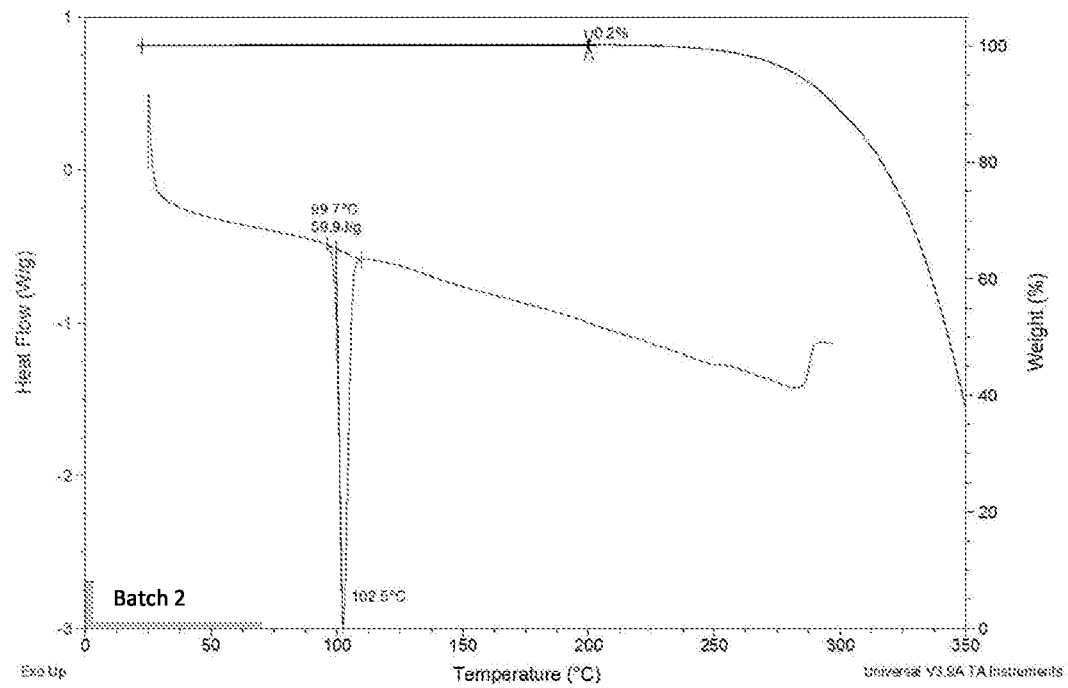
FIG. 2B depicts a combined DSC and TGA plot of Form B D9-THC-naphthoylester.
Figure 2C:
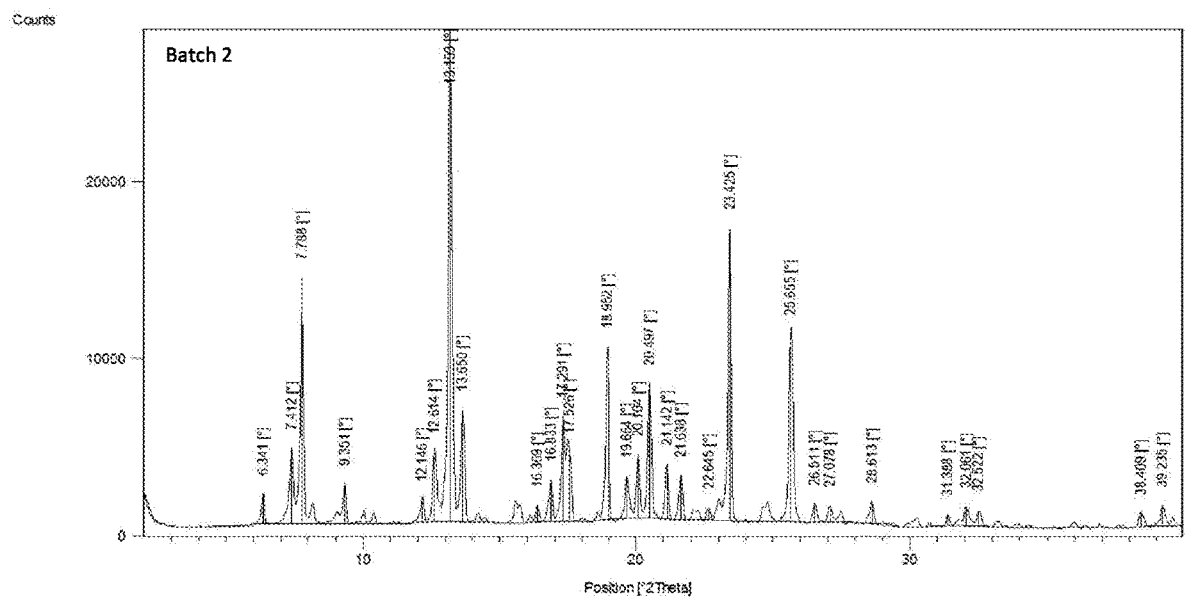
FIG. 2C depicts a PXRD pattern of Form B D9-THC-naphthoylester.
Figure 2D:
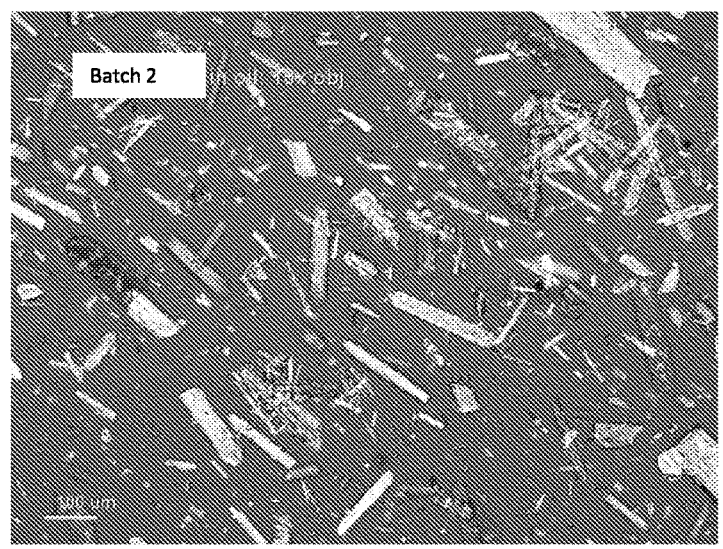
FIG. 2D depicts a PLM micrograph of Form B D9-THC-naphthoylester.

The characterization data for Form A D9-THC-naphthoylester (Batch 1) is presented in FIG. 1A through FIG. 1D. Form A was crystalline by PXRD and PLM. DSC analysis showed a melt endotherm with onset at 94.7° C. (ΔH=59.7 J/g). TGA analysis showed <0.1% wt. loss from 25 to 200° C. (FIG. 1B). Table 1 shows the peak list corresponding with the powder x-ray diffraction pattern in FIG. 1C.

TABLE 1

| Pos. [°2Th.] | Height [cts] | d-spacing [Å] | Rel. Int. [%] |
|---|---|---|---|
| 8.69 | 10888.85 | 10.17 | 16.04 |
| 9.99 | 5367.15 | 8.86 | 7.90 |
| 10.61 | 4230.28 | 8.34 | 6.23 |
| 13.33 | 7187.71 | 6.64 | 10.59 |
| 14.53 | 6063.65 | 6.09 | 8.93 |
| 15.75 | 51151.27 | 5.63 | 75.33 |
| 18.94 | 4864.64 | 4.68 | 7.16 |
| 20.03 | 67898.48 | 4.43 | 100.00 |
| 20.88 | 13489.32 | 4.25 | 19.87 |
| 21.80 | 6861.39 | 4.08 | 10.11 |
| 22.66 | 3160.49 | 3.92 | 4.65 |
| 23.49 | 4355.72 | 3.79 | 6.42 |
| 24.24 | 9923.90 | 3.67 | 14.62 |
| 26.50 | 2691.83 | 3.36 | 3.96 |
| 27.34 | 1385.74 | 3.26 | 2.04 |
| 30.88 | 2773.54 | 2.90 | 4.08 |

The characterization data for Form B D9-THC-naphthoylester (Batch 2) is presented in FIG. 2A-FIG. 2D. Form B D9-THC-naphthoylester was crystalline by PXRD and PLM. DSC analysis showed a melt endotherm with an onset at 99.7° C. (ΔH=59.9 J/g). TGA analysis showed 0.2% wt. loss from 25 to 200° C. Table 2 shows the peak list corresponding with the x-ray diffraction pattern in FIG. 2C.

TABLE 2

| Pos. [°2Th.] | Height [cts] | d-spacing [Å] | Rel. Int. [%] |
|---|---|---|---|
| 6.34 | 1721.11 | 13.94 | 6.10 |
| 7.41 | 4297.87 | 11.93 | 15.24 |
| 7.79 | 13984.66 | 11.35 | 49.60 |
| 9.35 | 2289.09 | 9.46 | 8.12 |
| 12.15 | 1225.65 | 7.29 | 4.35 |
| 12.61 | 3936.00 | 7.02 | 13.96 |
| 13.20 | 28194.58 | 6.71 | 100.00 |
| 13.65 | 6342.20 | 6.49 | 22.49 |
| 16.37 | 927.78 | 5.42 | 3.29 |
| 16.83 | 2318.57 | 5.27 | 8.22 |
| 17.29 | 5916.05 | 5.13 | 20.98 |
| 17.53 | 3907.14 | 5.06 | 13.86 |
| 18.95 | 9714.99 | 4.68 | 34.46 |
| 19.66 | 2370.82 | 4.51 | 8.41 |
| 20.10 | 3580.21 | 4.42 | 12.70 |
| 20.50 | 7579.57 | 4.33 | 26.88 |
| 21.14 | 3154.03 | 4.20 | 11.19 |
| 21.64 | 2511.74 | 4.11 | 8.91 |
| 22.65 | 696.29 | 3.93 | 2.47 |
| 23.43 | 16572.44 | 3.80 | 58.78 |
| 25.65 | 10661.57 | 3.47 | 37.81 |
| 26.51 | 1063.28 | 3.36 | 3.77 |
| 27.08 | 904.96 | 3.29 | 3.21 |
| 28.61 | 1255.97 | 3.12 | 4.45 |
| 31.39 | 612.53 | 2.85 | 2.17 |

TABLE 2-continued

| Pos. [°2Th.] | Height [cts] | d-spacing [Å] | Rel. Int. [%] |
|---|---|---|---|
| 32.06 | 1078.13 | 2.79 | 3.82 |
| 32.52 | 867.85 | 2.75 | 3.08 |
| 38.41 | 711.09 | 2.34 | 2.52 |
| 39.23 | 1143.00 | 2.30 | 4.05 |

The characterization data for Form C D9-THC-naphthoylester (Batch 3) is presented in FIG. 3A-FIG. 3D. Form C D9-THC-naphthoylester was crystalline by PXRD and PLM. DSC analysis showed a melt endotherm with an onset at 87.8° C. (ΔH=41.0 J/g). TGA analysis showed 0.2% wt. loss from 25 to 200° C. Table 3 shows the peak list corresponding with the x-ray diffraction pattern in FIG. 3C.

TABLE 3

| Pos. [°2Th.] | Height [cts] | d-spacing [Å] | Rel. Int. [%] |
|---|---|---|---|
| 5.67 | 239.22 | 15.58 | 1.96 |
| 11.42 | 4360.51 | 7.75 | 35.81 |
| 13.43 | 2082.41 | 6.59 | 17.10 |
| 14.58 | 670.84 | 6.07 | 5.51 |
| 15.45 | 1790.88 | 5.74 | 14.71 |
| 15.91 | 541.92 | 5.57 | 4.45 |
| 17.69 | 1209.65 | 5.01 | 9.93 |
| 18.47 | 226.92 | 4.80 | 1.86 |
| 19.32 | 509.97 | 4.59 | 4.19 |
| 20.10 | 12178.04 | 4.42 | 100.00 |
| 20.82 | 3488.85 | 4.27 | 28.65 |
| 21.61 | 972.27 | 4.11 | 7.98 |
| 22.64 | 2115.55 | 3.93 | 17.37 |
| 22.97 | 3018.66 | 3.87 | 24.79 |
| 25.33 | 194.38 | 3.52 | 1.60 |
| 30.71 | 275.03 | 2.91 | 2.26 |

The characterization data for the Exo-impurity (Batch 4) are presented in FIG. 4A-FIG. 4D. The Exo-impurity was crystalline by PXRD and PLM. DSC analysis showed a melt endotherm with an onset at 86.2° C. (ΔH=33.0 J/g). TGA analysis showed 0.3% wt. loss from 25 to 200° C.

The characterization data for the crude Exo-D9-THC-naphthoylester impurity/D9-THC-naphthoylester/D8-THC-naphthoylester 8.2%/90.2%/1.6% impurity mixture (Batch 5) is presented in FIG. 5A-FIG. 5D. The crude Exo-D9-THC-naphthoylester impurity/D9-THC-naphthoylester/D8-THC-naphthoylester 8.2%/90.2%/1.6% impurity mixture was crystalline by PXRD and PLM. DSC analysis showed a melt endotherm with an onset at 92.9° C. (ΔH=58.6 J/g). TGA analysis showed 0.1% wt. loss from 25 to 200° C. The PXRD pattern was consistent with that of Form B D9-THC-naphthoylester and also contained two small unidentified peaks at 5.0 and 15.0 2-theta.

Figure 6A:
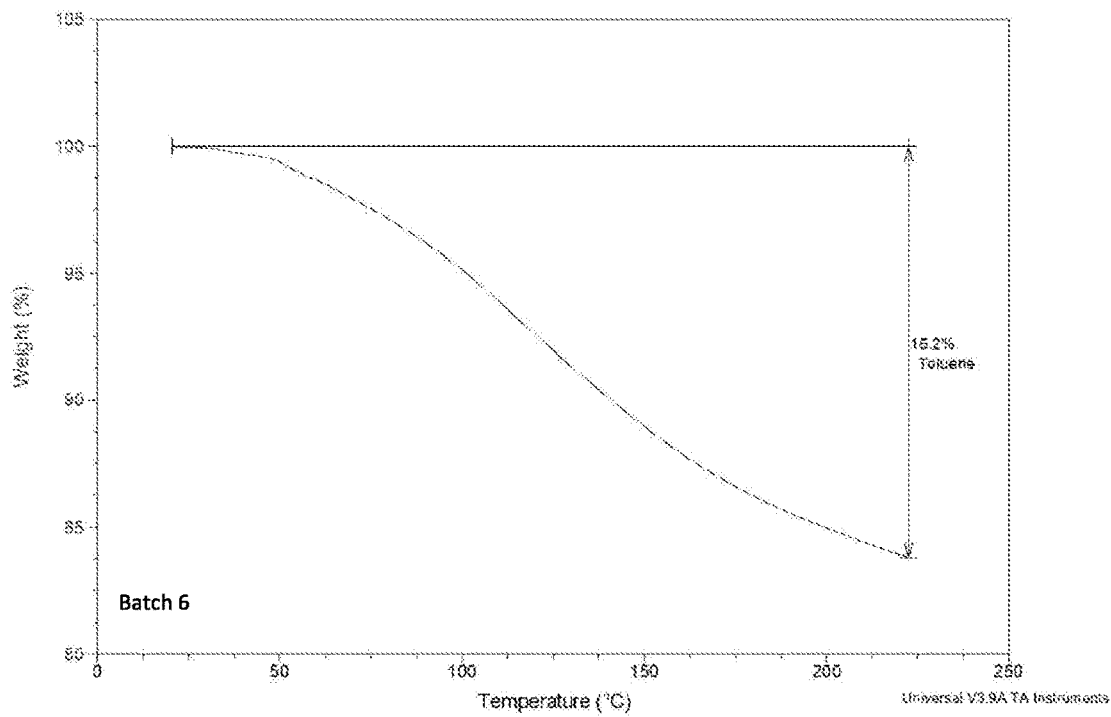
FIG. 6A depicts a TGA plot of the Exo/D9/D8 7.6%/78.7%/13.7% mixture.
Figure 6B:
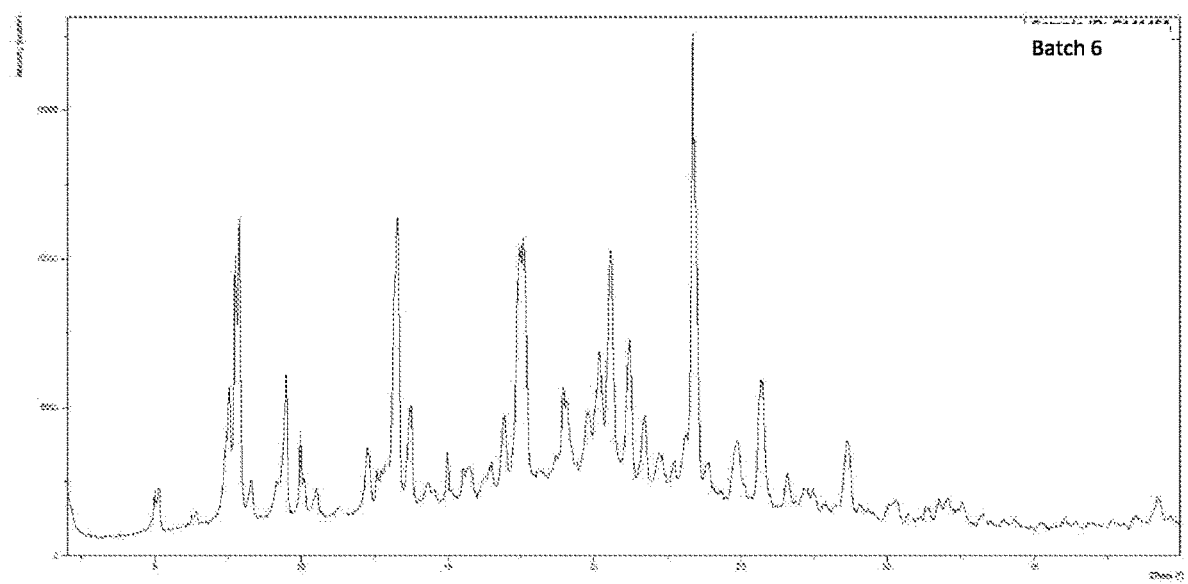
FIG. 6B depicts a PXRD pattern of the Exo/D9/D8 7.6%/78.7%/13.7% mixture.
Figure 6C:
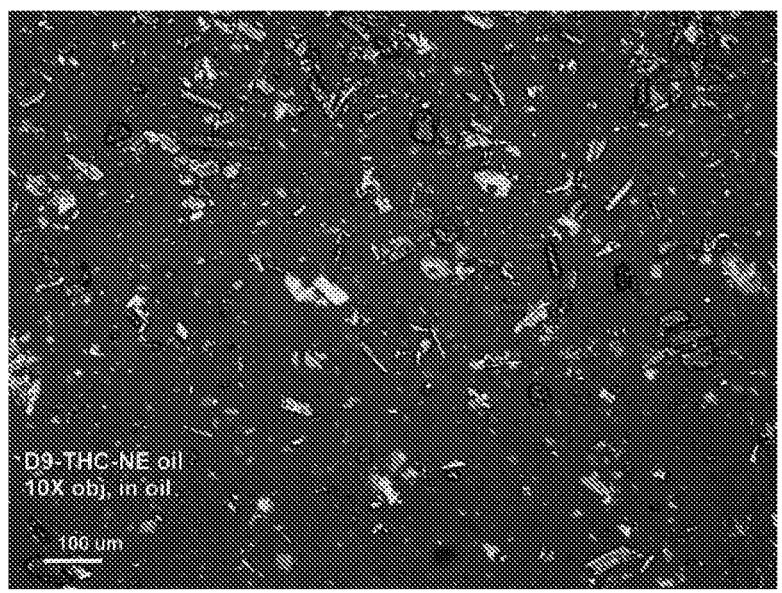
FIG. 6C depicts a PLM micrograph of the Exo/D9/D8 7.6%/78.7%/13.7% mixture.

The characterization data for the crude Exo-D9-THC-naphthoylester impurity/D9-THC-naphthoylester/D8-THC-naphthoyl ester 7.6%/78.7%/13.7% impurity mixture (Batch 6) is presented in FIG. 6A-FIG. 6C. The crude Exo-D9-THC-naphthoylester impurity/D9-THC-naphthoyl ester/D8-THC-naphthoyl ester 7.6%/78.7%/13.7% impurity mixture was a brown pasty residue containing some crystalline content by PLM. PXRD analysis indicated the crystalline content was consistent with Form B D9-THC-naphthoylester. TGA-IR analysis showed >16.2% wt. loss of toluene from 25 to 225° C.

Example 2: Solubility Assessment

Visual Solubility of Form B

Solubility of D9-THC-naphthoylester, Form B (Batch 2) was determined by visual assessment in various solvents at RT and 50° C. Aliquots of solvent were added to 20 mg of solids at room temperature and 25 mg of solids at 50° C. until complete dissolution or until a maximum volume of 1 mL was added.

Gravimetric Solubility of Form B

Additional solids or solvents were added to visual solubility samples with vials less than 100 mg/mL to produce slurries at 20 and 50° C. for the subsequent equilibrium solubility assessment. The slurries were stirred at 20 and 50° C. overnight, filtered through 0.2 μm syringe filters and evaporated to dryness under reduced pressure at ambient temperature. Gravimetric solubility was calculated by dividing the dry solids residue mass (mg) by the solvent mass (g). The mg/g solubility values were then converted to mg/mL using solvent density.

Gravimetric Solubility of Acetone and DMF Solvates of Group D

The solubility of Group D acetone and DMF solvates were assessed in the corresponding solvents.
The solubility data are summarized in Tables 4 and 5.

TABLE 4

Solubility of Form B D9-THC-naphthoylester at RT and 50° C.

| # | Solvent (v:v) | Visual Solubility at RT (mg/mL) | Gravimetric Solubility at RT (mg/mL) | Visual Solubility at 50° C. (mg/mL) | Gravimetric Solubility at 50° C. (mg/mL) |
|---|---|---|---|---|---|
| 1 | 1,4-Dioxane | >404 | NA | NA | NA |
| 2 | DCM | >404 | NA | NA | NA |
| 3 | Toluene | >376 | NA | NA | NA |
| 4 | EtOAc | >372 | NA | NA | NA |
| 5 | 2Me-THF | >368 | NA | NA | NA |
| 6 | MIBK | 105-420 | NA | NA | NA |
| 7 | THF/MeOH (1:1) | 98-392 | NA | NA | NA |
| 8 | Acetone | 94-376 | NA | NA | NA |
| 9 | MTBE | 93-372 | NA | NA | NA |
| 10 | Cyclohexane | 92-368 | NA | NA | NA |
| 11 | Heptane | 20-51 | ~33 | 127-254 | NA |
| 12 | DMSO | 18-46 | NA | 25-50 | NA |
| 13 | Acetone/MeOH (1:3) | 10-20 | ~9 | 25-40 | ~41 |
| 14 | MeCN | 9-18 | ~14 | 25-50 | ~35 |
| 15 | IPA | <10 | ~7 | 25-50 | ~45 |
| 16 | IPA:water (9:1) | <10 | ~3 | <27 | ~18 |
| 17 | BuOH/MeOH (1:3) | <10 | ~6 | 26-51 | ~24 |
| 18 | MeOH | <9 | ~3 | <25 | ~12 |
| 19 | EtOH | <9 | ~7 | 25-50 | ~29 |
| 20 | Water | <9 | <1 | <24 | <1 |

TABLE 5

Solubility of Acetone and DMF Solvates of Group D at RT

| # | Solvent | Batch | Gravimetric Solubility at RT (mg/mL) |
|---|---|---|---|
| 1 | Acetone | 7 | 98 |
| 2 | DMF | 8 | 95 |

Eight crystal forms of D9-THC-naphthoylester were obtained following recrystallization of D9-THC-naphthoylester Form B in various solvents:
Form A
Form B
Form C
Group D—Solvates (1,4-dioxane, DMF, DMSO, THF and MeCN), which convert to Form C in the solid-state.
Form E—non-solvated form
Form F—transient form that converts to Form E
Form G
Form H
The physical characteristics of the unique crystal forms of D9-THC-naphthoylester are summarized in Table 6.

TABLE 6

Physical Characteristics of D9-THC-Naphthoylester Crystal Forms

| Crystal Form | Batch | Nature | Preparation Solvent (v:v) | DSC Endotherm (° C.) | ΔH$_f$ (J/g) | TGA (% wt. loss) |
|---|---|---|---|---|---|---|
| Form A | 1 | Non-solvated Metastable | NA | 94.7 | 59.7 | <0.1 |
| Form B | 2 | Non-solvated Metastable | NA | 99.7 | 59.9 | 0.2 |
| Form C | 3 | Non-solvated Metastable | NA | 87.8 | 41.0 | 0.2 |
| Group D (Class of Solvates) | 9 | 1,4-Dioxane solvate | 1,4-Dioxane/water (1:1) | 79.6 | 49.3 | 3.2 |
| | 10 | THF solvate | THF/water (2:8) | 86.1 | 92.6 | 2.3 |
| | 11 | DMF solvate | DMF | 86.5, 93.8 | 7.8, 62.9 | 4.0 |
| Form E | 12 | Non-solvated Metastable | Nitromethane | 87.1 | 45.1 | <0.1 |
| Form F | 13 | Transient | Nitromethane | NA | NA | NA |
| Form G | 14 | Non-solvated Metastable | p-Xylene/MeOH (1:9) | 106.5 | 55.8 | 0.2 |
| Form H | 26 | Non-solvated Most stable at 25-60° C. | Toluene/MeOH (3:7) | 106.6 | 55.3 | <0.1 |

Figure 7:
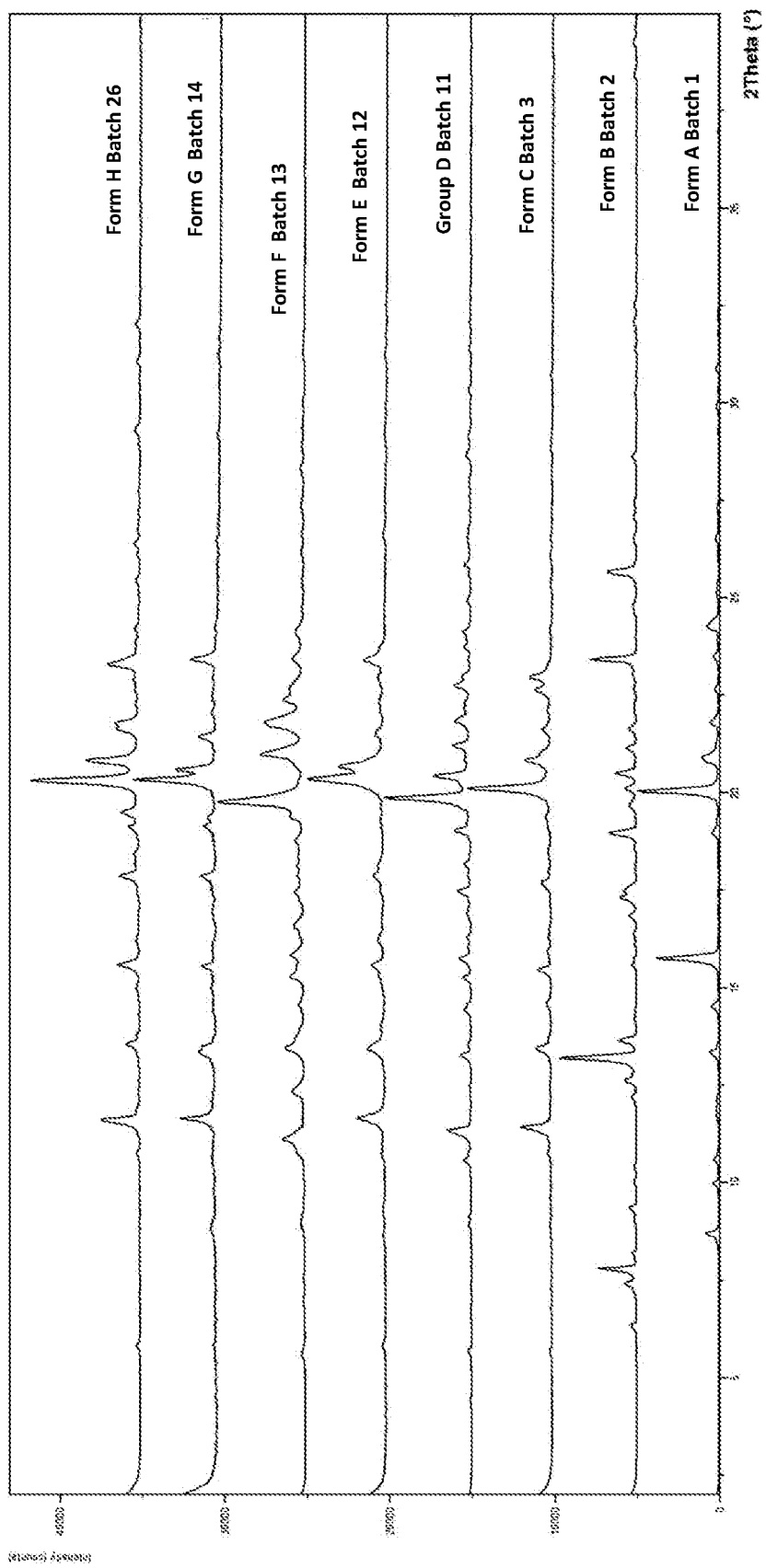
FIG. 7 depicts PXRD patterns of D9-THC-naphthoylester Forms A-C and Group D, and Forms E-H.
Figure 8:
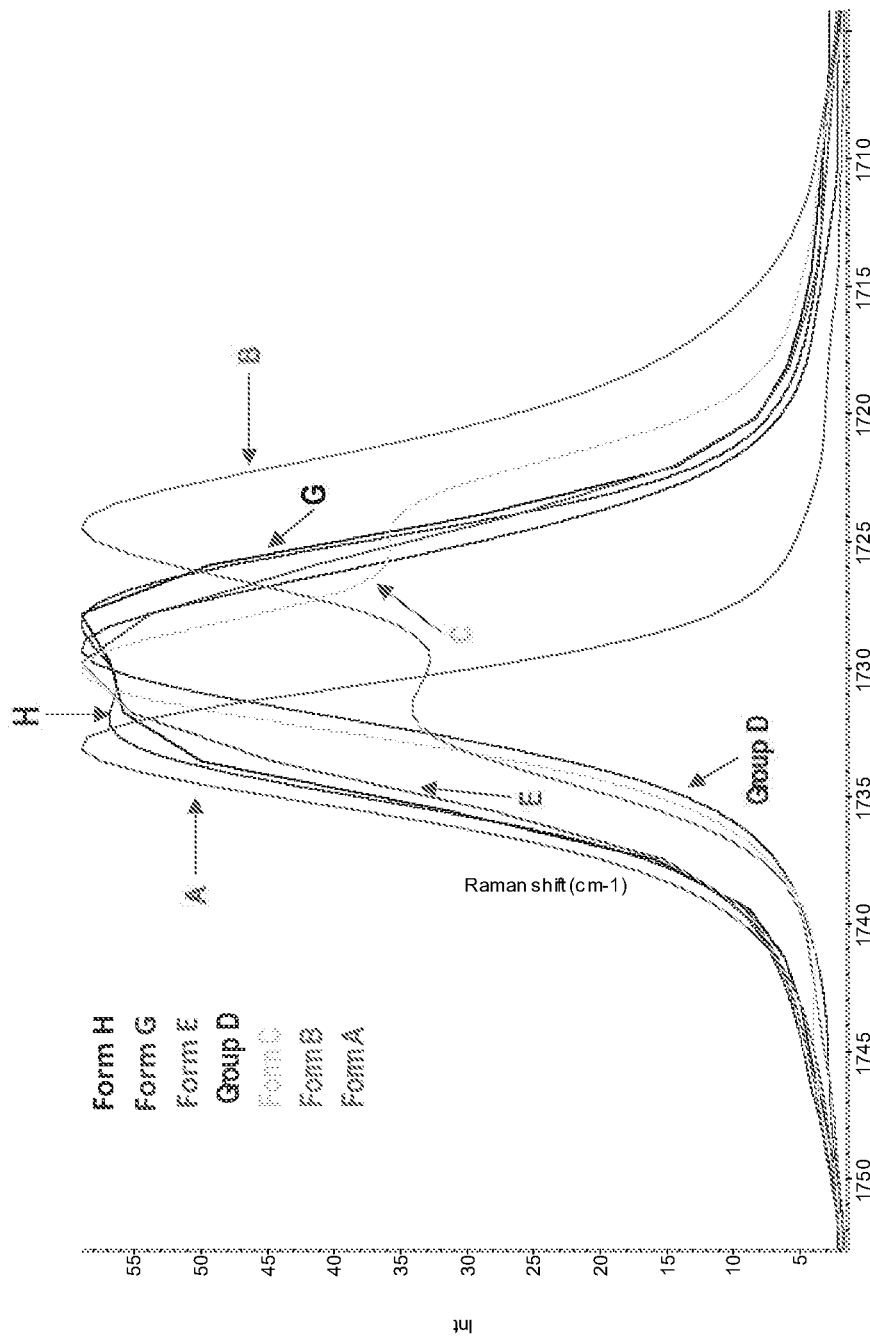
FIG. 8 depicts FT-Raman spectra of D9-THC-naphthoylester Forms A-C, Group D, and Forms E-H (1760-1700 $cm^{-1}$).
Figure 9:
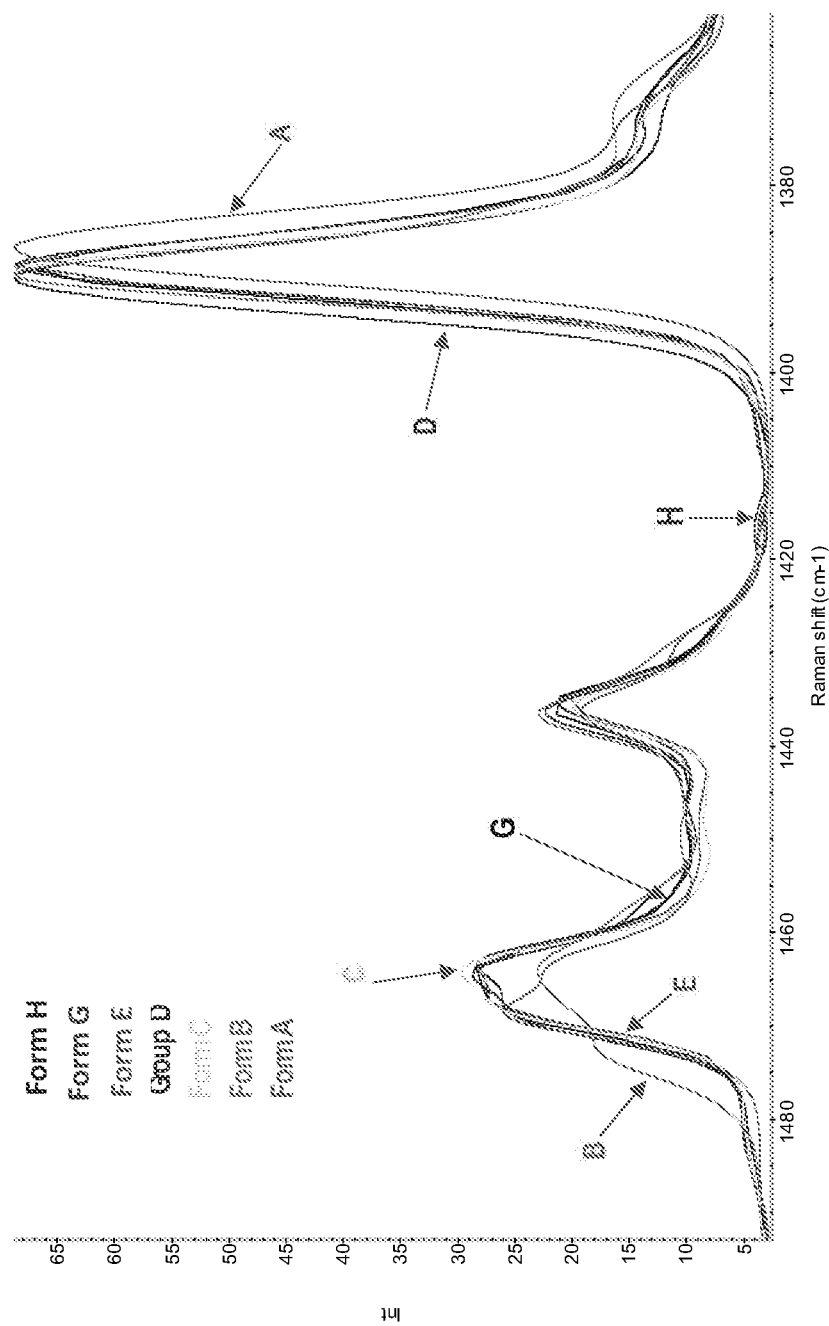
FIG. 9 depicts FT-Raman spectra of D9-THC-naphthoylester Forms A-C, Group D, and Forms E-H (1490-1360 $cm^{-1}$).

FIG. 7 shows an overlay comparison of the PXRD patterns for each of the D9-THC-Naphthoylester crystal forms A-C, Group D, and Forms E-H. FIGS. 8 and 9 show an overlay comparison of the FT-Raman spectra for each of the D9-THC-Naphthoylester crystal Forms A-C, Group D, and Forms E-H.

Example 3: Group D (Class of Solvates)

Group D is a class of solvates (1,4-dioxane, acetone, DMF, DMSO, THF and MeCN) and was observed as phase-pure and in mixtures with Form C.

Figure 10:
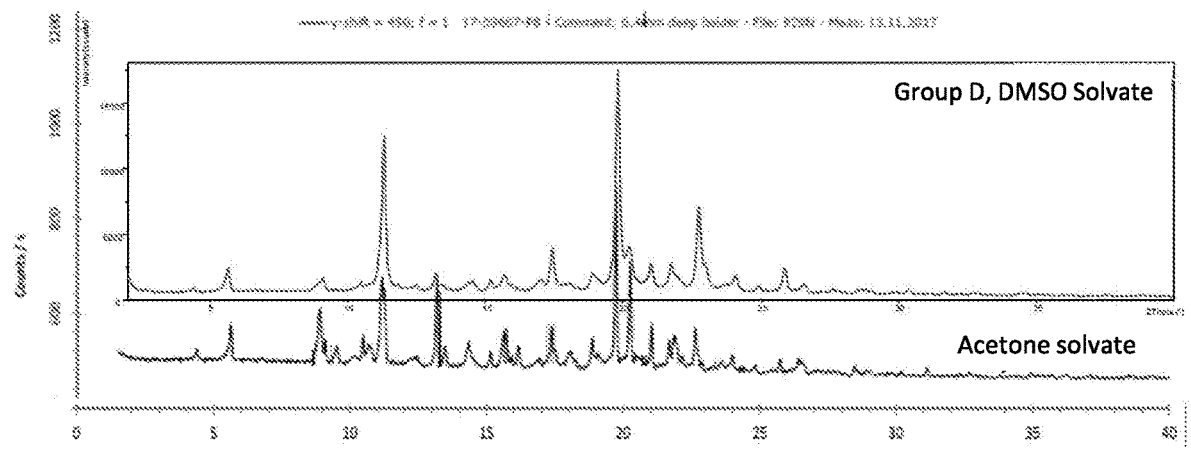
FIG. 10 depicts PXRD patterns of the DMSO Solvate and Acetone Solvate of Group D.

A comparison of the Group D DMSO solvate and the acetone solvate PXRD patterns are provided in FIG. 10.

Figure 11:
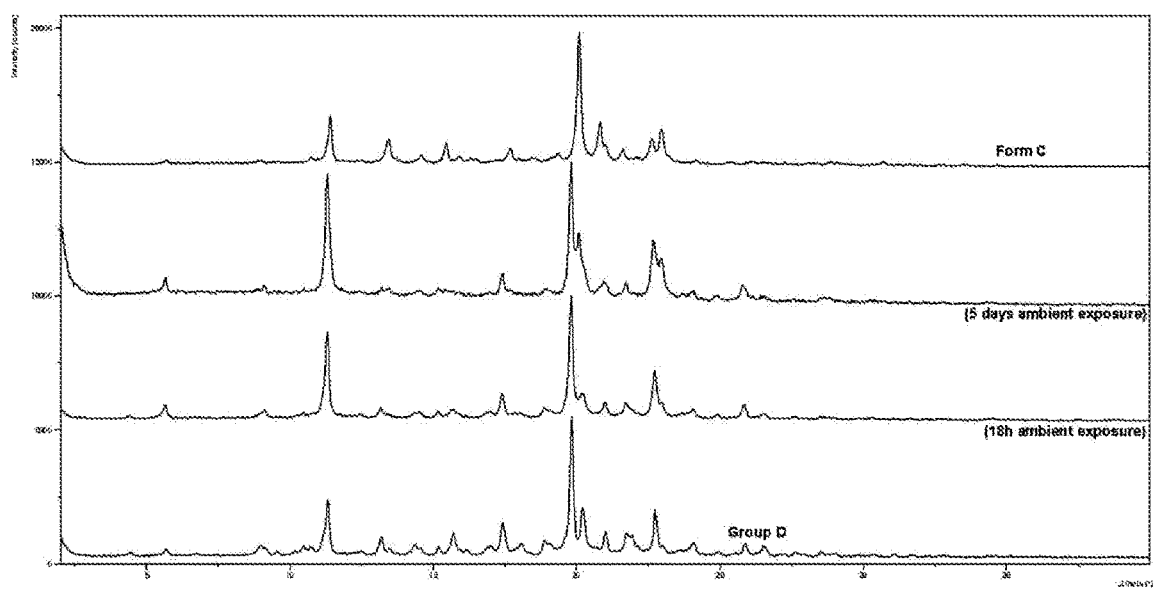
FIG. 11 depicts PXRD Patterns of Group D, mixtures of Group D and Form C after several hours and days from obtaining Group D and Form C.

Group D solvates converted to Form C in the solid-state at different rates, depending on the solvent included. Conversion was observed within five days at ambient temperature for the DMSO solvate and overnight at ambient for the DMF solvate. An overlay of the PXRD patterns of Group D changing to Form C after 18 hours and 5 days and Form C is shown in FIG. 11. No phase-pure Group D was isolated from acetone-containing solvents, indicating the unstable nature of this solvate.

Figure 12:
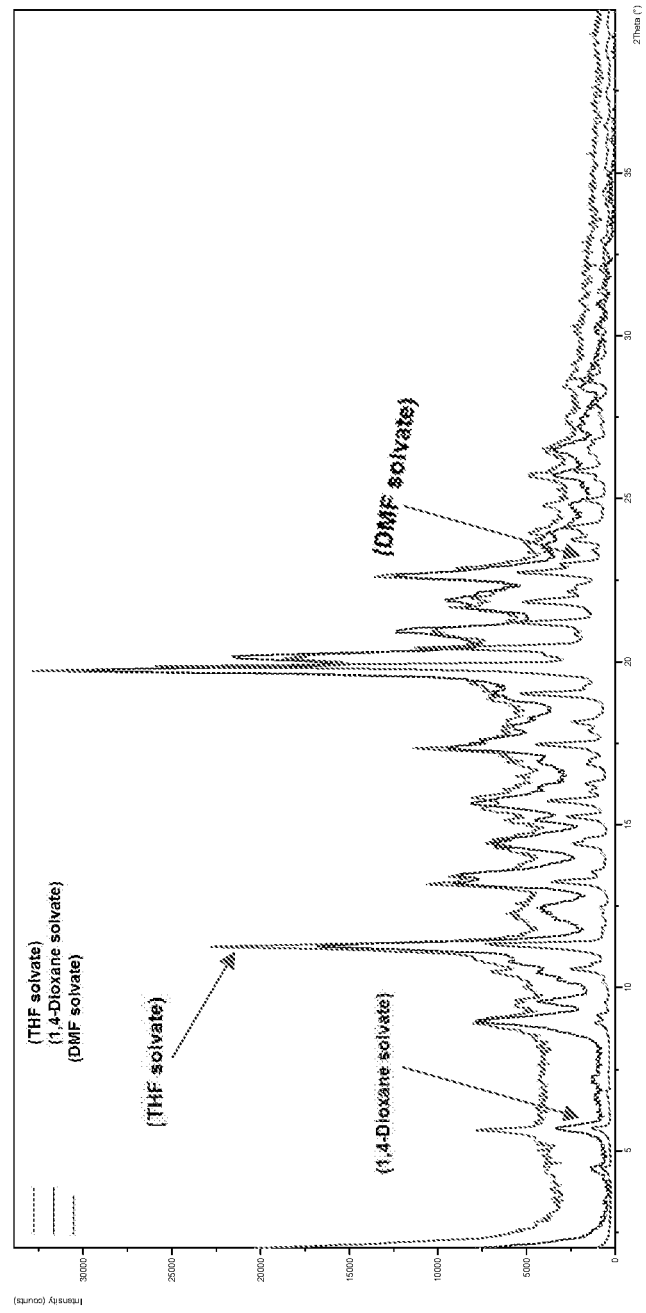
FIG. 12 depicts an overlay of the PXRD patterns of THF, 1,4-dioxane and DMF solvates of Group D.

An overlay of the PXRD patterns of Group D THF, 1,4-dioxane and DMF solvates is shown in FIG. 12. Worthwhile noting is the similarity among these X-ray patterns.

Preparation of a DMSO Solvate of Group D (Batch 16)

D9-THC-Naphthoylester (Form B, Batch 2, 9.2 mg) was combined with DMSO (0.5 mL) to produce a solution. Additional Form B of Batch 2 was added to generate a slurry. The slurry was stirred at 20° C. for 18 h. The solid was confirmed to be amorphous by PXRD. The amorphous sample was air-dried for 18 h, after which time it was determined to be a DMSO solvate of Group D by PXRD.

Preparation of a DMF Solvate of Group D (Batch 17)

D9-THC-Naphthoylester (Form B, Batch 2, 102.8 mg) was combined with DMF (0.5 mL) and stirred while cycling the temperature between 40° C. and 5° C. (heating and cooling at 2° C./min with a 1 h hold at 40° C. and 5° C.) for 72 h. After warming from 5° C., the slurry was then equilibrated with stirring at 20° C. for 2 h. The solids were isolated by filtration at ambient temperature and then air-dried for 1 h. PXRD analysis of the solids indicated a DMF solvate of group D.

Preparation of a 1,4-Dioxane Solvate of Group D (Batch 18)

D9-THC-Naphthoylester (Form B, Batch 2, 79.3 mg) was combined with 1,4-dioxane (1.8 mL) and stirred at ambient temperature for 72 h. The slurry was filtered through a 0.2 μm syringe filter and the filtrate (0.5 mL) was dispensed to a 2 mL vial. The solvent was evaporated under N₂ bleed over 5 days. PXRD analysis of the solid indicated a 1,4-dioxane solvent of Group D.

Preparation of a 1,4-Dioxane Solvate of Group D (Batch 9) Using a Seed of Batch 18

D9-THC-Naphthoylester (Form B, Batch 2, 203.3 mg) was combined with 1,4-dioxane/water (1:1 v/v, 2 mL), seeded with Group D 1,4-dioxane solvate (Batch 18, 1 mg) and stirred at ambient temperature for 1 h. The slurry was heated to 60° C. and stirred for 18 h. The slurry was cooled to ambient. The solids were isolated by filtration and air-dried for 4 h. PXRD analysis indicated a 1,4-dioxane Solvate of Group D.

Characterization of a 1,4-Dioxane Solvate of Group D (Batch 9)

Characterization data for Group D 1,4-Dioxane Solvate (Batch 9) is provided in FIG. 14A-FIG. 14D. The peak list for the XRD pattern provided in FIG. 14C is shown in Table 8.

TABLE 8

| Pos. [°2Th.] | Height [cts] | d-spacing [Å] | Rel. Int. [%] |
| --- | --- | --- | --- |
| 4.44 | 242.24 | 19.90 | 3.43 |
| 5.67 | 692.42 | 15.54 | 9.80 |
| 8.97 | 1764.68 | 9.86 | 24.97 |
| 9.55 | 701.55 | 9.26 | 9.93 |
| 11.28 | 3902.68 | 7.85 | 55.21 |
| 13.16 | 1597.09 | 6.73 | 22.59 |
| 13.47 | 1684.28 | 6.57 | 23.83 |
| 14.36 | 1062.50 | 6.17 | 15.03 |
| 17.35 | 1665.48 | 5.11 | 23.56 |
| 19.72 | 7068.41 | 4.50 | 100.00 |
| 20.15 | 4935.64 | 4.41 | 69.83 |
| 20.96 | 2368.15 | 4.24 | 33.50 |
| 22.62 | 2465.25 | 3.93 | 34.88 |
| 25.69 | 467.95 | 3.47 | 6.62 |

Preparation of a DMF Solvate of Group D (Batch 11) Using a Seed of Batch 9

D9-THC-Naphthoylester (Form B, Batch 2, 404.1 mg) was combined with DMF (2 mL) and stirred at 25° C. and quickly formed an immobile slurry. DMF (1 mL) was added and the slurry was heated at 1° C./min to 50° C., resulting in dissolution. The solution was cooled at 1° C./min to 30° C. and seeded with ~1 mg of Batch 9). The solution was stirred at 30° C. for 1 hour and slowly became turbid. The slurry was cooled at 1° C./min to 25° C. and stirred for 3 days. The solids were isolated by vacuum filtration and the vial washed with MeOH (1 mL), which was added to the cake. The solids were washed with MeOH (3×1 mL) and air-dried on the filter at ambient for 4 hours. Yield: 39% (311.8 mg).

Characterization of a DMF Solvate of Group D (Batch 11)

The characterization data of the DMF solvate of Batch 11 are shown in FIG. 13A-FIG. 13D. PXRD and PLM analyses indicated that the material is crystalline with 5-30 μm particles with an irregular habit. DSC analysis showed an endotherm with an onset at 86.5° C. (ΔH=7.8 J/g) followed immediately by an endotherm with an onset at 93.8° C. (ΔH=62.9 J/g). TGA analysis showed a loss of 4.0% wt. loss from 25-200° C. Proton NMR confirmed 0.31 eq of DMF. Provided in Table 7 is the peak list for the PXRD in FIG. 13C.

TABLE 7

| Pos. [°2Th.] | Height [cts] | d-spacing [Å] | Rel. Int. [%] |
| --- | --- | --- | --- |
| 4.43 | 912.90 | 19.96 | 1.81 |
| 5.67 | 2047.69 | 15.54 | 4.05 |
| 10.57 | 4123.58 | 8.37 | 8.16 |
| 11.33 | 13400.01 | 7.81 | 26.51 |
| 13.25 | 6122.87 | 6.68 | 12.11 |
| 14.47 | 2925.94 | 6.12 | 5.79 |
| 15.25 | 4270.80 | 5.81 | 8.45 |
| 15.74 | 6441.22 | 5.63 | 12.74 |
| 16.27 | 2037.70 | 5.45 | 4.03 |
| 16.90 | 1716.93 | 5.25 | 3.40 |
| 17.47 | 7770.11 | 5.08 | 15.37 |
| 18.15 | 3510.37 | 4.89 | 6.95 |
| 19.02 | 8946.30 | 4.67 | 17.70 |
| 19.86 | 50541.13 | 4.47 | 100.00 |
| 20.42 | 20885.03 | 4.35 | 41.32 |
| 21.21 | 9221.21 | 4.19 | 18.24 |
| 21.83 | 8022.15 | 4.07 | 15.87 |
| 22.73 | 8967.47 | 3.91 | 17.74 |
| 23.73 | 2997.29 | 3.75 | 5.93 |
| 24.14 | 4070.40 | 3.69 | 8.05 |
| 24.95 | 1960.68 | 3.57 | 3.88 |
| 25.85 | 3498.52 | 3.45 | 6.92 |
| 28.64 | 2640.25 | 3.12 | 5.22 |
| 29.15 | 1487.75 | 3.06 | 2.94 |
| 30.34 | 1308.84 | 2.95 | 2.59 |
| 31.37 | 915.74 | 2.85 | 1.81 |

Characterization of a THF Solvate of Group D (Batch 10)

Characterization data for a THF Solvate of Group D is provided in FIG. 15A-FIG. 15D.

Example 4: Form E

Preparation of Form E (Batch 19)

D9-THC-Naphthoylester (Form B, Batch 2, 99.9 mg) was combined with nitromethane (0.5 mL) and the slurry was stirred at 60° C. for 48 h. The solids were isolated by filtration at 60° C. and air-dried for 1 h. PXRD indicated a mixture of Form B and Form E.

Preparation of Form E (Batch 20) Using a Seed of Batch 19

D9-THC-Naphthoylester (Form B, Batch 2, 199.7 mg) was combined with nitromethane (1 mL) and stirred at 60° C. The obtained solution was seeded with a mixture of Forms B and E (Batch 19). The obtained slurry was cooled to 50° C. and became immobilized. The sample was cooled to ambient temperature and nitromethane (5 mL) was added to produce a mobile slurry, which was stirred for 48 h. The solids were isolated by filtration and air-dried for 4 h. PXRD analysis indicated Form E.

Large-Scale Preparation of Form E (Batch 12) Using Seed of Batch 20

Form B D9-THC-Naphthoylester (Batch 2, 252.0 mg) was combined with nitromethane (1 mL) and heated to 60° C. with stirring. The slurry was seeded with Form E (Batch 20, ~1 mg) at 60° C. and became thick. Nitromethane (5 mL) was added to the slurry at 60° C. and the slurry was stirred for 1 hour, cooled to at 1° C./min at 25° C. and stirred for 3 days. The solids were isolated by filtration and air-dried on the filter for 4 hours. Yield: 58% (146.0 mg).

Characterization of Form E (Batch 12)

The characterization data for Form E are presented in FIG. 16A-FIG. 16D. PXRD and PLM analyses indicated that Form E is crystalline with 5-80 μm particles with an irregular habit. DSC analysis showed an endotherm with an onset at 87.1° C. (ΔH=45.1 J/g). TGA analysis showed <0.1% wt. loss from 25-200° C. Table 9 show the peak list corresponding with the X-ray diffraction pattern in FIG. 16C.

TABLE 9

| Pos. [°2Th.] | Height [cts] | d-spacing [Å] | Rel. Int. [%] |
| --- | --- | --- | --- |
| 5.83 | 433.99 | 15.16 | 4.27 |
| 8.63 | 270.14 | 10.25 | 2.66 |
| 11.65 | 3665.59 | 7.59 | 36.05 |
| 13.42 | 2179.56 | 6.60 | 21.44 |
| 15.57 | 1606.76 | 5.69 | 15.80 |
| 16.23 | 674.66 | 5.46 | 6.64 |
| 17.87 | 1259.60 | 4.96 | 12.39 |
| 20.35 | 10168.00 | 4.36 | 100.00 |
| 20.69 | 5701.03 | 4.29 | 56.07 |
| 21.50 | 951.09 | 4.13 | 9.35 |
| 22.91 | 674.47 | 3.88 | 6.63 |
| 23.40 | 2728.30 | 3.80 | 26.83 |
| 26.62 | 379.08 | 3.35 | 3.73 |
| 31.25 | 245.54 | 2.86 | 2.41 |

Example 5: Form F (Transient Form) (Batch 13)

Figure 17:
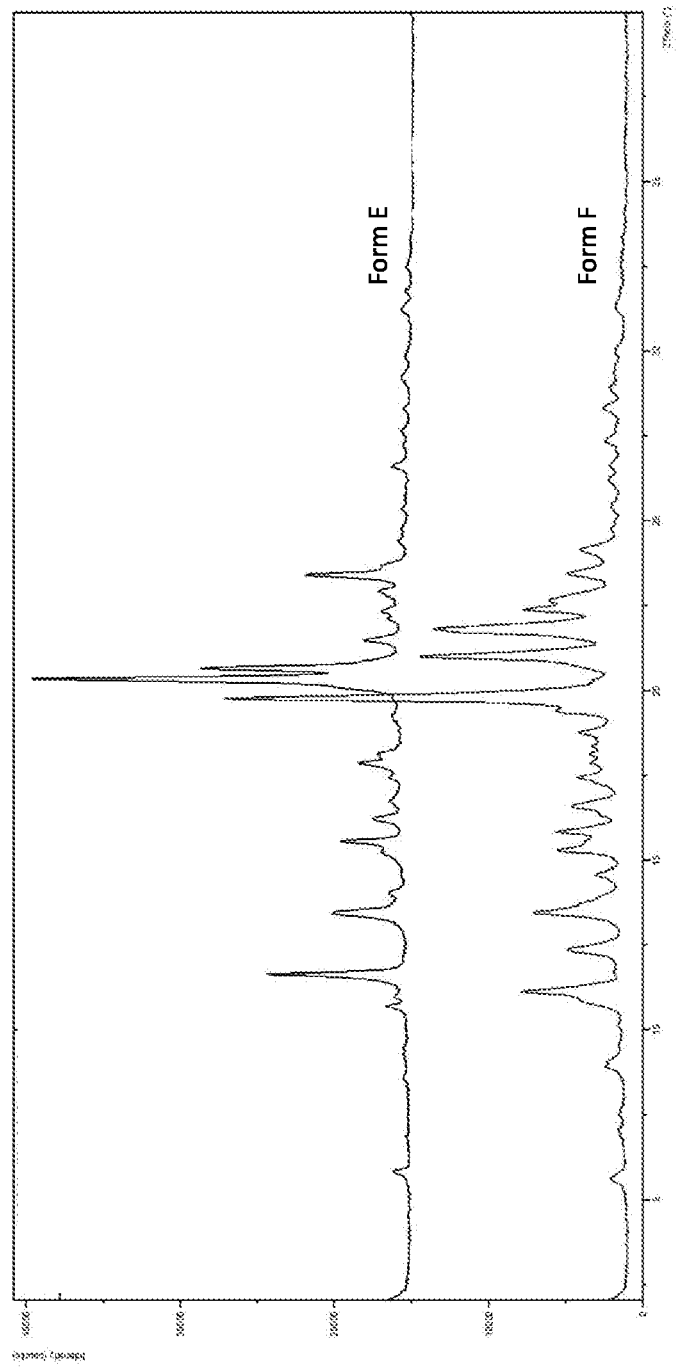
FIG. 17 depicts PXRD patterns of Forms E and F.

Form F, a transient form, was observed in a wet-cake sample during preparation of Form E (Batch 20). PXRD analysis of the Form F sample after air-drying for five minutes at ambient showed it had converted to Form E. An overlay of the PXRD patterns for Forms E and F is shown in FIG. 17. An X-ray pattern showing peak positions for Form F is presented in FIG. 18. Table 10 summarizes the peak list for the X-ray pattern in FIG. 18.

TABLE 10

| Pos. [°2Th.] | Height [cts] | d-spacing [Å] | Rel. Int. [%] |
| --- | --- | --- | --- |
| 5.59 | 921.44 | 15.80 | 3.77 |
| 8.95 | 1054.58 | 9.88 | 4.32 |
| 11.11 | 6086.80 | 7.96 | 24.92 |
| 12.33 | 3123.07 | 7.18 | 12.78 |
| 13.42 | 5187.51 | 6.60 | 21.24 |
| 14.56 | 1181.95 | 6.09 | 4.84 |
| 15.27 | 3547.05 | 5.80 | 14.52 |
| 15.83 | 3441.90 | 5.60 | 14.09 |
| 16.57 | 2578.35 | 5.35 | 10.55 |
| 17.43 | 2194.99 | 5.09 | 8.99 |
| 18.75 | 1816.51 | 4.73 | 7.44 |
| 19.36 | 3012.39 | 4.58 | 12.33 |
| 19.75 | 24427.81 | 4.50 | 100.00 |
| 20.98 | 11648.35 | 4.23 | 47.68 |
| 21.75 | 10241.71 | 4.09 | 41.93 |
| 22.36 | 5000.51 | 3.98 | 20.47 |
| 22.65 | 3519.68 | 3.93 | 14.41 |
| 23.43 | 2576.14 | 3.80 | 10.55 |
| 24.16 | 1998.00 | 3.68 | 8.18 |
| 26.19 | 596.05 | 3.40 | 2.44 |
| 27.34 | 753.78 | 3.26 | 3.09 |
| 28.32 | 870.35 | 3.15 | 3.56 |
| 31.21 | 452.26 | 2.87 | 1.85 |

Example 6: Form G (Non-Solvated)

Preparation of Seed for Preparing Form G (Batch 21)

D9-THC-Naphthoylester (Form A, Batch 1, 99.7 mg) was combined with p-xylene:MeOH (1:9 v/v, 0.5 mL) and stirred at 60° C. for 72 h. The solids were isolated by filtration at 60° C. and air-dried for 1 h. PXRD analysis showed a mixture of Form B and Form E.

Preparation of Form G (Batch 14) Using Batch 21 as a Seed

D9-THC-Naphthoylester (Form B, Batch 2, 202.7 mg) was combined with p-xylene/MeOH (1:9 v:v, 2 mL) and stirred at ambient temperature for 1 hour. The slurry was seeded with a mixture of Form B and Form E (Batch 21, ~1 mg), heated at 1° C./min to 60° C. and stirred overnight. The slurry was cooled at 1° C./min to ambient temperature, and stirred for one day, resulting in a thick slurry. p-xylene/MeOH (1:9 v:v, 1 mL) was added and the slurry was stirred at ambient temperature for eleven days. The solids were isolated by vacuum filtration, washed with MeOH (1 mL), and air-dried on the filter for 1 hour.

Characterization of Form G (Batch 14)

The characterization data for Form G are presented in FIG. 19A-FIG. 19D. PXRD and PLM analysis indicated that the material is crystalline with 5-20 μm particles with an irregular habit. DSC analysis showed an endotherm with onset at 106.5° C. (ΔH=55.8 J/g). TGA analysis showed a 0.2% wt. loss from 25-200° C. Table 11 summarizes the peak list for the X-ray pattern in FIG. 19C.

TABLE 11

| Pos. [°2Th.] | Height [cts] | d-spacing [Å] | Rel. Int. [%] |
| --- | --- | --- | --- |
| 8.84 | 247.43 | 10.00 | 5.04 |
| 11.64 | 1877.02 | 7.60 | 38.26 |
| 13.33 | 986.24 | 6.64 | 20.10 |
| 15.54 | 806.41 | 5.70 | 16.44 |
| 17.85 | 889.42 | 4.97 | 18.13 |
| 19.13 | 633.27 | 4.64 | 12.91 |
| 20.33 | 4905.81 | 4.37 | 100.00 |
| 20.60 | 2312.76 | 4.31 | 47.14 |
| 21.44 | 976.17 | 4.14 | 19.90 |
| 23.42 | 1458.47 | 3.80 | 29.73 |

Example 7: Form H (Non-Solvated)

Preparation of Form H (Batch 22)

D9-THC-Naphthoylester (Form B, Batch 2, 106.1 mg) was combined with toluene:MeOH (3:7 v/v, 848.8 μL) and seeded with Form G (Batch 23, 1 mg) and stirred at 25° C. for 42 h. The solids were isolated by filtration. PXRD analysis indicated Form H.

Preparation of Form H (Batch 26) Using a Seed of Batch 22

D9-THC-Naphthoylester (Form B, Batch 2, 101.6 mg) was combined with toluene/MeOH (3:7 v:v, 1.0 mL) and stirred at 25° C. yielding a slurry. The slurry was seeded with Form H (Batch 22, ~1 mg) and stirred for 18 hours at 25° C. The solids were isolated by filtration and air-dried for 3 hours on the filter. Yield: 36% (36.7 mg).

Characterization of Form H (Batch 26)

The characterization data for Form H are presented in FIG. 20A-FIG. 20D. PXRD and PLM analyses indicated that the material is crystalline with 5-80 μm particles with an irregular habit. DSC analysis showed an endotherm with an onset at 106.6° C. (ΔH=55.4 J/g). TGA analysis showed <0.1% wt. loss from 25-200° C. Table 12 summarizes the peak list for the X-ray pattern in FIG. 20C.

TABLE 12

| Pos. [°2Th.] | Height [cts] | d-spacing [Å] | Rel. Int. [%] |
| --- | --- | --- | --- |
| 5.81 | 477.65 | 15.22 | 2.07 |
| 10.78 | 460.57 | 8.20 | 2.00 |
| 11.61 | 8171.84 | 7.62 | 35.46 |
| 13.55 | 2623.31 | 6.53 | 11.38 |
| 15.58 | 4386.50 | 5.69 | 19.03 |
| 16.18 | 542.69 | 5.48 | 2.35 |
| 17.86 | 3983.65 | 4.97 | 17.29 |
| 18.43 | 852.05 | 4.81 | 3.70 |
| 19.10 | 1761.25 | 4.65 | 7.64 |
| 19.49 | 3279.63 | 4.55 | 14.23 |
| 20.31 | 23046.73 | 4.37 | 100.00 |
| 20.82 | 10617.51 | 4.27 | 46.07 |
| 21.61 | 3917.69 | 4.11 | 17.00 |
| 21.80 | 4072.32 | 4.08 | 17.67 |
| 22.87 | 739.36 | 3.89 | 3.21 |
| 23.28 | 6113.87 | 3.82 | 26.53 |
| 24.19 | 598.65 | 3.68 | 2.60 |
| 26.38 | 970.60 | 3.38 | 4.21 |
| 29.30 | 923.01 | 3.05 | 4.00 |
| 31.08 | 518.25 | 2.88 | 2.25 |
| 32.02 | 885.31 | 2.80 | 3.84 |

Example 8: Relative Thermodynamic Stability Studies of Non-Solvated Forms

Relative stability of non-solvated forms (Forms A-C and E-H) observed in the comprehensive polymorph and the Exo-impurity purging studies was established via competitive ripening experiments. Competitive ripening experiments were conducted at 5, 25, 50 and 60° C. in acetone/MeOH (1:3 v:v), toluene/EtOH (1:9 v:v), n-BuOH, and heptane. Saturated solutions of D9-THC-naphthoylester were prepared by stirring an excess of Form B in solvents at the target temperatures for 18-24 hours and filtering the suspensions at target temperatures. The filtrates (saturated solutions) were combined with physical mixtures of various polymorphs and the obtained suspensions were stirred at target temperature until conversion to a single form was detected by PXRD. Because Form H was discovered at the end of the Exo-purging studies, competitive ripening with Forms G and H were repeated for selected solvents.

The competitive ripening results are summarized in Table 13. The results show that between 25-60° C. in non-solvate forming solvents (all except acetone/MeOH 1:3), Form H was the most stable non-solvated crystal form. The rates of form interconversion were generally slow (days). At 5° C., the rates of form interconversions were very slow and the ripening experiments were incomplete within 29 days. However, the data suggest that at 5° C., Form H is likely the most-stable form.

TABLE 13

| Experiment No. | Solvent (v/v) | Temperature (° C.) | Forms Ripened | Form Isolated 1-3 d | 4-9 d | 12 d | 26-29 d |
|---|---|---|---|---|---|---|---|
| 1 | Toluene/EtOH (1:9) | 60 | B, G, H | H | H | — | — |
| 2 | Acetone/MeOH (1:3) | 50 | A, B, C, E, G | G | — | — | — |
| 3 | Toluene/EtOH (1:9) | 50 | A, B, C, E, G | G | — | — | — |
| 4 | n-BuOH | 50 | A, B, C, E, G | G | — | — | — |
| 5 | Toluene/EtOH (1:9) | 50 | G, H | H/G(tr) | H | — | — |
| 6 | n-BuOH | 50 | G, H | H/G(tr) | H | — | — |
| 7 | Acetone/MeOH (1:3) | 25 | A, B, C, E, G | E/G | E | — | — |
| 8 | Toluene/EtOH (1:9) | 25 | A, B, C, E, G | G/E | G | — | — |
| 9 | Heptane | 25 | E, G | — | G | — | — |
| 10 | n-BuOH | 25 | A, B, C, E, G | B/G | B/G | — | G |
| 11 | Toluene/EtOH (1:9) | 25 | G, H | G/H | H | — | — |
| 12 | Heptane | 25 | G, H | H/G | H | — | — |
| 13 | Acetone/MeOH (1:3) | 5 | A, B, C, E, G | — | E | — | — |
| 14 | Toluene/EtOH (1:9) | 5 | A, B, C, E, G | — | B/G | — | G/B(tr) |
| 15 | Heptane | 5 | E, G | — | G/B | — | — |
| 16 | n-BuOH | 5 | A, B, C, E, G | — | B/G | — | B/G |
| 17 | Toluene/EtOH (1:9) | 5 | B, G, H | — | — | G/H | — |
| 18 | Heptane | 5 | B, G, H | — | — | H/B(tr) | — |
| 19 | n-BuOH | 5 | B, G, H | — | — | B/H | — |

Example 9: Polymorph Screen of Exo-Impurity in Solvents Yielding Alternate Forms of D9-THC-Naphthoylester Slurries of the Exo impurity were prepared in nitromethane, DMSO, acetone, MeCN and p-xylene/MeOH (10:90 v:v) and seeded with D9-THC-Napthoylester Group D or Form E to assess if a corresponding Exo impurity polymorph could be formed.

The slurries were seeded with D9-THC-Naphthoylester Group D or Form E (~1 mg) and stirred at RT. After five days, aliquots from the nitromethane, DMSO, MeCN, and p-xylene/MeOH slurries were isolated by filtration and analyzed by PXRD. PXRD patterns of all solids showed only the Exo impurity. No solids were obtained in the acetone experiment due to the increased Exo solubility.

The experiments were cooled to 5° C. and slurries were obtained in all solvents. The slurries were reseeded (~1 mg) and stirred at 5° C. After six days, aliquots of the slurries were isolated by filtration and analyzed by PXRD. PXRD patterns of all solids showed only the Exo impurity. No evidence of polymorphism of the Exo impurity was observed. The results of the screen are provided in Table 14.

TABLE 14

| Experiment No. | Solvent | Input Solid | Seed (D9-THC-Naphthoylester) | Corresponding Form of (D9-THC-Naphthoylester) in Comprehensive Screen | Form Isolated at RT 5 D (Exo) | Form Isolated at 5° C. 6 D (Exo) |
|---|---|---|---|---|---|---|
| 20 | Nitromethane | Exo | Form E | Form E | Input form | Input form |
| 21 | DMSO | Exo | Group D | Group D | Input form | Input form |
| 22 | Acetone | Exo | Group D | Form C/Group D | No solids | Input form |
| 23 | MeCN | Exo | Group D | Form C | Input form | Input form |
| 24 | P-Xylene/MeOH (10:90) | Exo | Form E | Form G | Input form | Input form |

Example 10: Exo-Impurity Purging Studies

A series of experiments were conducted to assess purging (depletion) of the undesired Exo-impurity from the D9-THC-naphthoylester material by the various crystal forms observed. Specifically, the impact of several factors on the Exo-impurity purging was evaluated:
Crystal form (Form B, Forms E-H and Group D solvates);
Volumes of solvent (low vs. high);
Type of solvent (e.g., aliphatic vs. aromatic);
Solvent/antisolvent ratio;
Isolation temperature;
Solubility and yield; and
Gross purity of selected isolated solids (as % area of a sum of Exo/D9/D8).

Input Materials

Two materials ("oil" and "crude") containing Form B as the main crystalline component were utilized in the study:

The Oil (Batch 6) was a mixture of Exo/D9/D8 (Exo-D9-THC-naphthoylester impurity/D9-THC-naphthoylester/D8-THC-naphthoylester) with an approximate 7.6%/78.7%/13.7% ratio, containing 16.2% wt of toluene. This material was subjected to further processing to minimize the toluene content. The processed material was utilized in a small portion of the Exo-impurity purging study (Batch 24).

The crude (Batch 5) was a mixture of Exo/D9/D8 (Exo-D9-THC-naphthoylester impurity/D9-THC-naphthoylester/D8-THC-naphthoylester) with an approximate 8.2%/90.2%/1.6% ratio, containing 0.1% of solvent, utilized without further processing in the majority of the Exo-impurity purging study.

Exo-Impurity Purging Study

HPLC was utilized to determine the Exo/D9/D8 content (Exo-D9-THC-naphthoylester impurity/D9-THC-naphthoylester/D8-THC-naphthoylester). HPLC experiments were run using a Luna C8(2) 250×4.6 mm 5 μm column with a flow rate of 1.0 mL/min, and column temperature of 40° C.

The Exo-impurity purging studies involved seeded slurry conversions of the input Form B materials (oil and crude) to a desired crystal form. Excess of the input material was combined with a solvent and the suspension was seeded with the target crystal form. Due to the unknown thermodynamic stability of various forms in various solvents or temperatures, mixtures of anticipated crystal forms were used as seeds, in some cases to drive the form conversion to the more favored form.

Due to the observed very slow (days) from interconversion, the suspensions were heated to elevated temperatures (40-60° C.) to increase solubility (without dissolving the solids) and facilitate the conversion. Due to the incomplete or lack of conversion of Form B, select experiments were repeated under modified conditions (higher T, longer duration, etc.). Various sample processing (SP) conditions (initial temperature, heat/cool or isothermal temperature profiles, isolation temperature, and equilibration time prior to isolation) were applied in an attempt to achieve a complete form of conversion. The utilized sample processing conditions are tabulated in Table 15.

At the end of each experiment, suspensions were equilibrated at the isolation temperature (25 or 5° C.) for at least 18 hours and the solids and liquors separated by centrifugation at the isolation temperature. The Exo/D9/D8 ratio (Exo-D9-THC-naphthoylester impurity/D9-THC-naphthoylester/D8-THC-naphthoylester) was determined in both the isolated solids and the liquors, from which the % Exo-depletion in the isolated solids was calculated. Several solids were also isolated at elevated temperatures to assess the impact of the isolation temperature on Exo-impurity depletion.

In addition, the solubility of D9 in the liquors was determined in most of the explored solvents and used to estimate the yield.

TABLE 15

| SP | Initial T (° C.) | Time at Initial T (hours) | Ripening T (° C.) | Ripening Time (days) | Time at Isolation T (hours) | Isolation T (° C.) |
|---|---|---|---|---|---|---|
| 1 | 40 | 4 | 40-25 TC | 3 | 24 | 25 |
| 2 | 50 | 4 | 40-25 TC | 5 | 24 | 25 |
| 3 | 40 | 4 | 40-25 TC | 4 | 24 | 25 |
| 4 | 50 | 4 | 40-25 TC | 4 | 24 | 25 |
| 5 | 50 | 4 | 25 | 1 | 24 | 25 |
| 6 | 50 | 4 | 5 | 1 | 24 | 5 |
| 7 | 25 | 18 | NA | NA | 24 | 25 |
| 8 | 40 | 18 | NA | NA | 24 | 25 |
| 9 | 60 | 18 | NA | NA | 24 | 25 |
| 10 | 40 | 18 | NA | NA | 24 | 5 |
| 11 | 25 | 18 | NA | NA | 24 | 5 |
| 12 | 60 | 18 | NA | NA | 24 | 25 |
| 13 | 55 | 18 | NA | NA | 24 | 25 |
| 14 | 50 | 18 | NA | NA | 24 | 25 |
| 15 | 45 | 18 | NA | NA | 48 | 25 |
| 16 | 55 | 18 | NA | NA | 48 | 25 |
| 17 | 50 | 65 | NA | NA | 18 | 25 |
| 18 | 25 | 65 | NA | NA | 24 | 25 |
| 19 | 40 | 18 | NA | NA | 18 | 25 |
| 20 | 50 | 18 | NA | NA | 18 | 25 |
| 21 | 55 | 18 | NA | NA | 18 | 25 |

SP—sample processing conditions
TC—thermocycling program
T—temperature
"NA"—not applicable Results of Exo-Impurity Purging Study The Exo-impurity purging results are presented in Tables 16-20. General conclusions obtained from the Exo-impurity purging studies are summarized as follows:

The kinetics of the interconversion of the metastable Form B to other, more stable forms are generally very slow (days). Without wishing to be bound by theory, the slow conversion could be due to various factors including, slow nucleation/crystal growth, and the presence of impurities (e.g., Exo, D8, etc.), or low and/or similar solubility of the crystal forms in some of the solvents.

Exo-impurity depletion increases with increasing volume of solvent.

Exo-impurity depletion increases with elevated temperatures.

The Exo-impurity depletion increase is inversely related to yield.

Exo-depletion by various crystal forms can be generally ranked from the lowest to the highest, as follows: Form B<Group D/Form C<Forms E, G, H.

Formation of the most-stable form (Form H) is faster in aromatic solvents (e.g., toluene) than in aliphatic solvents (e.g., EtOAc).

Formation of the most-stable form (Form H) is faster in mixtures with a lower portion (70% vol) of anti solvent (e.g. MeOH).

MeOH and EtOH antisolvents in 80-95% vol appear to provide acceptable yield, but very slow conversion to Form H.

The purity of isolated solids (as a sum of Exo/D9/D8) is generally high (>99%). A few solids isolated from experiments involving EtOH, IPA, and n-BuOH exhibited lower purity (93-97%).

The results of Exo-impurity purging by Form B samples are listed in Table 16.

TABLE 16

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | DMSO/water (2:1) | D | Slurry | 50 | 25 | 2 | B | 0 | 100.0 | 8.8 | 0.0 | 96.5 |
| 5 | DMSO/water (2:1) | G | Thick slurry | 50 | 25 | 4 | B | 1 | 100.0 | 9.3 | 0.0 | 99.3 |
| 5 | MEK/IPA (1:9) | G/H | Imm Slurry | 55 | 25 | 15 | B | 12.2 | 91.4 | 5.0 | 17.2 | NA |
| 5 | DMSO/MeOH (1:9) | D | Slurry | 50 | 25 | 2 | B | 24 | 96.7 | 8.2 | 4.1 | 99.6 |
| 5 | DMF/MeOH (1:9) | D | Slurry | 50 | 25 | 2 | B | 25 | 95.4 | 8.9 | 5.2 | 99.5 |
| 5 | DMSO/MeOH (1:9) | G | Thick slurry | 50 | 25 | 4 | B | 25 | 96.6 | 9.4 | 3.7 | 99.6 |
| 5 | DMSO/MeOH (3:7) | G | Thick slurry | 50 | 25 | 4 | B | 26 | 96.4 | 5.2 | 7.0 | 99.6 |
| 5 | MeOH | E/G | Slurry | 50 | 25 | 3 | B | 27 | 95.1 | 9.8 | 5.0 | 99.6 |
| 5 | DMSO/MeOH (3:7) | D | Slurry | 50 | 25 | 2 | B | 28 | 94.7 | 7.1 | 7.5 | 99.5 |
| 5 | DMSO/acetone/MeOH (1.5:1.5:7) | D | Slurry | 50 | 25 | 2 | B | 28 | 95.4 | 5.0 | 9.1 | 99.4 |
| 5 | EtOAc/MeOH (1:3) | G | Slurry | 25 | 5 | 11 | B | 29 | 66.4 | 30.0 | 11.2 | 98.6 |
| 5 | DMSO/MeOH (1:9) | D/G | Slurry | 60 | 25 | 9 | B | 31 | 95.8 | 10.0 | 4.2 | 99.7 |
| 5 | DMF/MeOH (1:9) | G | Slurry | 50 | 25 | 3 | B | 31 | 95.6 | 9.4 | 4.7 | 99.6 |
| 5 | DMF/MeOH (1:9) | G | Slurry | 60 | 25 | 9 | B | 32 | 94.9 | 10.0 | 5.1 | 99.7 |
| 5 | DMSO/acetone/MeOH (1.5:1.5:7) | G | Thick slurry | 50 | 25 | 4 | B | 32 | 96.3 | 5.1 | 7.2 | 99.6 |
| 5 | Heptane/EtOH (1:3) | G/H | Imm Slurry | 55 | 25 | 15 | B/G | 35.6 | 86.1 | 5.0 | 27.9 | 94.8 |
| 5 | n-BuOH/MeOH (1:3) | G | Slurry | 60 | 25 | 9 | B | 37 | 94.0 | 10.0 | 6.0 | 99.8 |
| 5 | n-BuOH/MeOH (1:3) | E/G | Slurry | 50 | 25 | 3 | B | 38 | 94.7 | 9.4 | 5.6 | 99.7 |
| 5 | MEK/MeOH (1:9) | G/H | Slurry | 60 | 25 | 12 | B | 39.0 | 95.5 | 10.0 | 4.5 | NA |
| 5 | 1,4-Dioxane/MeOH (1:9) | E/G | Slurry | 50 | 25 | 3 | B | 39 | 97.1 | 4.8 | 6.0 | 99.7 |
| 5 | EtOAc/EtOH (1:9) | H | Slurry | 55 | 25 | 21 | B | 39.9 | 88.0 | 10.0 | 12.0 | NA |
| 5 | IPA/water (95:5) | G/H | Slurry | 60 | 25 | 12 | B | 40.2 | 95.5 | 10.0 | 4.5 | NA |
| 5 | MEK/MeOH (3:7) | G | Slurry | 25 | 5 | 11 | B | 41 | 52.6 | 30.0 | 15.8 | 99.6 |
| 5 | Cyclohexanone/MeOH (1:9) | G/H | Slurry | 60 | 25 | 12 | B | 41.5 | 92.4 | 10.0 | 7.6 | NA |
| 5 | IPA | G/H | Slurry | 50 | 25 | 14 | B | 42.7 | 92.7 | 10.0 | 7.3 | NA |
| 5 | Cyclohexanone/EtOH (1:9) | G/H | Slurry | 55 | 25 | 16 | B | 43.3 | 89.5 | 5.0 | 21.1 | NA |
| 5 | Toluene/EtOH (5:95) | H | Thick slurry | 55 | 25 | 21 | B | 43.7 | 87.6 | 12.0 | 10.3 | NA |
| 5 | Toluene/MeOH (1:9) | G | Slurry | 40 | 5 | 10 | B | 44 | 73.9 | 30.0 | 8.7 | 99.7 |
| 5 | Anisole/MeOH (1:9) | G | Slurry | 40 | 5 | 10 | B | 45 | 70.6 | 30.0 | 9.8 | 99.7 |
| 5 | p-Xylene/MeOH (1:9) | G | Slurry | 25 | 5 | 11 | B | 45 | 63.2 | 40.0 | 9.2 | 99.7 |
| 5 | EtOH | E/G | Slurry | 50 | 25 | 3 | B | 46 | 93.4 | 9.6 | 6.9 | 99.7 |
| 5 | EtOAc/IPA (1:9) | G/H | Slurry | 55 | 25 | 15 | B | 46.8 | 88.9 | 7.4 | 15.1 | NA |

TABLE 16-continued

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | Acetone/MeOH (1:3) | E/G | Slurry | 50 | 25 | 3 | B/trace E | 49 | 92.2 | 9.8 | 7.9 | 99.6 |
| 24 | MEK/MeOH (1:9) | E&G | Imm Slurry | 40 | 25 | 1 | B | 49 | NA | 9.5 | NA | NA |
| 5 | Toluene/IPA (1:9) | G/H | Imm Slurry | 45 | 25 | 15 | B/H | 51.7 | 86.9 | 2.5 | 52.8 | 93.2 |
| 5 | n-BuOH | G | Slurry | 40 | 25 | 8 | B | 54 | 83.3 | 10.0 | 16.7 | 95.0 |
| 5 | Cyclohexanone/IPA (1:9) | G/H | Slurry | 45 | 25 | 15 | B | 54.5 | 85.2 | 2.5 | 59.2 | NA |
| 5 | MEK/EtOH (1:9) | G/H | Slurry | 55 | 25 | 15 | B | 54.9 | 88.8 | 10.0 | 11.2 | NA |
| 5 | n-BuOH | E/G | Slurry | 50 | 25 | 3 | B | 57 | 85.5 | 9.8 | 14.8 | 99.7 |
| 5 | Toluene/MeOH (1:9) | G/H | Slurry | 55 | 25 | 16 | B/H | 58.4 | 86.0 | 20.0 | 7.0 | 99.8 |
| 2 | IPA/water (95:5) | G/H | Slurry | 55 | 25 | 13 | B | 59.8 | 94.4 | 10.0 | 5.6 | NA |
| 2 | IPA/water (99:1) | G/H | Slurry | 55 | 25 | 13 | B | 61.0 | 92.7 | 10.0 | 7.3 | NA |
| 5 | Toluene/MeOH (1:9) | G | Slurry | 40 | 25 | 8 | B | 61 | 74.8 | 30.0 | 8.4 | 99.7 |
| 5 | EtOAc/MeOH (1:3) | G | Slurry | 40 | 25 | 8 | B | 63 | 66.1 | 30.0 | 11.3 | 99.8 |
| 5 | Toluene/MeOH (3:7) | G | Slurry | 40 | 25 | 3 | B | 63 | 70.5 | 5.5 | 53.5 | 99.8 |
| 5 | Anisole/MeOH (1:9) | G | Slurry | 40 | 25 | 8 | B | 64 | 71.2 | 30.0 | 9.6 | 99.7 |
| 5 | Cyclohexanone/MeOH (1:3) | G | Slurry | 25 | 5 | 11 | B/trace G | 64 | 21.7 | 30.0 | 26.1 | 99.7 |
| 5 | p-Xylene/MeOH (1:9) | G | Slurry | 25 | 25 | 7 | B | 70 | 60.8 | 40.0 | 9.8 | 99.8 |
| 5 | MEK/MeOH (3:7) | G | Slurry | 25 | 25 | 7 | B | 71 | 49.6 | 30.0 | 16.8 | 99.8 |

Form B was the predominant form isolated in the Exo-impurity purging study, indicating that Form B present in the input materials can persist for a prolonged period of time (days), despite the applied seeding of other, more stable crystal forms, and heating.

Exo-impurity depletion by Form B samples was generally the lowest (average of 57%) as compared to other crystal forms of D9-THC-naphthoylester.

The results of Exo-impurity purging by Group D (and/or Form C) samples are listed in Table 17.

TABLE 17

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | DMF/water (2:1) | D | Imm Slurry | 50 | 25 | 2 | D/B | 0 | 100.0 | 9.0 | 0.0 | 99.3 |
| 5 | DMF/acetone/water (3:3:3) | D | Imm Slurry | 50 | 25 | 2 | D | 6 | 99.9 | 28.5 | 0.0 | 99.5 |
| 24 | Acetone/water (1:1) | C&D | Imm Slurry | 40 | 25 | 1 | C/D | 9 | NA | 9.5 | NA | NA |
| 5 | Acetone/water (7:3) | D | Imm Slurry | 50 | 25 | 2 | D/C | 29 | 99.2 | 24.8 | 0.3 | 99.6 |
| 24 | THF/water (2:8) | C&D | Imm Slurry | 40 | 25 | 1 | D | 29 | NA | 10.0 | NA | NA |
| 5 | 1,4-Dioxane/water (7:3) | D | Imm Slurry | 50 | 25 | 2 | D | 36 | 98.1 | 9.6 | 2.0 | 99.1 |

TABLE 17-continued

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | DMF/acetone/MeOH (1.5:1.5:7) | D | Imm Slurry | 50 | 25 | 2 | D/B | 46 | 95.1 | 4.6 | 10.5 | 99.3 |
| 5 | DMF/MeOH (3:7) | D | Imm Slurry | 50 | 25 | 2 | D | 58 | 94.8 | 5.1 | 10.3 | 99.5 |
| 5 | DMSO/MeOH (9:1) | D/G | Slurry | 50 | 5 | 6 | D | 58 | 78.4 | 40.0 | 5.4 | 99.5 |
| 5 | MeCN/water (9:1) | D | Slurry | 50 | 25 | 2 | C/D | 61 | 95.7 | 18.7 | 2.3 | 99.4 |
| 5 | DMSO | D | Frozen | 50 | 5 | 6 | D | 64 | 78.4 | 40.0 | 5.4 | 99.6 |
| 24 | Nitromethane | E & G | Imm Slurry | 40 | 25 | 1 | C | 65 | NA | 9.2 | NA | NA |
| 5 | Acetone | D | Imm Slurry | 50 | 25 | 2 | C/D | 65 | 77.0 | 2.4 | 95.2 | 98.2 |
| 5 | MeCN/MeOH (9:1) | D/G | Slurry | 50 | 5 | 6 | C | 68 | 74.8 | 30.0 | 8.4 | 99.6 |
| 24 | MeCN | C & D | Imm Slurry | 40 | 25 | 1 | C | 69 | NA | 14.9 | NA | NA |
| 5 | MeCN | D | Slurry | 50 | 5 | 6 | C/D | 70 | 74.5 | 30.0 | 8.5 | 99.6 |
| 5 | MeCN/MIBK (8:2) | D | Imm Slurry | 50 | 25 | 2 | C | 75 | 91.8 | 3.2 | 25.5 | 100.0 |
| 5 | DMSO/MeOH (9:1) | D/G | Slurry | 50 | 25 | 5 | D | 77 | 79.2 | 40.0 | 5.2 | 99.7 |
| 5 | DMSO | D | Slurry | 50 | 25 | 5 | D | 77 | 76.0 | 40.0 | 6.0 | 99.6 |
| 5 | DMSO | D | Slurry | 50 | 25 | 2 | D | 78 | 80.2 | 24.0 | 8.3 | 99.7 |
| 5 | MeCN | D | Imm Slurry | 50 | 25 | 2 | D/C | 79 | 85.2 | 14.6 | 10.1 | 99.6 |
| 24 | MeCN/MIBK (8:2) | C & D | Slurry | 40 | 25 | 1 | C | 79 | NA | 6.5 | NA | NA |
| 24 | DMSO | C & D | Imm Slurry | 40 | 25 | 1 | D | 79 | NA | 14.1 | NA | NA |
| 5 | MeCN/MIBK (8:2) | D | Slurry | 50 | 5 | 6 | C | 81 | 56.8 | 20.0 | 21.6 | 99.7 |
| 5 | DMF | D | Slurry | 50 | 25 | 2 | D | 82 | 72.2 | 3.8 | 74.0 | 99.6 |
| 5 | DMF/MeOH (9:1) | D/G | Slurry | 50 | 5 | 6 | D | 83 | 57.3 | 8.0 | 53.5 | 99.6 |
| 5 | MeCN | D | Slurry | 50 | 25 | 5 | C | 84 | 74.2 | 30.0 | 8.6 | 99.7 |
| 5 | DMF | D | Slurry | 50 | 5 | 6 | D | 85 | 46.8 | 8.0 | 66.6 | 99.5 |
| 5 | MeCN/MeOH (9:1) | D/G | Slurry | 50 | 25 | 5 | C | 85 | 73.9 | 30.0 | 8.7 | 99.7 |
| 24 | DMF | C & D | Slurry | 40 | 25 | 1 | D/C | 88 | NA | 3.3 | NA | NA |
| 5 | DMF/MeOH (9:1) | D/G | Slurry | 50 | 25 | 5 | D | 90 | 56.0 | 8.0 | 54.9 | 99.7 |
| 5 | MeCN/MIBK (8:2) | D | Slurry | 50 | 25 | 5 | C | 90 | 55.4 | 20.0 | 22.3 | 99.7 |
| 5 | DMF | D | Slurry | 50 | 25 | 5 | D | 91 | 47.5 | 8.0 | 65.6 | 99.6 |

Group D (class of solvates) was isolated either as phase-pure or, due to the tendency to desolvate in the solid state, as mixtures with the non-solvated Form C.

Conversion of Form B to Group D (solvates) was generally faster than to other non-solvated crystal forms.

Exo-impurity depletion of Group D (or Form C) was generally higher as compared to all known forms (average 66%). The highest depletion (>80%) was observed for MeCN and DMF solvates, however the yield was low, due to the high solubility in the corresponding solvents.

The results of Exo-impurity purging by Forms E, G and H samples are listed in Table 18.

TABLE 18

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | EtOAc/MeOH (1:3) | H | Thick slurry | 55 | 25 | 21 | H | 44.6 | 91.1 | 10.0 | 8.9 | NA |
| 5 | Toluene/MeOH (2:8) | H | Thick slurry | 50 | 50 | 17 | H | 47.6 | NA | 6.0 | NA | NA |
| 5 | Toluene/EtOH (2:8) | H | Thick slurry | 25 | 25 | 18 | H* | 52.4 | NA | 5.0 | NA | NA |
| 5 | Toluene/MeOH (2:8) | H | Thick slurry | 50 | 25 | 17 | H | 58.3 | 85.0 | 6.0 | 25.1 | NA |
| 5 | Toluene/MeOH (3:7) | G | Thick slurry | 25 | 25 | 7 | H | 59 | 61.6 | 5.5 | 69.9 | 98.4 |
| 5 | Toluene/MeOH (5:95) | H | Thick slurry | 50 | 25 | 20 | G | 60.4 | 96.7 | 10.0 | 3.4 | NA |
| 5 | Toluene/EtOH (1:9) | G/H | Imm Slurry | 55 | 25 | 16 | H | 61.8 | 89.0 | 9.9 | 11.1 | 99.1 |
| 5 | EtOAc/EtOH (2:8) | H | Thick slurry | 50 | 25 | 17 | H | 63.8 | 71.0 | 8.0 | 36.2 | NA |
| 5 | Toluene/MeOH (1:9) | H | Thick slurry | 50 | 25 | 17 | H | 65.2 | 89.8 | 15.0 | 6.8 | NA |
| 5 | EtOAc/MeOH (1:2) | H | Thick slurry | 55 | 55 | 21 | G | 65.9 | NA | 8.0 | NA | NA |
| 5 | EtOAc/MeOH (1:2) | H | Thick slurry | 55 | 25 | 21 | G | 67.3 | 85.2 | 8.0 | 18.5 | NA |
| 5 | p-Xylene/MeOH (1:9) | E/G | Thick slurry | 50 | 25 | 3 | G | 68 | 85.4 | 19.5 | 7.5 | 99.7 |
| 5 | Toluene/MeOH (3:7) | G | Slurry | 25 | 5 | 11 | H | 69 | 28.6 | 10.0 | 71.4 | 99.1 |
| 5 | MEK/MeOH (3:7) | G/H | Imm Slurry | 55 | 25 | 15 | G | 68.9 | 88.4 | 5.0 | 23.2 | 99.2 |
| 5 | Toluene/EtOH (2:8) | H | Thick slurry | 25 | 25 | 18 | H | 69.0 | 89.9 | 5.0 | 36.2 | NA |
| 5 | EtOAc/EtOH (1:9) | G/H | Imm Slurry | 55 | 25 | 15 | G | 69.5 | 91.1 | 5.0 | 17.8 | 98.5 |
| 5 | Toluene/EtOH (1:9) | H | Thick slurry | 40 | 25 | 19 | H | 69.5 | 80.4 | 10.0 | 19.6 | NA |
| 5 | EtOAc/MeOH (1:3) | G/H | Slurry | 55 | 25 | 15 | G | 71.7 | 90.3 | 10.0 | 9.7 | 99.6 |
| 5 | Heptane/IPA (1:3) | G/H | Imm Slurry | 55 | 25 | 15 | G/B | 71.8 | 89.8 | 5.0 | 20.4 | 95.2 |
| 5 | EtOAc/MeOH (1:3) | E/G | Slurry | 50 | 25 | 3 | G/B | 72 | 89.3 | 9.5 | 11.3 | 99.6 |
| 5 | Toluene/MeOH (1:9) | H | Thick slurry | 50 | 50 | 17 | H | 72.0 | NA | 15.0 | NA | NA |
| 5 | Anisole/MeOH (1:9) | E/G | Slurry | 50 | 25 | 3 | G | 73 | 92.4 | 9.4 | 8.1 | 99.8 |
| 5 | Toluene/MeOH (1:9) | E/G | Thick slurry | 50 | 25 | 3 | G | 73 | 93.7 | 9.6 | 6.5 | 99.4 |
| 5 | Toluene/EtOH (1:9) | H | Thick slurry | 40 | 40 | 19 | H | 73.2 | NA | 10.0 | NA | NA |
| 5 | EtOAc/MeOH (1:3) | H | Thick slurry | 55 | 55 | 21 | H | 73.7 | NA | 10.0 | NA | NA |
| 5 | Toluene/MeOH (5:95) | H | Thick slurry | 50 | 50 | 20 | G | 74.0 | NA | 10.0 | NA | NA |
| 24 | p-Xylene/MeOH (1:9) | E&G | Slurry | 40 | 25 | 1 | G | 74 | NA | 10.0 | NA | NA |
| 5 | MEK/MeOH (3:7) | E/G | Slurry | 50 | 25 | 3 | G/B | 75 | 85.2 | 9.7 | 15.3 | 99.8 |

TABLE 18-continued

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | Toluene/MeOH (3:7) | G | Slurry | 25 | 25 | 7 | H | 76 | 35.8 | 8.0 | 80.2 | 99.2 |
| 24 | 1,4-Dioxane/MeOH (1:9) | E&G | Slurry | 40 | 25 | 1 | G | 76 | NA | 14.0 | NA | NA |
| 5 | Toluene/acetone/MeOH (1.5:1.5:7) | G | Slurry | 40 | 25 | 3 | G/D | 77 | 72.4 | 13.4 | 20.6 | 99.7 |
| 5 | EtOAC/EtOH (2:8) | H | Thick slurry | 50 | 50 | 17 | H | 76.8 | NA | 8.0 | NA | NA |
| 5 | Cyclohexanone/MeOH (1:3) | G | Slurry | 40 | 25 | 3 | G | 77 | 67.6 | 9.4 | 34.4 | 97.6 |
| 5 | Nitromethane | G | Slurry | 40 | 25 | 3 | E | 78 | 77.2 | 32.6 | 7.0 | 99.6 |
| 5 | Toluene/MeOH (3:7) | G | Slurry | 25 | 25 | 7 | H | 79 | 35.3 | 10.0 | 64.7 | 99.3 |
| 24 | Toluene/MeOH (1:9) | E&G | Slurry | 40 | 25 | 1 | G | 79 | NA | 14.6 | NA | NA |
| 24 | Anisole/MeOH (1:9) | E&G | Slurry | 40 | 25 | 1 | G | 81 | NA | 14.6 | NA | NA |
| 5 | Cyclohexanone/MeOH (1:3) | G | Slurry | 25 | 25 | 7 | G | 88 | 12.1 | 30.0 | 29.3 | 99.5 |

Form H is the thermodynamically most-stable form at 25-60° C.

Conversion of Form B to Form H was relatively slow (days).

Formation of Form H was greatly facilitated at elevated temperatures (50-60° C.), likely due to increased solubility.

Formation of Form H appeared to be facilitated by aromatic solvents (toluene, anisole, p-xylene), likely due to increased solubility.

The results of Exo-impurity purging, where the isolated form is Form B, Form B/G, Form B/H, Form G, or Form H when seeds of Form H or Form H/G were used are shown in Table 19.

TABLE 19

| Exp No. | Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|---|
| 25 | 5 | MEK/IPA (1:9) | G/H | Imm Slurry | 55 | 25 | 15 | B | 12.2 | 91.4 | 5.0 | 17.2 | NA |
| 26 | 5 | Heptane/EtOH (1:3) | G/H | Imm Slurry | 55 | 25 | 15 | B/G | 35.6 | 86.1 | 5.0 | 27.9 | 94.8 |
| 27 | 5 | MEK/MeOH (1:9) | G/H | Slurry | 60 | 25 | 12 | B | 39.0 | 95.5 | 10.0 | 4.5 | NA |
| 28 | 5 | EtOAc/EtOH (1:9) | H | Slurry | 55 | 25 | 21 | B | 39.9 | 88.0 | 10.0 | 12.0 | NA |
| 29 | 5 | IPA/water (95:5) | G/H | Slurry | 60 | 25 | 12 | B | 40.2 | 95.5 | 10.0 | 4.5 | NA |
| 30 | 5 | Cyclohexanone/MeOH (1:9) | G/H | Slurry | 60 | 25 | 12 | B | 41.5 | 92.4 | 10.0 | 7.6 | NA |
| 31 | 5 | IPA | G/H | Slurry | 50 | 25 | 14 | B | 42.7 | 92.7 | 10.0 | 7.3 | NA |
| 32 | 5 | Cyclohexanone/EtOH (1:9) | G/H | Slurry | 55 | 25 | 16 | B | 43.3 | 89.5 | 5.0 | 21.1 | NA |
| 33 | 5 | Toluene/EtOH (5:95) | H | Thick slurry | 55 | 25 | 21 | B | 43.7 | 87.6 | 12.0 | 10.3 | NA |
| 34 | 5 | EtOAc/MeOH (1:3) | H | Thick slurry | 55 | 25 | 21 | H | 44.6 | 91.1 | 10.0 | 8.9 | NA |
| 35 | 5 | EtOAc/IPA (1:9) | G/H | Slurry | 55 | 25 | 15 | B | 46.8 | 88.9 | 7.4 | 15.1 | NA |
| 36 | 5 | Toluene/MeOH (2:8) | H | Thick slurry | 50 | 50 | 17 | H | 47.6 | NA | 6.0 | NA | NA |

TABLE 19-continued

| Exp No. | Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|---|
| 37 | 5 | Toluene/IPA (1:9) | G/H | Imm Slurry | 45 | 25 | 15 | B/H | 51.7 | 86.9 | 2.5 | 52.8 | 93.2 |
| 38 | 5 | Toluene/EtOH (2:8) | H | Thick slurry | 25 | 25 | 18 | H* | 52.4 | NA | 5.0 | NA | NA |
| 39 | 5 | Cyclohexanone/IPA (1:9) | G/H | Slurry | 45 | 25 | 15 | B | 54.5 | 85.2 | 2.5 | 59.2 | NA |
| 40 | 5 | MEK/EtOH (1:9) | G/H | Slurry | 55 | 25 | 15 | B | 54.9 | 88.8 | 10.0 | 11.2 | NA |
| 41 | 5 | Toluene/MeOH (2:8) | H | Thick slurry | 50 | 25 | 17 | H | 58.3 | 85.0 | 6.0 | 25.1 | NA |
| 42 | 5 | Toluene/MeOH (1:9) | G/H | Slurry | 55 | 25 | 16 | B/H | 58.4 | 86.0 | 20.0 | 7.0 | 99.8 |
| 43 | 2 | IPA/water (95:5) | G/H | Slurry | 55 | 25 | 13 | B | 59.8 | 94.4 | 10.0 | 5.6 | NA |
| 44 | 5 | Toluene/MeOH (5:95) | H | Thick slurry | 50 | 25 | 20 | G | 60.4 | 96.7 | 10.0 | 3.4 | NA |
| 45 | 2 | IPA/water (99:1) | G/H | Slurry | 55 | 25 | 13 | B | 61.0 | 92.7 | 10.0 | 7.3 | NA |
| 46 | 5 | Toluene/EtOH (1:9) | G/H | Imm Slurry | 55 | 25 | 16 | H | 61.8 | 89.0 | 9.9 | 11.1 | 99.1 |
| 47 | 5 | EtOAC/EtOH (2:8) | H | Thick slurry | 50 | 25 | 17 | H | 63.8 | 71.0 | 8.0 | 36.2 | NA |
| 48 | 5 | Toluene/MeOH (1:9) | H | Thick slurry | 50 | 25 | 17 | H | 65.2 | 89.8 | 15.0 | 6.8 | NA |
| 49 | 5 | EtOAc/MeOH (1:2) | H | Thick slurry | 55 | 55 | 21 | G | 65.9 | NA | 8.0 | NA | NA |
| 50 | 5 | EtOAc/MeOH (1:2) | H | Thick slurry | 55 | 25 | 21 | G | 67.3 | 85.2 | 8.0 | 18.5 | NA |
| 51 | 5 | MEK/MeOH (3:7) | G/H | Imm Slurry | 55 | 25 | 15 | G | 68.9 | 88.4 | 5.0 | 23.2 | 99. |
| 52 | 5 | Toluene/EtOH (2:8) | H | Thick slurry | 25 | 25 | 18 | H | 69.0 | 89.9 | 5.0 | 36.2 | NA |
| 53 | 5 | EtOAc/EtOH (1:9) | G/H | Imm Slurry | 55 | 25 | 15 | G | 69.5 | 91.1 | 5.0 | 17.8 | 98.5 |
| 54 | 5 | Toluene/EtOH (1:9) | H | Thick slurry | 40 | 25 | 19 | H | 69.5 | 80.4 | 10.0 | 19.6 | NA |
| 55 | 5 | EtOAc/MeOH (1:3) | G/H | Slurry | 55 | 25 | 15 | G | 71.7 | 90.3 | 10.0 | 9.7 | 99.6 |
| 56 | 5 | Heptane/IPA (1:3) | G/H | Imm Slurry | 55 | 25 | 15 | G/B | 71.8 | 89.8 | 5.0 | 20.4 | 95.2 |
| 57 | 5 | Toluene/MeOH (1:9) | H | Thick slurry | 50 | 50 | 17 | H | 72.0 | NA | 15.0 | NA | NA |
| 58 | 5 | Toluene/EtOH (1:9) | H | Thick slurry | 40 | 40 | 19 | H | 73.2 | NA | 10.0 | NA | NA |
| 59 | 5 | EtOAc/MeOH (1:3) | H | Thick slurry | 55 | 55 | 21 | H | 73.7 | NA | 10.0 | NA | NA |
| 60 | 5 | Toluene/MeOH (5:95) | H | Thick slurry | 50 | 50 | 20 | G | 74.0 | NA | 10.0 | NA | NA |
| 61 | 5 | EtOAC/EtOH (2:8) | H | Thick slurry | 50 | 50 | 17 | H | 76.8 | NA | 8.0 | NA | NA |

Conversion of Form B to Form H can be kinetically hindered even in the presence of Form H seeds, as shown by the isolation of Form B or Form G.

Formation of Form H was more frequent at elevated (50-60° C.) temperatures, in the presence of an aromatic solvent (e.g. toluene), and at higher solvent volumes In aliphatic solvents (EtOAc, MEK, heptane, etc), Form B was the predominantly isolated form.

The results of Exo-impurity purging where the isolated form is Form H when seeds of Form H (Batches 25-27, for example) were used are listed in Table 20.

TABLE 20

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | EtOAc/MeOH (1:3) | H | Thick slurry | 55 | 25 | 21 | H | 45 | 91 | 10.0 | 8.9 | NA |
| 5 | Toluene/MeOH (2:8) | H | Thick slurry | 50 | 50 | 17 | H | 48 | NA | 6.0 | NA | NA |

TABLE 20-continued

| Input Batch | Solvent (v/v) | Seed | Obs. | Initial Heat T | Isolation T | SP | Isolated Form | % Exo Depletion | Est. Yield | Volumes [mL/g] | D9 Solubility at Isolation T (mg/mL) | Sum Exo/D9/D8 in Solids % |
|---|---|---|---|---|---|---|---|---|---|---|---|---|
| 5 | Toluene/EtOH (2:8) | H | Thick slurry | 25 | 25 | 18 | H* | 52 | NA | 5.0 | NA | NA |
| 5 | Toluene/MeOH (2:8) | H | Thick slurry | 50 | 25 | 17 | H | 58 | 85 | 6.0 | 25.1 | NA |
| 5 | Toluene/MeOH (3:7) | G | Thick slurry | 25 | 25 | 7 | H | 59 | 62 | 5.5 | 69.9 | 98.4 |
| 5 | Toluene/EtOH (1:9) | G/H | Imm Slurry | 55 | 25 | 16 | H | 62 | 89 | 9.9 | 11.1 | 99.1 |
| 5 | EtOAC/EtOH (2:8) | H | Thick slurry | 50 | 25 | 17 | H | 64 | 71 | 8.0 | 36.2 | NA |
| 5 | Toluene/MeOH (1:9) | H | Thick slurry | 50 | 25 | 17 | H | 65 | 90 | 15.0 | 6.8 | NA |
| 5 | Toluene/MeOH (3:7) | G | Slurry | 25 | 5 | 11 | H | 69 | 29 | 10.0 | 71.4 | 99.1 |
| 5 | Toluene/EtOH (2:8) | H | Thick slurry | 25 | 25 | 18 | H | 69 | 90 | 5.0 | 36.2 | NA |
| 5 | Toluene/EtOH (1:9) | H | Thick slurry | 40 | 25 | 19 | H | 70 | 80 | 10.0 | 19.6 | NA |
| 5 | Toluene/MeOH (1:9) | H | Thick slurry | 50 | 50 | 17 | H | 72 | NA | 15.0 | NA | NA |
| 5 | Toluene/EtOH (1:9) | H | Thick slurry | 40 | 40 | 19 | H | 73 | NA | 10.0 | NA | NA |
| 5 | EtOAc/MeOH (1:3) | H | Thick slurry | 55 | 55 | 21 | H | 74 | NA | 10.0 | NA | NA |
| 5 | Toluene/MeOH (3:7) | G | Slurry | 25 | 25 | 7 | H | 76 | 36 | 8.0 | 80.2 | 99.2 |
| 5 | EtOAC/EtOH (2:8) | H | Thick slurry | 50 | 50 | 17 | H | 77 | NA | 8.0 | NA | NA |
| 5 | Toluene/MeOH (3:7) | G | Slurry | 25 | 25 | 7 | H | 79 | 35 | 10.0 | 64.7 | 99.3 |

Select Seeds Used in the Exo-Impurity Purging Studies

Preparation of Form G (Batch 23) Using Seeds of Form G (Batch 14) and Form E (Batch 20)

D9-THC-Naphthoylester (Form B, Batch 2, 51.9 mg) was combined with toluene/MeOH (1:9 v/v, 0.5 mL), heated to 45° C. and seeded with Form E (Batch 20, 1 mg) and Form G (Batch 14, 1 mg) and stirred at 45° C. Toluene/MeOH (3:7 v/v, 0.25 mL) was added and the slurry cooled to 25° C. at 0.1° C./min and stirred for 48 h. The slurry was heated to 40° C. for 4 h. MeOH (0.5 mL) was added. The slurry was cooled to 25° C. and stirred for 45 min. The solids were isolated by filtration. MeOH (0.25 mL) was used to rinse the vial and wash the cake which was air-dried for 18 h. PXRD analysis indicated Form G.

Mixture of Form G and Form B (Batch 25)

D9-THC-Naphthoylester (Form B, Batch 2, 503.7 mg) was combined with toluene/MeOH (1:9 v/v, 7.5 mL), and heated to 60° C. The slurry was seeded with Form G (Batch 23) and stirred for 18 h. The slurry was cooled rapidly to 25° C., yielding a thick slurry. Toluene/MeOH (1:9 v/v, 5 mL) was added to produce a mobile slurry. The solids were isolated by filtration and air-dried for 4 h. PXRD analysis indicated a mixture of Form G and Form B.

Form H (Batch 26)

D9-THC-Naphthoylester (Form B, Batch 2, 101.6 mg) was combined with toluene/MeOH (3:7 v/v, 1 mL), seeded with Form H (Batch 22, 1 mg) and stirred at 25° C. for 18 h. The solids were isolated by filtration and air-dried for 3 h. PXRD analysis indicated Form H.

Form H (Batch 27)

D9-THC-Naphthoylester (Form B, Batch 2, 1012.8 mg) was combined with toluene/MeOH (3:7 v/v, 4 mL), seeded with Form H (Batch 22, 1 mg) and stirred at 25° C. for 18 h. Toluene/MeOH (3:7 v/v, 5 mL) was added in 1 mL portions to produce a mobile slurry which was stirred at 25° C. for 4 h. The solids were isolated by filtration and air-dried for 2 h. PXRD indicated Form H.

Results/Summary

Form B (Batch 2) was utilized as input to a majority of the screening experiments. Thermal analyses showed a melting endotherm at 99.7° C. ($\Delta H$=59.9 J/g) and negligible (0.2% wt.) loss from 25 to 200° C. HPLC analysis showed that Batch 2 contained 5.3% Exo-impurity and 1.5% D8-THC-naphthoylester. Form B was highly soluble (>100 mg/mL) in common organic solvents and less soluble (<10 mg/mL) in alcohols and poorly soluble in water.

Form B was the predominant product of both polymorph screening and purging studies. However, Form B was determined to be a metastable form and its conversion to the more stable forms was kinetically hindered, possibly due to low solubility, present impurities, or slow nucleation and growth of more stable forms. Competitive ripening of the non-solvated forms (Forms A-C and E-H) conducted at 5, 25, 50, and 60° C., confirmed that between 25-60° C. Form H was the thermodynamically most-stable form. At 5° C., due to the very slow rate of form interconversions, the ripening experiments were incomplete within 29 days; however, they also suggest that Form H was most-stable.

The results of the purging study indicated that the Exo-depletion at levels >50% (depletion of Form B) were achieved by the most-stable non-solvated Group H and some of the Group D solvates. For instance, in 5 volumes of toluene/ethanol (1:9) the Exo-depletion and yield of Form H was approximately 70% and 90%, respectively. In 40 volumes of DMSO/methanol (9:1) the Exo-depletion and yield of DMSO solvate (Group D) was approximately 77% and 80%, respectively.

The embodiments described above are intended to be merely exemplary, and those skilled in the art will recognize, or will be able to ascertain using no more than routine experimentation, numerous equivalents of specific compounds, materials, and procedures. All such equivalents are considered to be within the scope of the disclosure and are encompassed by the appended claims.

Citation or identification of any reference in this application is not an admission that such reference is available as prior art.

Efforts have been made to ensure accuracy with respect to numbers used (e.g. amounts, temperature, etc.) but some experimental errors and deviations should be accounted for.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Unless defined otherwise, technical and scientific terms used herein have the same meaning as commonly understood by one of ordinary skill in the art to which this subject matter belongs, and are consistent with: Singleton et al (1994) Dictionary of Microbiology and Molecular Biology, 2nd Ed., J. Wiley & Sons, New York, NY; and Janeway, C., Travers, P., Walport, M., Shlomchik (2001) Immunobiology, 5th Ed., Garland Publishing, New York.

The disclosures of all cited references including publications, patents, and patent applications are expressly incorporated herein by reference in their entirety.

Throughout this specification and the claims, the words "comprise," "comprises," and "comprising" are used in a non-exclusive sense, except where the context requires otherwise. It is understood that embodiments described herein include "consisting of" and/or "consisting essentially of" embodiments.

As used herein, the term "about," when referring to a value is meant to encompass variations of, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller ranges is also encompassed, subject to any specifically excluded limit in the stated range. Where the stated range includes one or both of the limits, ranges excluding either or both of those included limits are also included.

Many modifications and other embodiments set forth herein will come to mind to one skilled in the art to which this subject matter pertains having the benefit of the teachings presented in the foregoing descriptions and the associated drawings. Therefore, it is to be understood that the subject matter is not to be limited to the specific embodiments disclosed and that modifications and other embodiments are intended to be included within the scope of the appended claims. Although specific terms are employed herein, they are used in a generic and descriptive sense only and not for purposes of limitation. One skilled in the art will recognize many methods and materials similar or equivalent to those described herein, which could be used in the practicing the subject matter described herein. The present disclosure is in no way limited to just the methods and materials described.

What is claimed is:

1. Crystalline D9-THC-naphthoylester, characterized by an X-ray powder diffraction pattern having at least one peak selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).

2. The crystalline D9-THC-naphthoylester of claim 1, wherein the crystalline D9-THC-naphthoylester is characterized by an X-ray powder diffraction pattern having at least two peaks selected from the group consisting of 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).

3. The crystalline D9-THC-naphthoylester of claim 1, wherein the crystalline D9-THC-naphthoylester is characterized by an X-ray powder diffraction pattern having peaks at 5.81°, 10.78°, 11.61°, 13.55°, 15.58°, 16.18°, 17.86°, 18.43°, 19.10°, 19.49°, 20.31°, 20.82°, 21.61°, 21.80°, 22.87°, 23.28°, 24.19°, 26.38°, 29.30°, 31.08°, and 32.02° 2θ (each ±0.20° 2θ).

4. The crystalline D9-THC-naphthoylester of claim 1, characterized by a differential scanning calorimetry thermogram exhibiting an onset at about 106.6° C. and a peak at about 109.6° C.

5. Crystalline D9-THC-naphthoylester, characterized by an X-ray powder diffraction pattern having at least one peak selected from the group consisting of 8.84°, 11.64°, 13.33°, 15.54°, 17.85°, 19.13°, 20.33°, 20.60°, 21.44°, and 23.42° 2θ (each ±0.20° 2θ).

6. The D9-THC-naphthoylester of claim 5, characterized by an X-ray powder diffraction pattern having at least two peaks selected from the group consisting of 8.84°, 11.64°, 13.33°, 15.54°, 17.85°, 19.13°, 20.33°, 20.60°, 21.44°, and 23.42° 2θ (each ±0.20° 2θ).

7. The D9-THC-naphthoylester of claim 5, characterized by an X-ray powder diffraction pattern having peaks at 8.84°, 11.64°, 13.33°, 15.54°, 17.85°, 19.13°, 20.33°, 20.60°, 21.44°, and 23.42° 2θ (each ±0.20° 2θ).

8. The crystalline D9-THC-naphthoylester of claim 5, characterized by a differential scanning calorimetry thermogram exhibiting an onset at about 106.5° C. and a peak at about 108.3° C.

9. Crystalline D9-THC-naphthoylester, characterized by an X-ray powder diffraction pattern having at least one peak selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

10. The crystalline D9-THC-naphthoylester of claim 9, characterized by an X-ray powder diffraction pattern having at least two peaks selected from the group consisting of 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

11. The crystalline D9-THC-naphthoylester of claim 9, characterized by an X-ray powder diffraction pattern having peaks at 5.83°, 8.63°, 11.65°, 13.42°, 15.57°, 16.23°, 17.87°, 20.35°, 20.69°, 21.50°, 22.91°, 23.40°, 26.62°, and 31.25° 2θ (each ±0.20° 2θ).

12. The crystalline D9-THC-naphthoylester of claim 9, characterized by a differential scanning calorimetry thermogram exhibiting an onset at about 87.1° C. and a peak at about 93.0° C.

13. A method of preparing pure Δ9-tetrahydrocannabinol from reaction mixtures containing a crude product containing one or more tetrahydrocannabinol compounds, wherein said one or more tetrahydrocannabinol compounds is converted to the crystalline D9-THC-naphthoylester of claim 1, wherein said crystalline D9-THC-naphthoylester is crystallized out and isolated and the pure Δ9-tetrahydrocannabinol is then obtained from the crystalline D9-THC-naphthoylester.

* * * * *